Aug. 25, 1964 H. J. CHALL 3,145,923
MULTIPLIER CONTROL MECHANISM FOR A SHORT
CUT MULTIPLICATION MACHINE
Filed Sept. 18, 1961 51 Sheets-Sheet 22
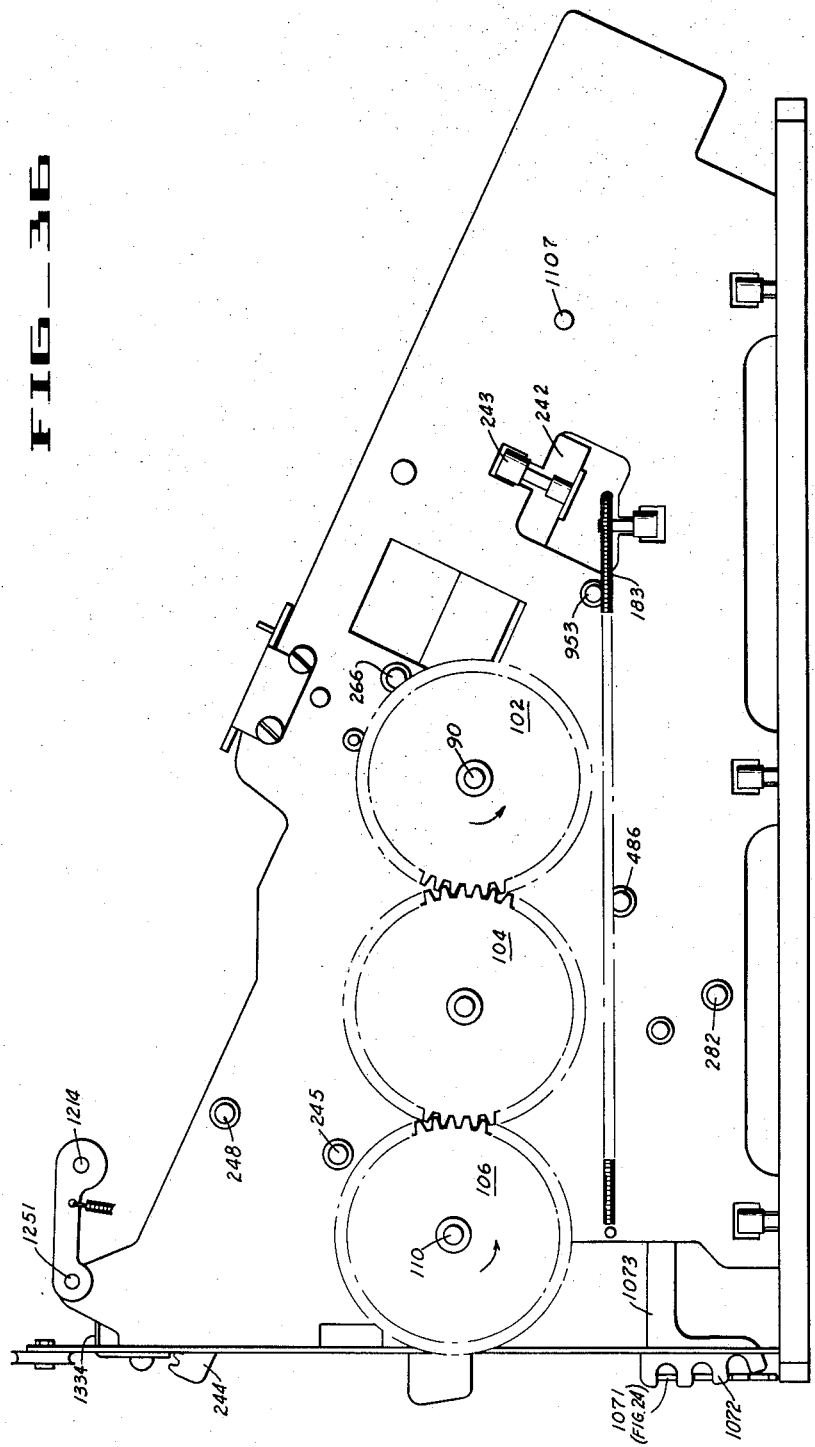
FIG_36

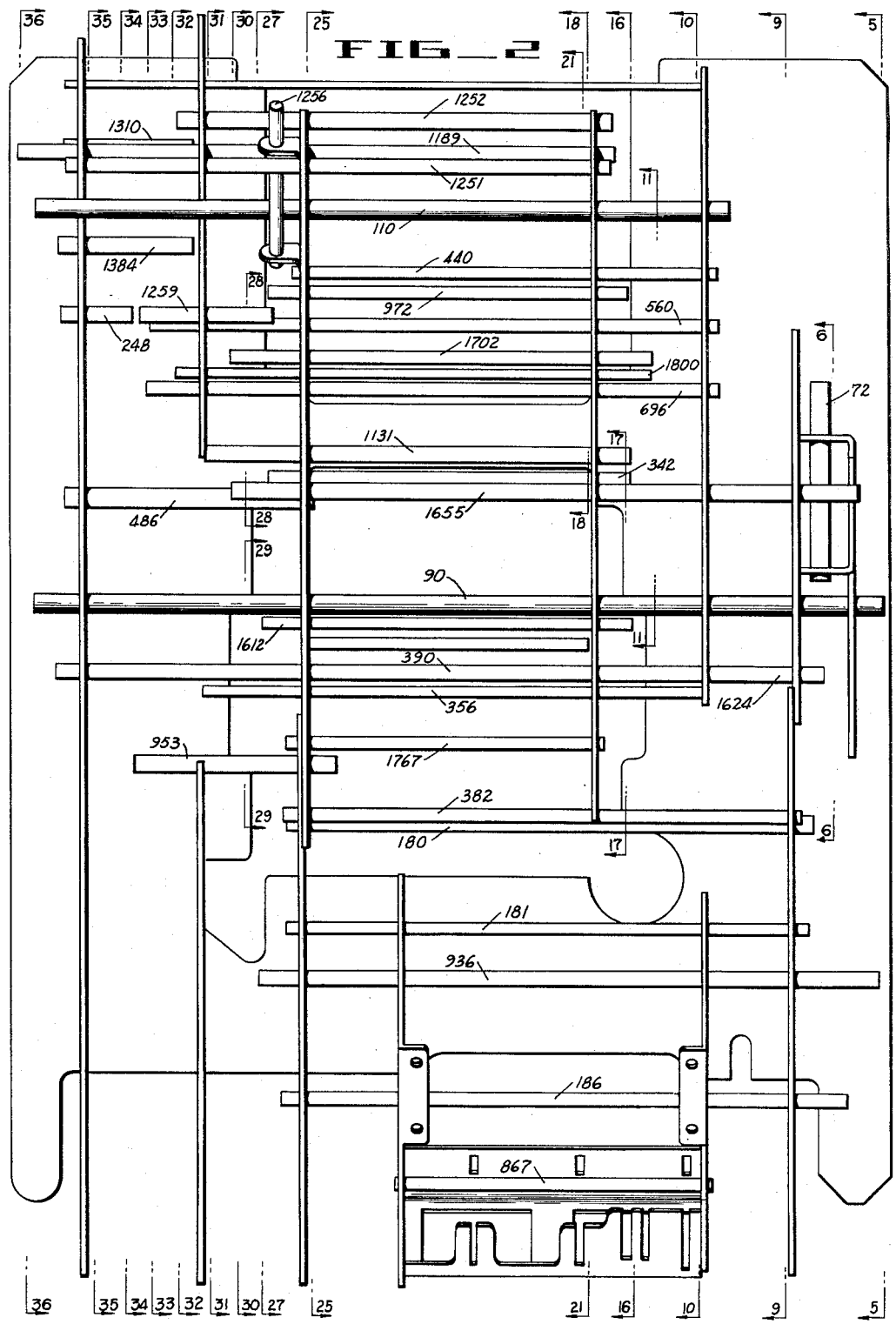

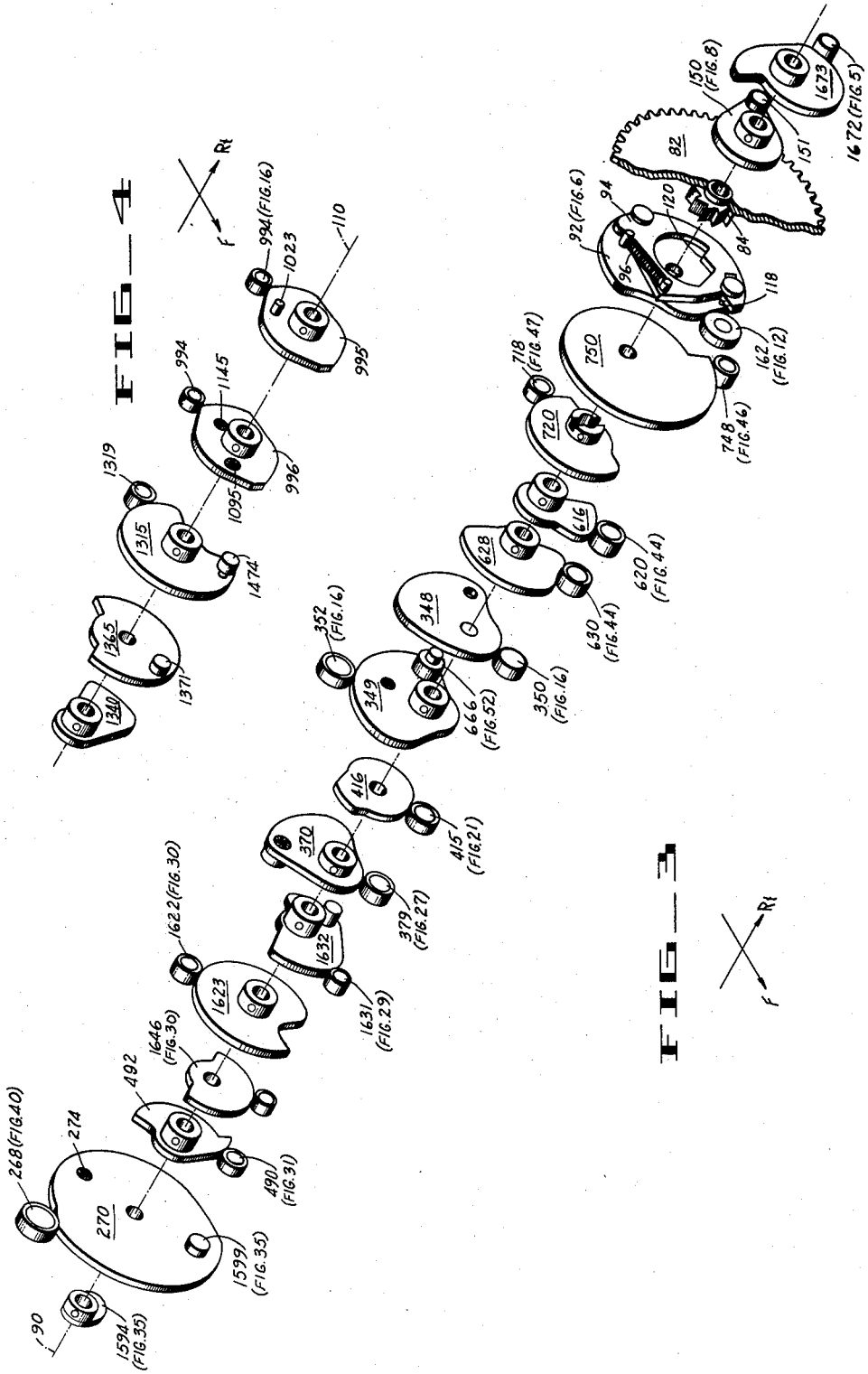

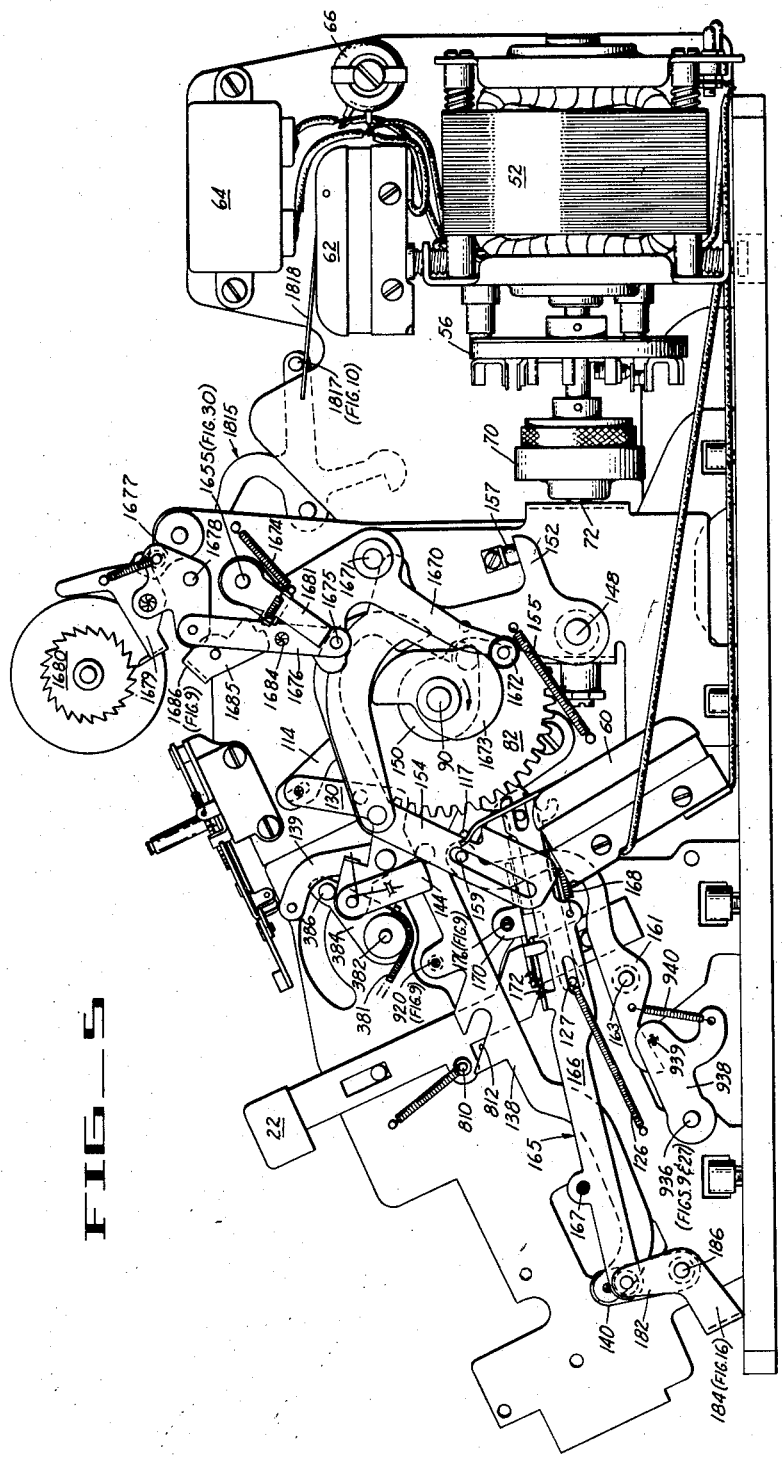

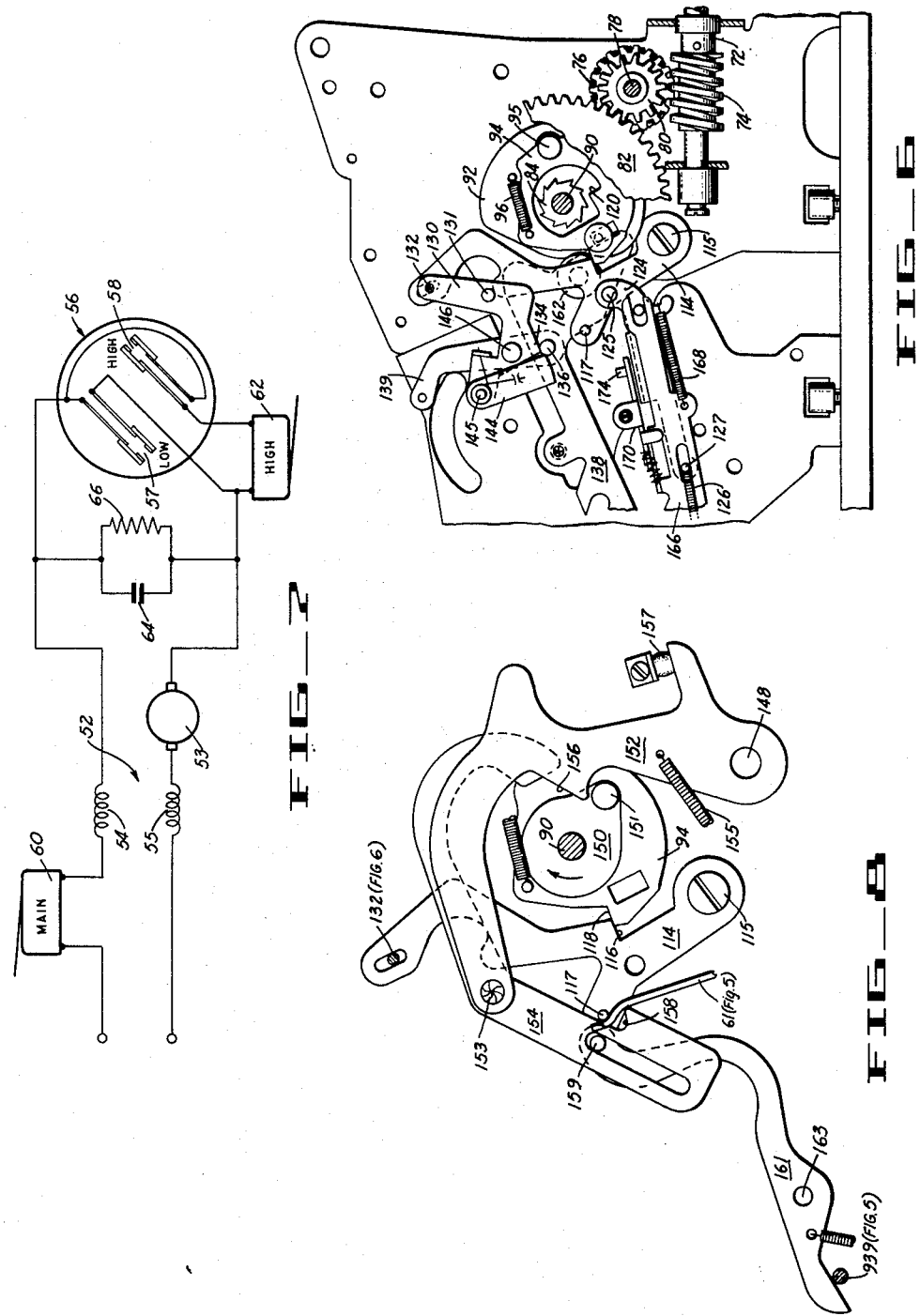

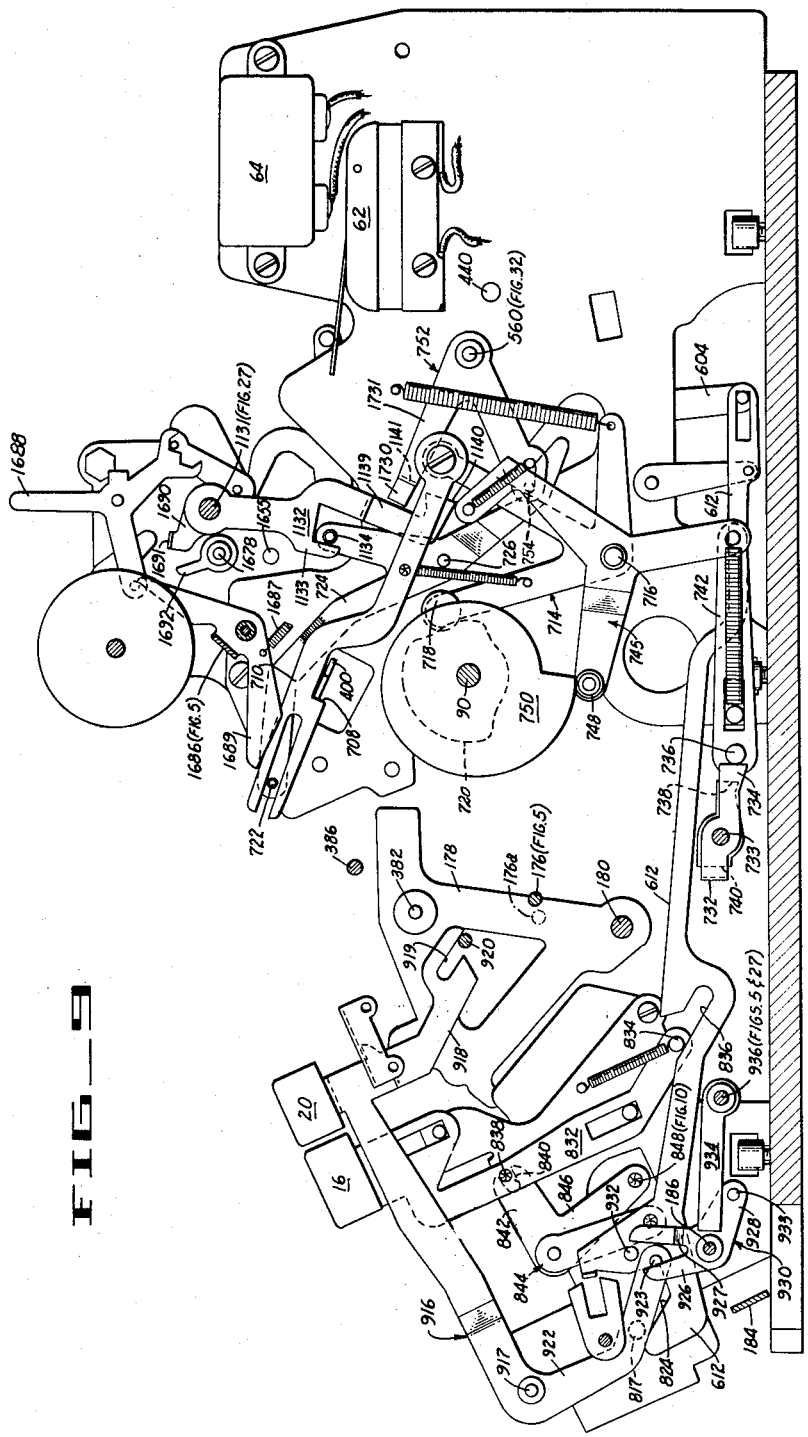

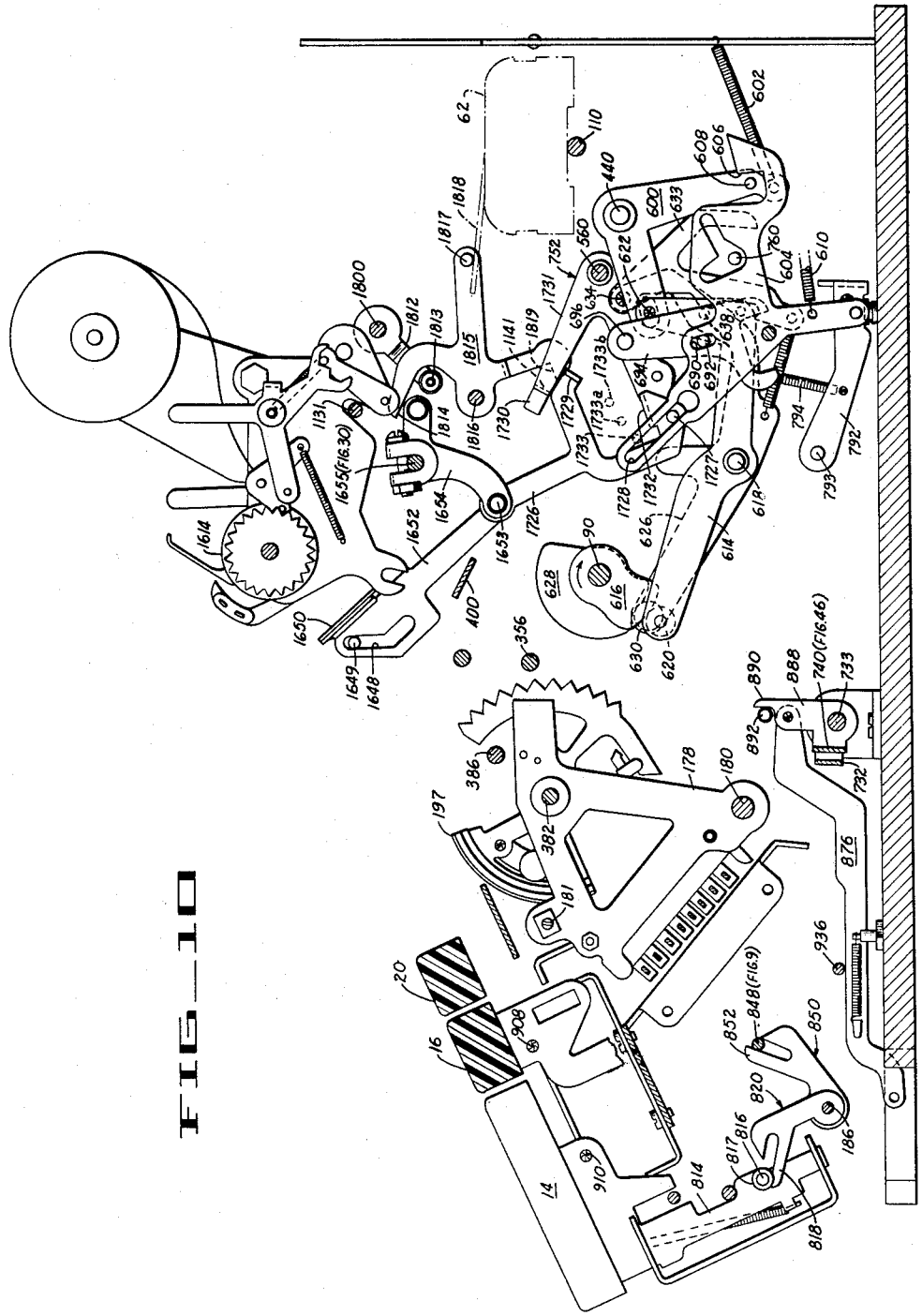
FIG_10

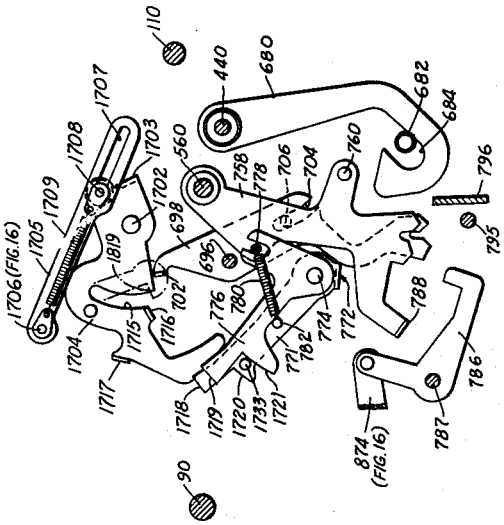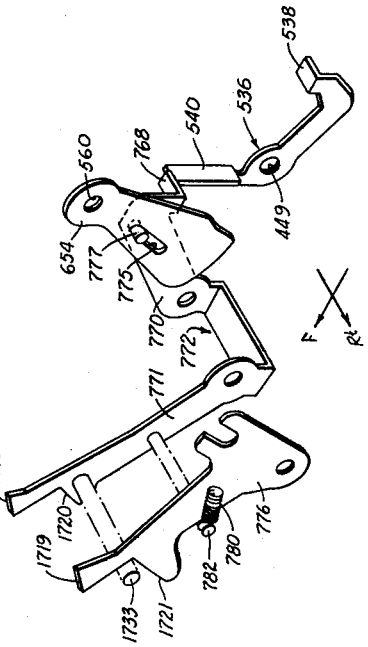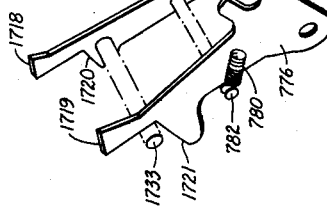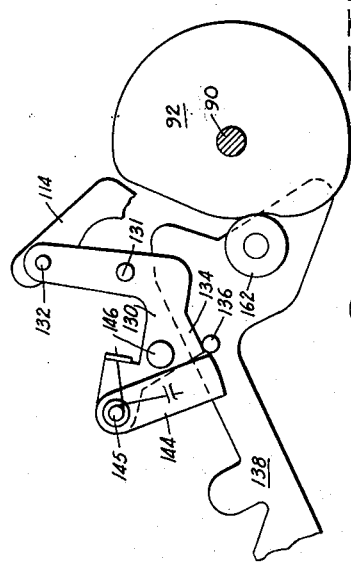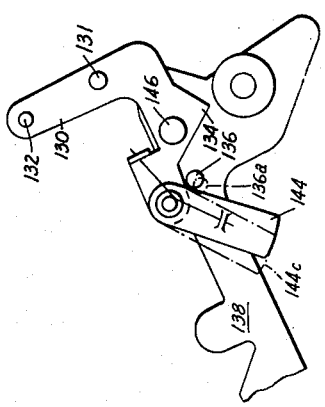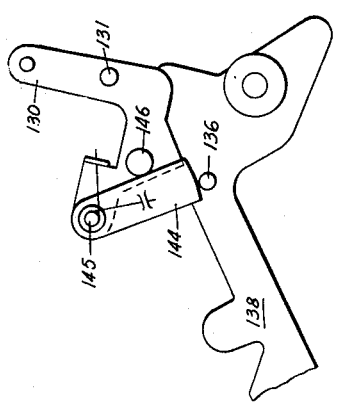

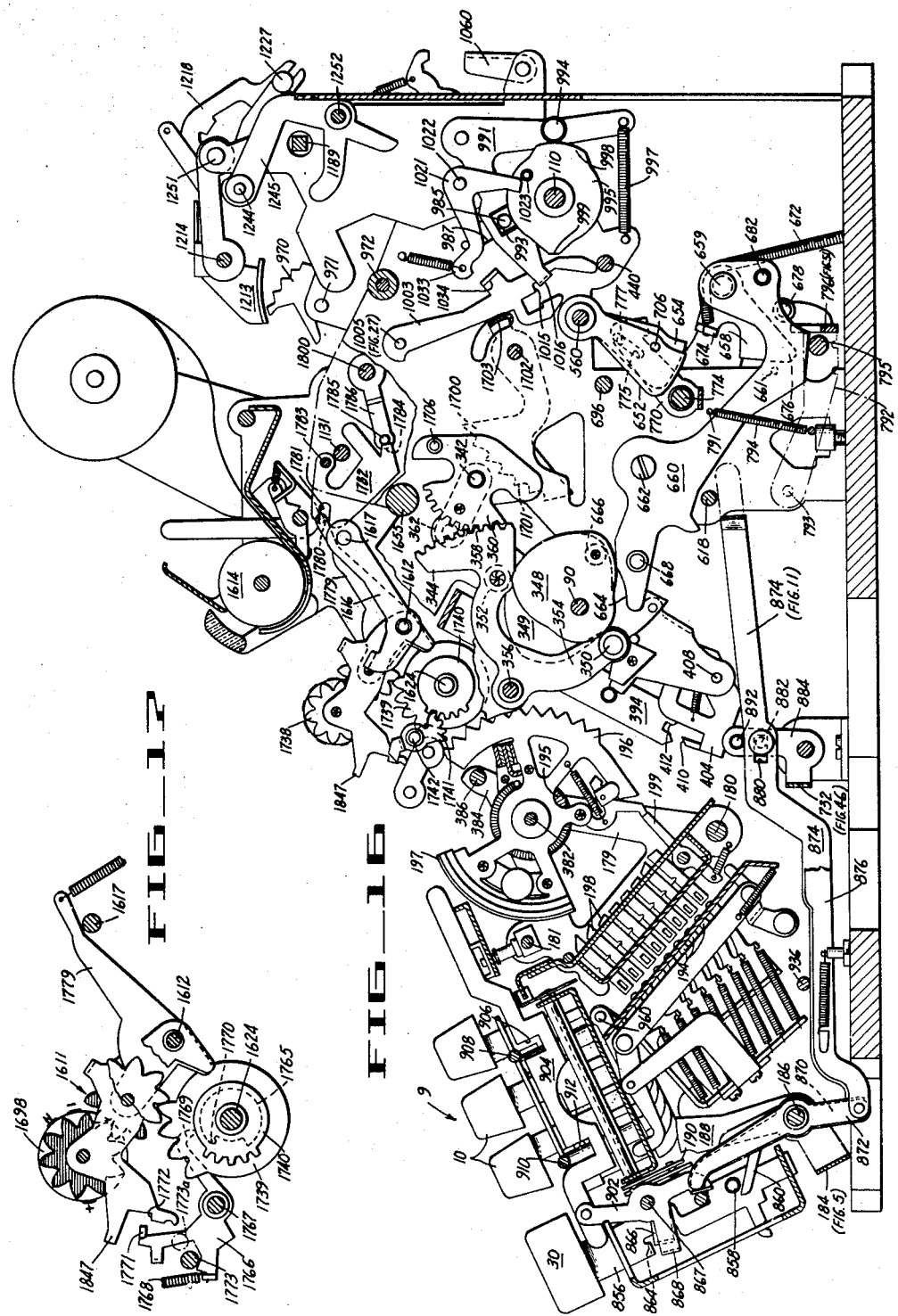

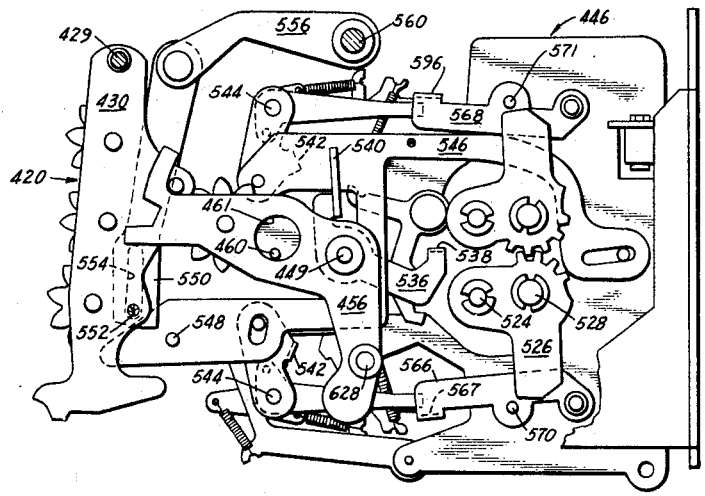
FIG_18
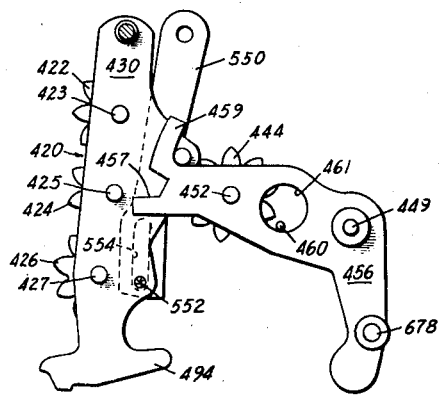
FIG_19
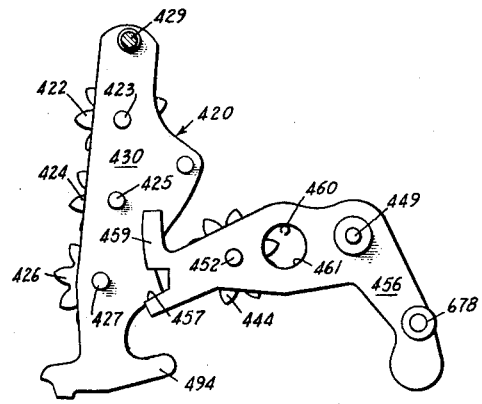
FIG_20

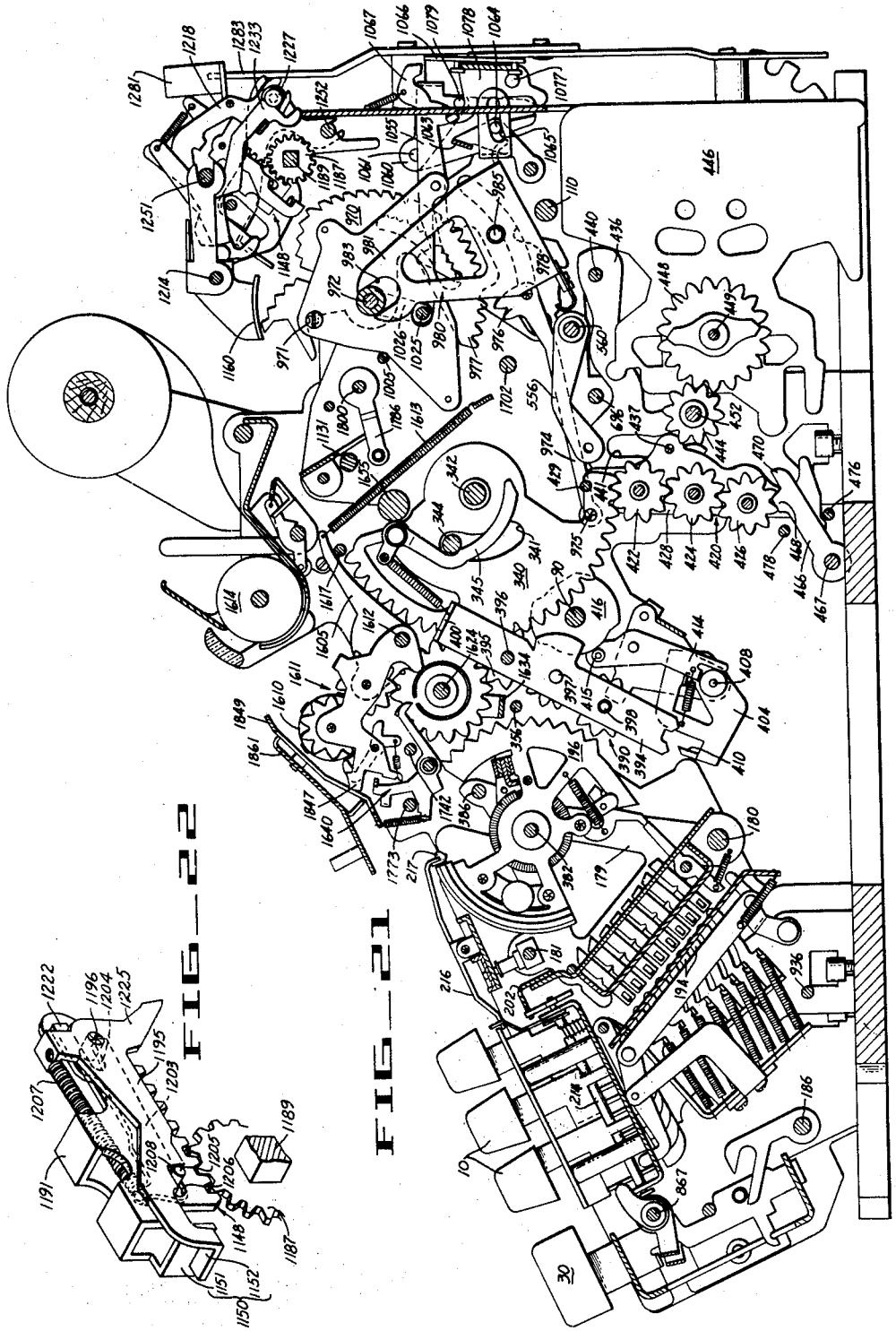
FIG_22
FIG_21

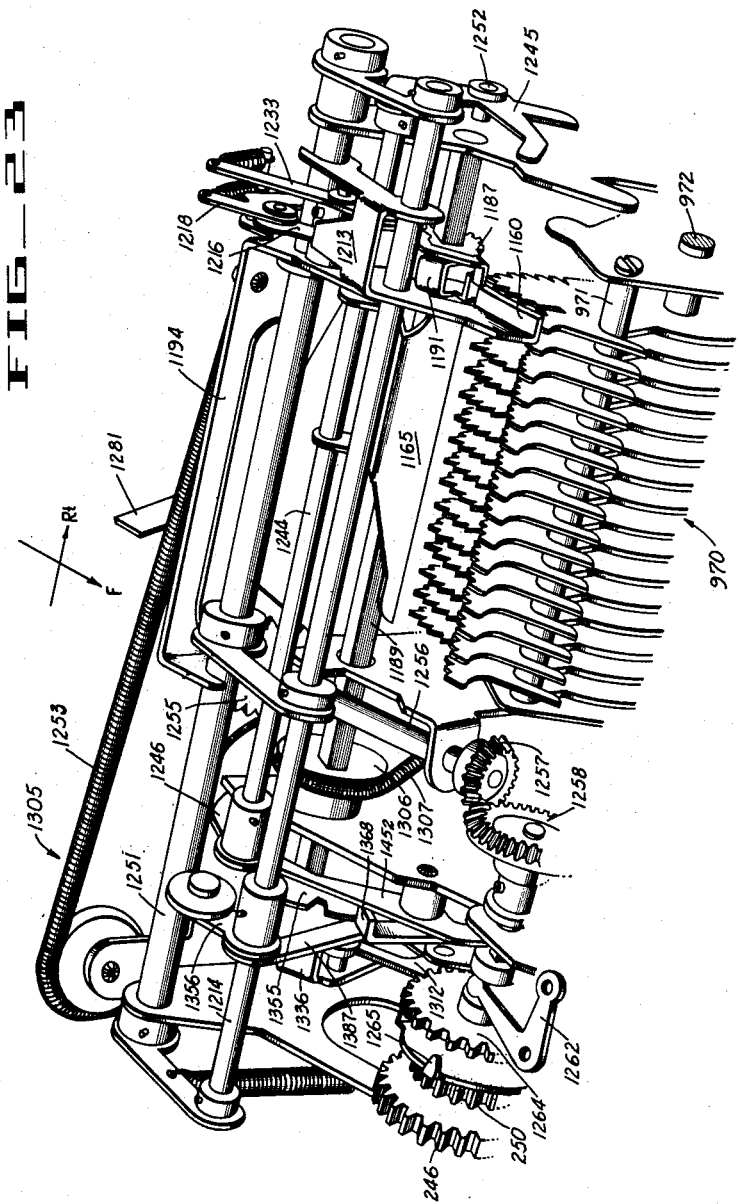

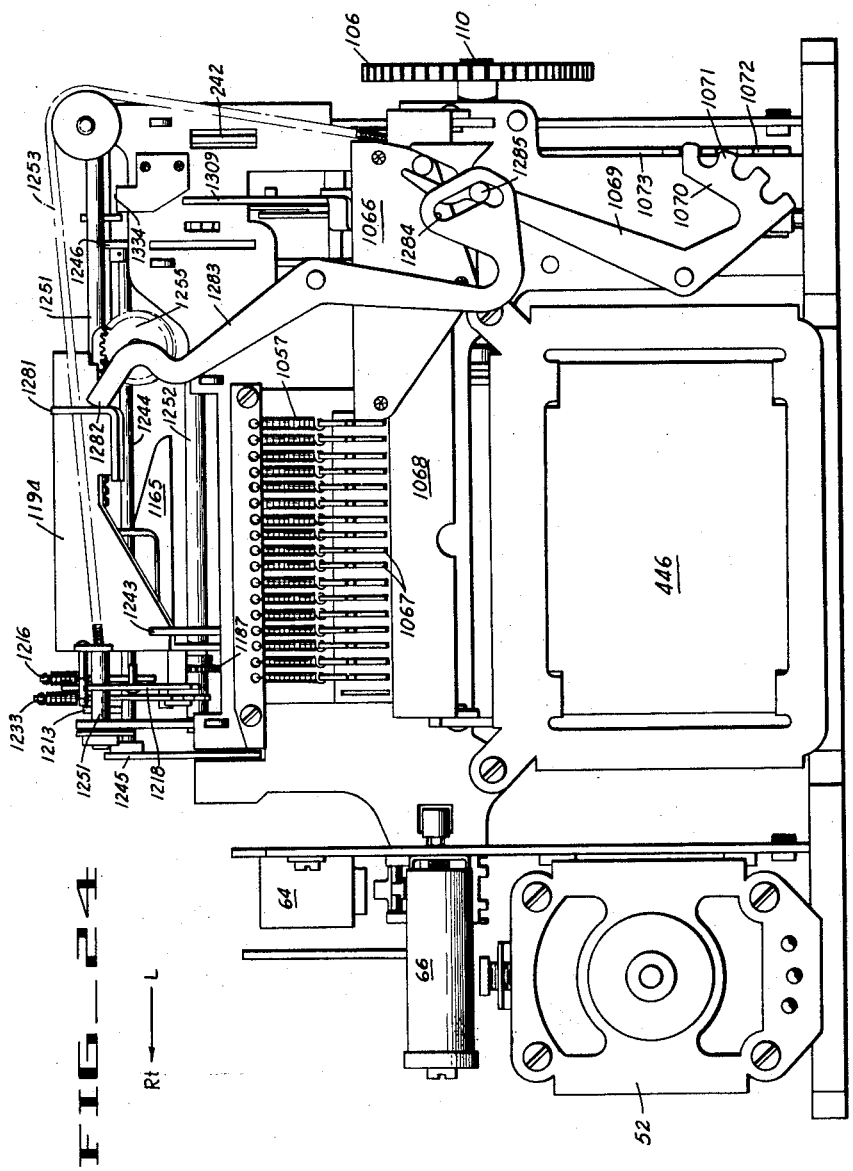

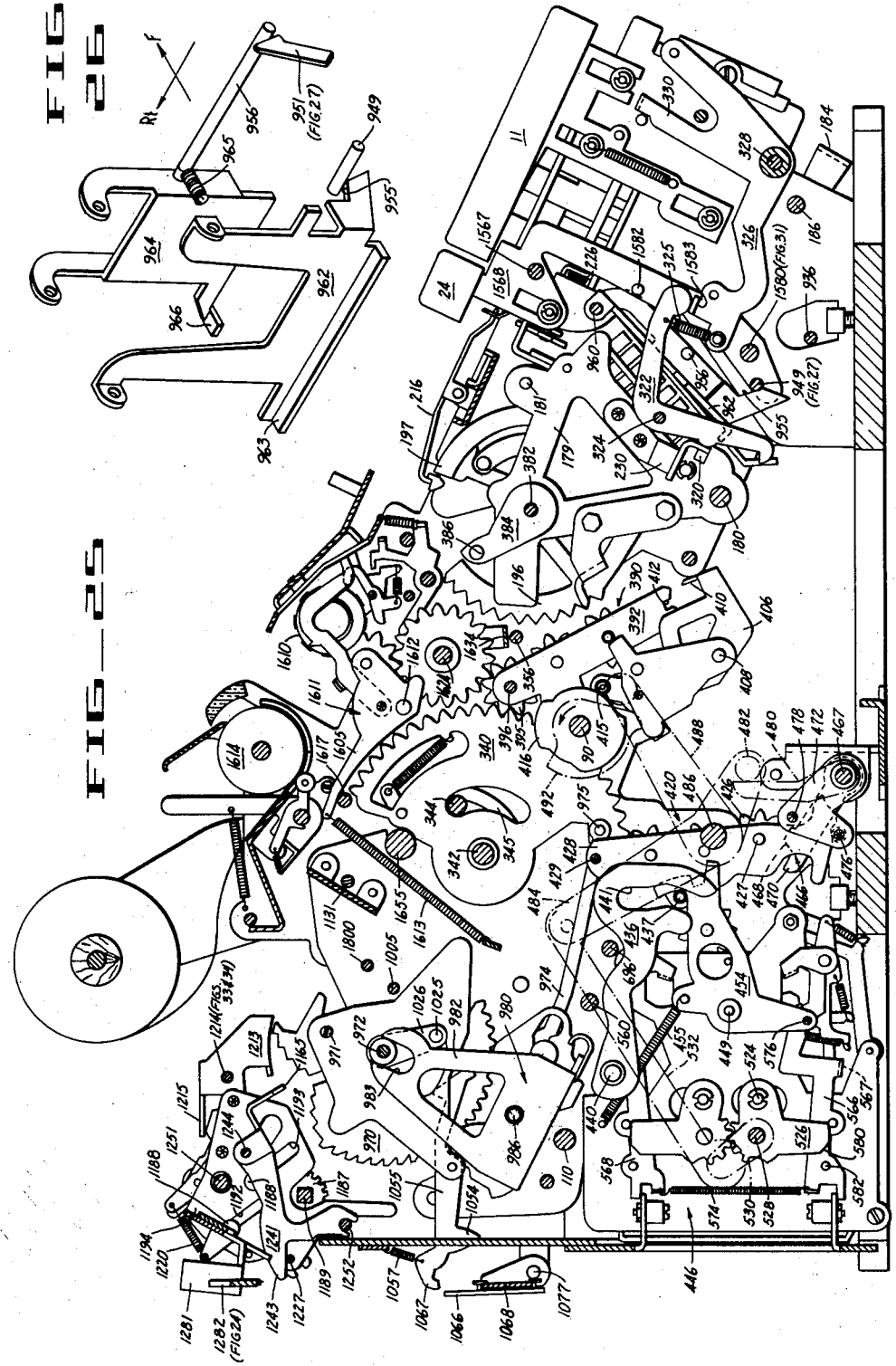

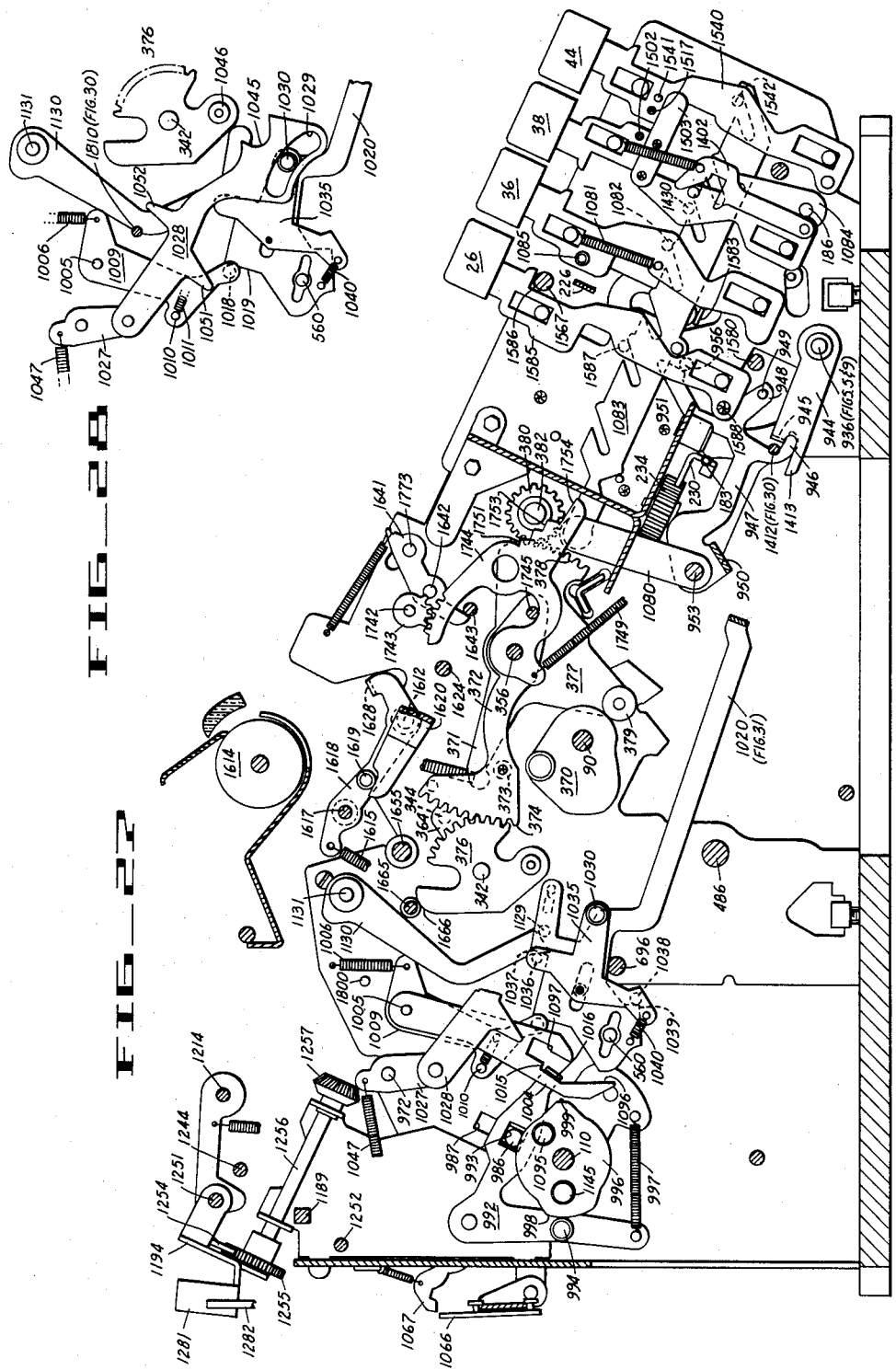

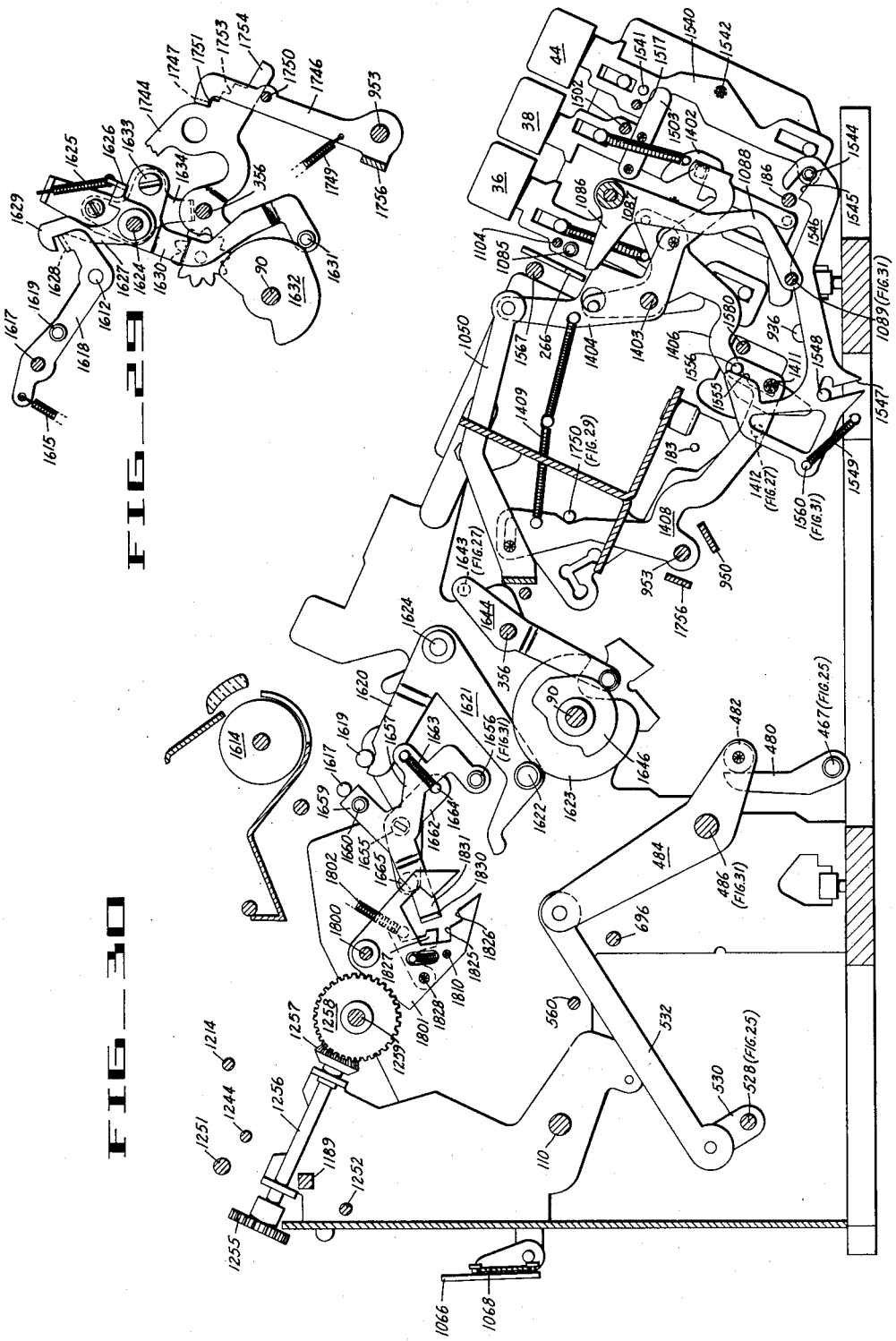

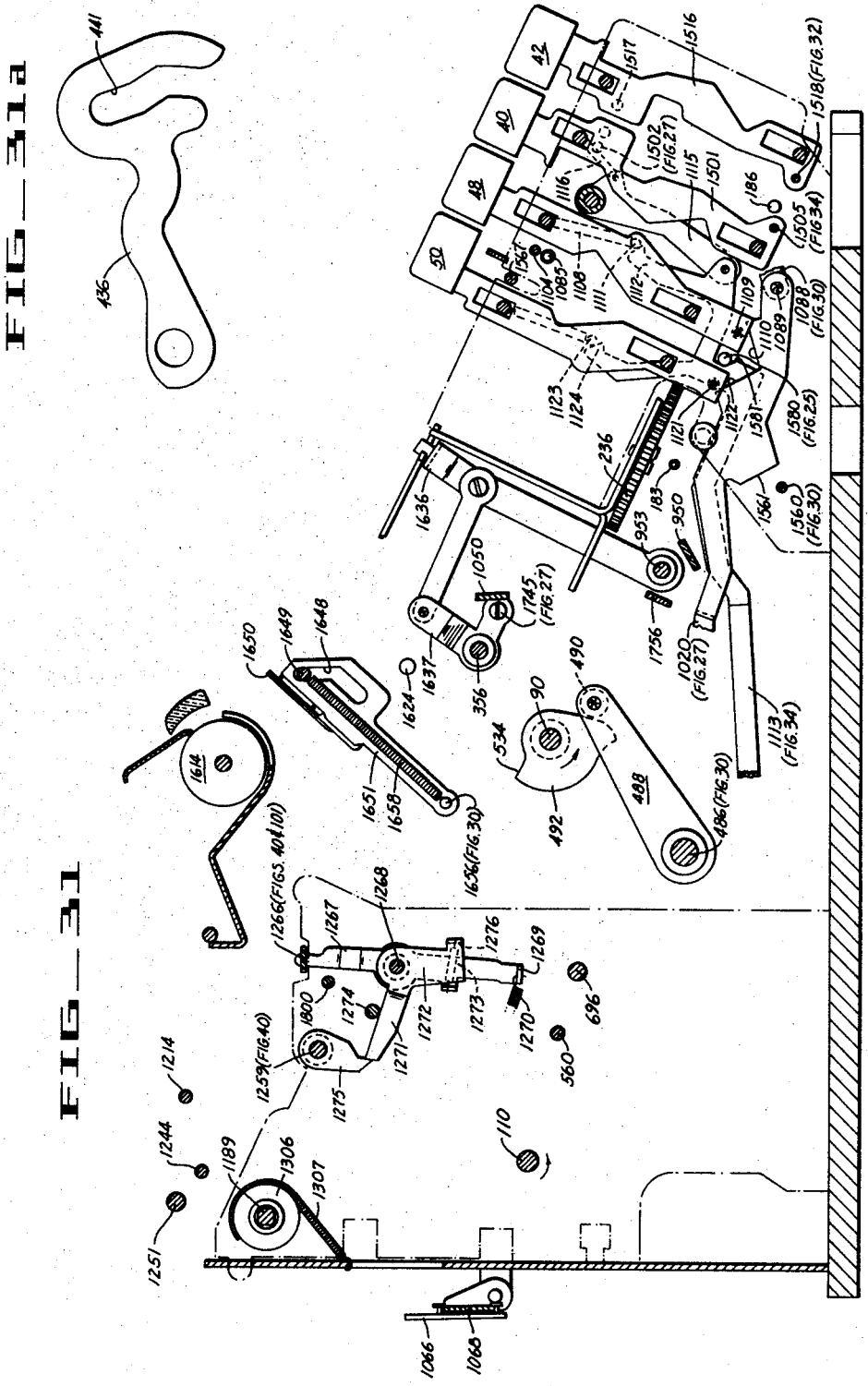

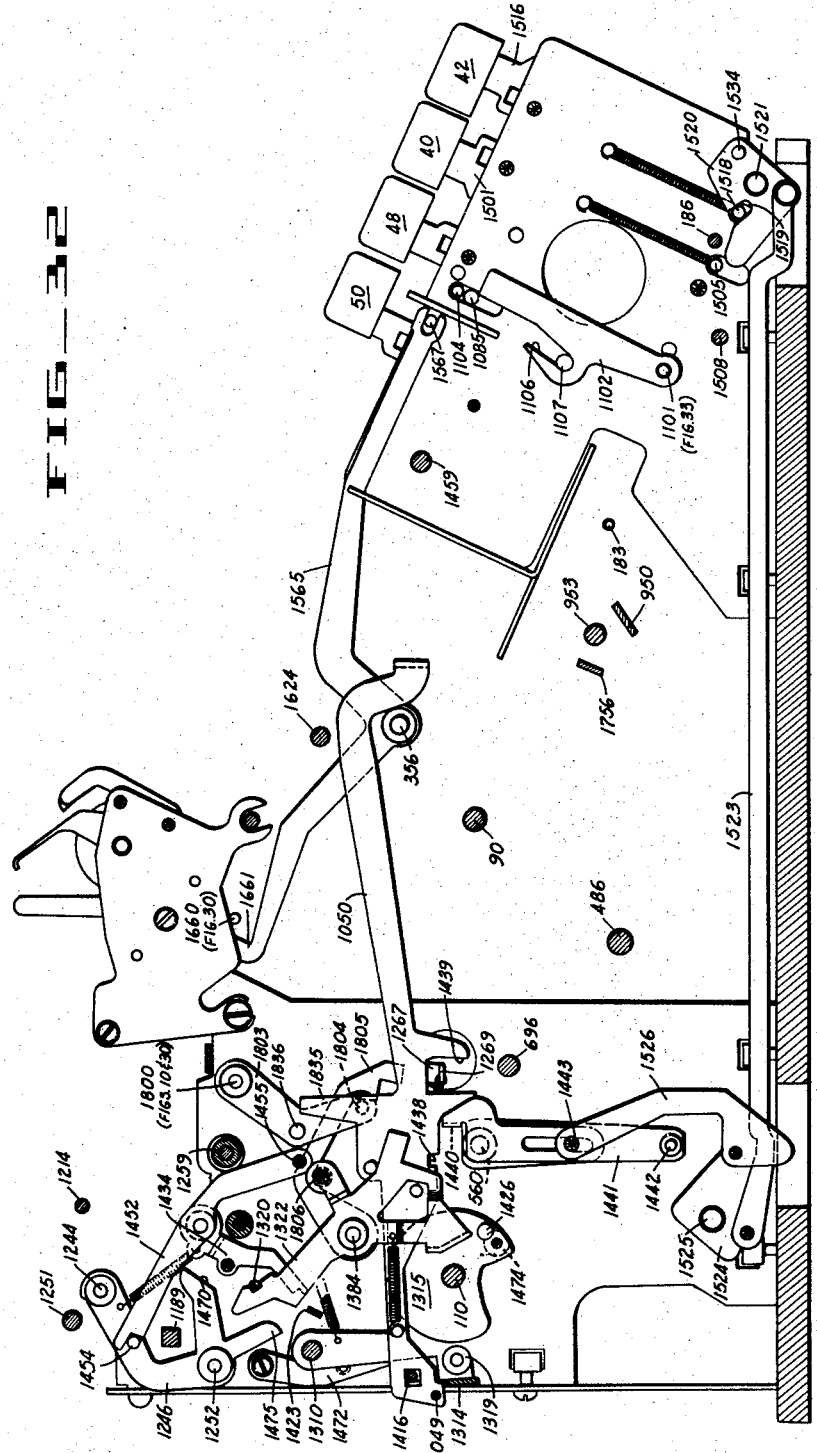

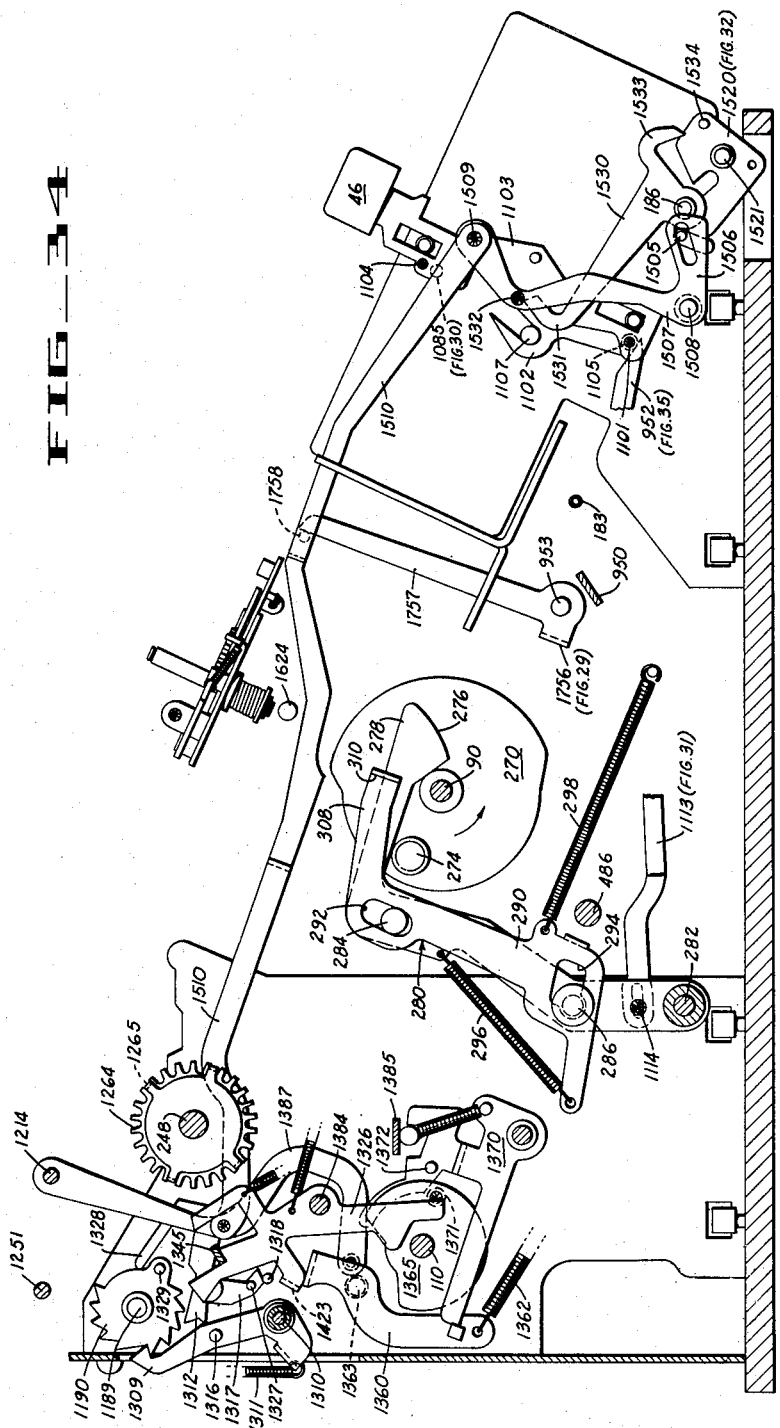

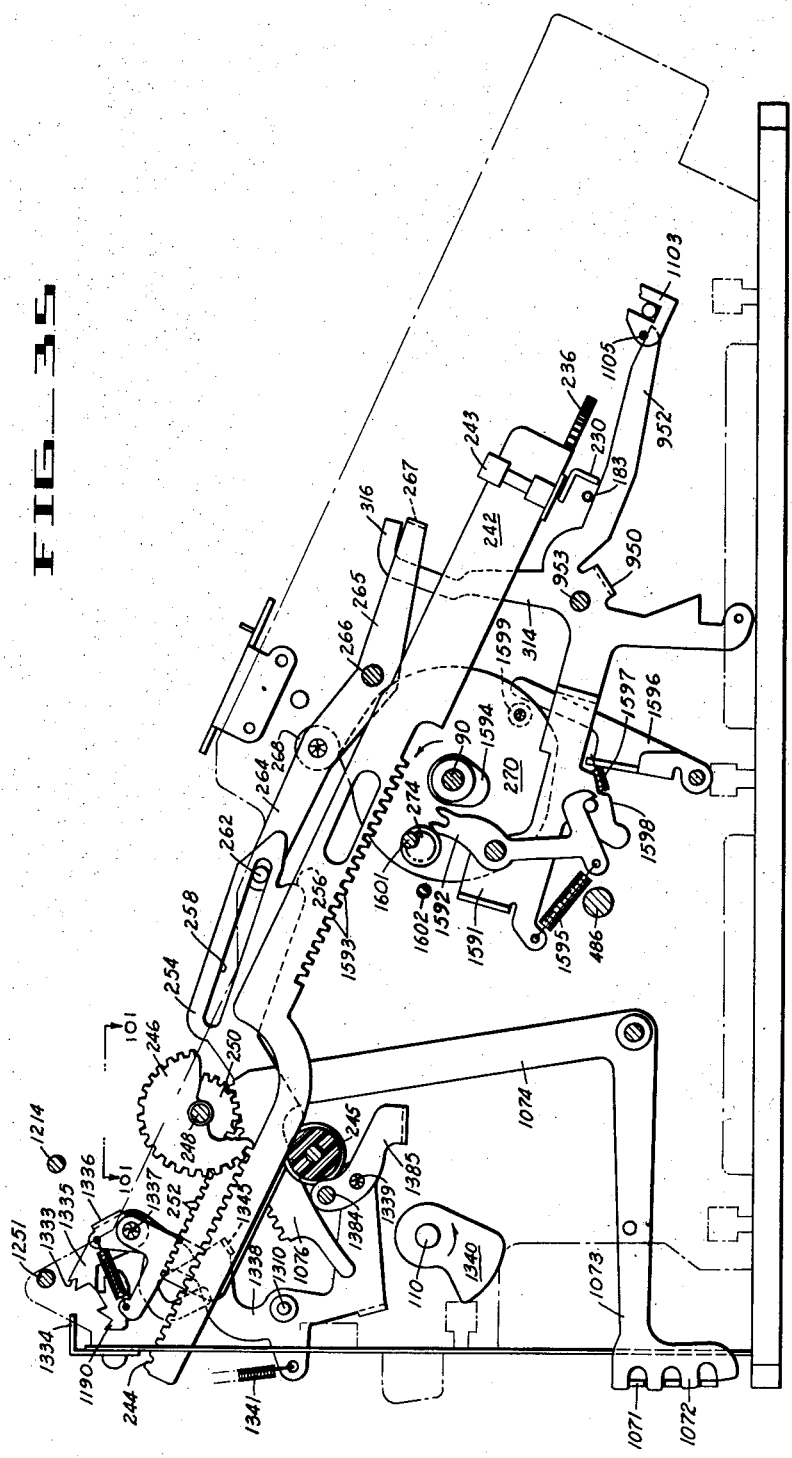

Aug. 25, 1964    H. J. CHALL    3,145,923
MULTIPLIER CONTROL MECHANISM FOR A SHORT
CUT MULTIPLICATION MACHINE
Filed Sept. 18, 1961    51 Sheets-Sheet 23
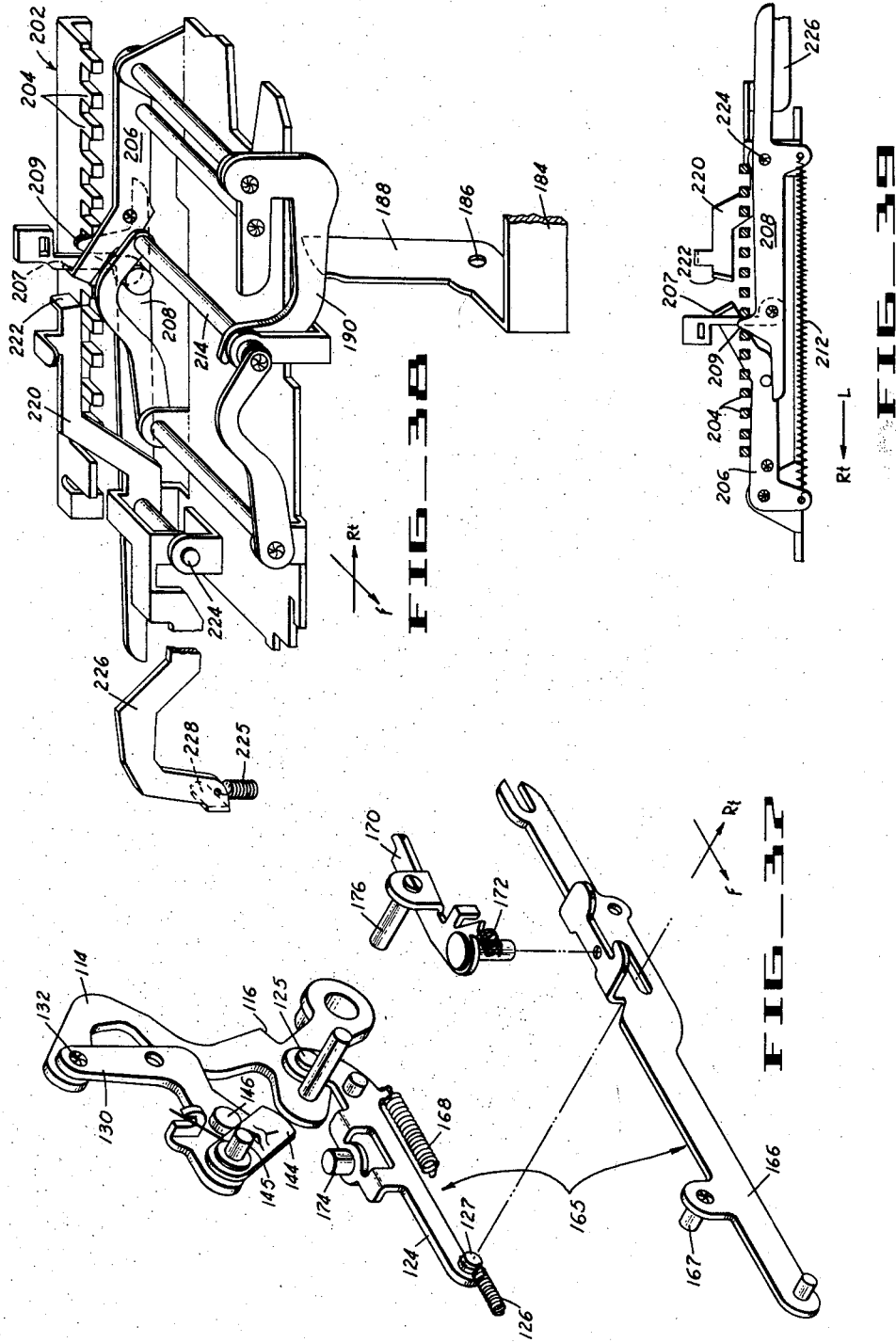

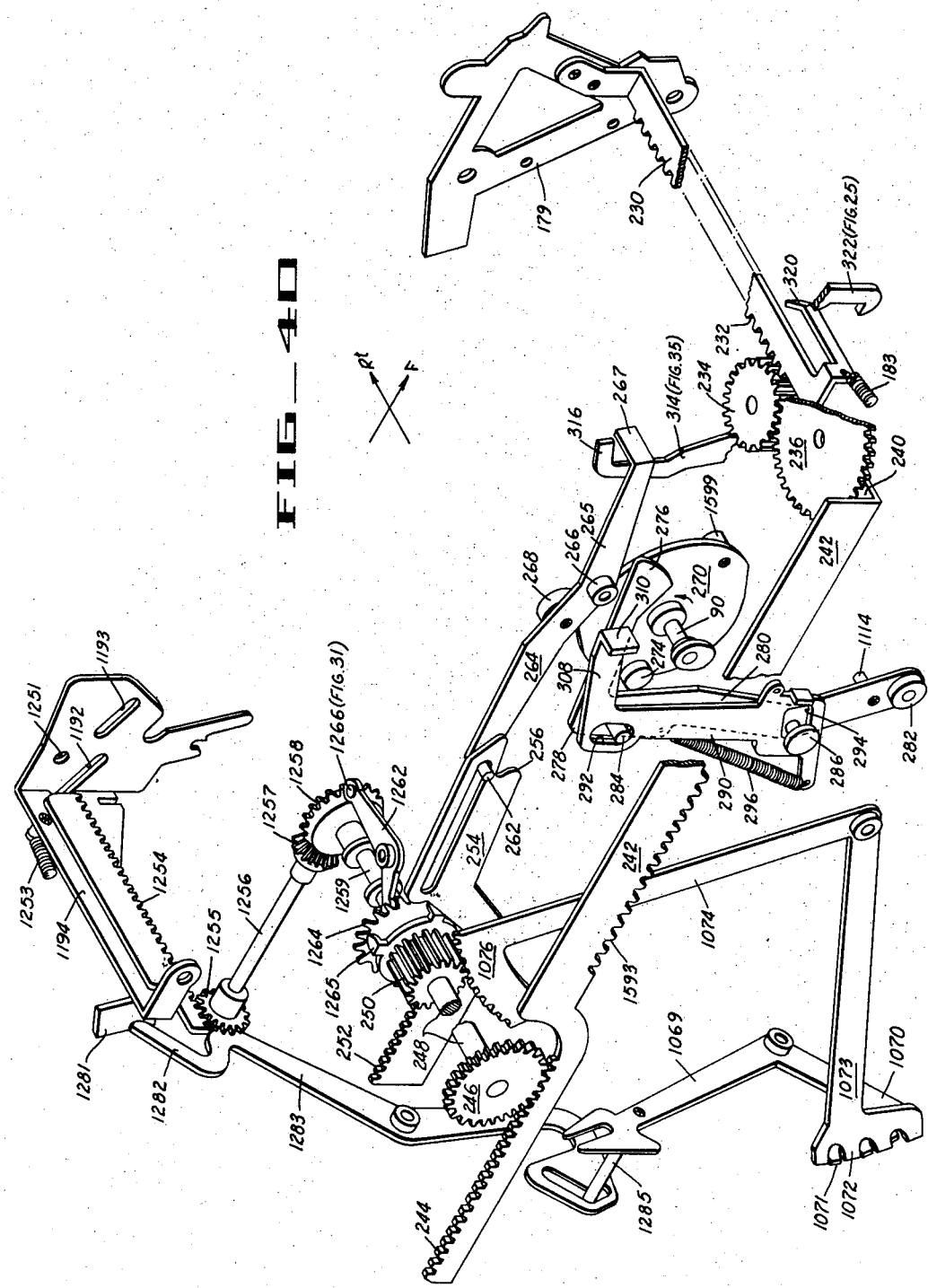

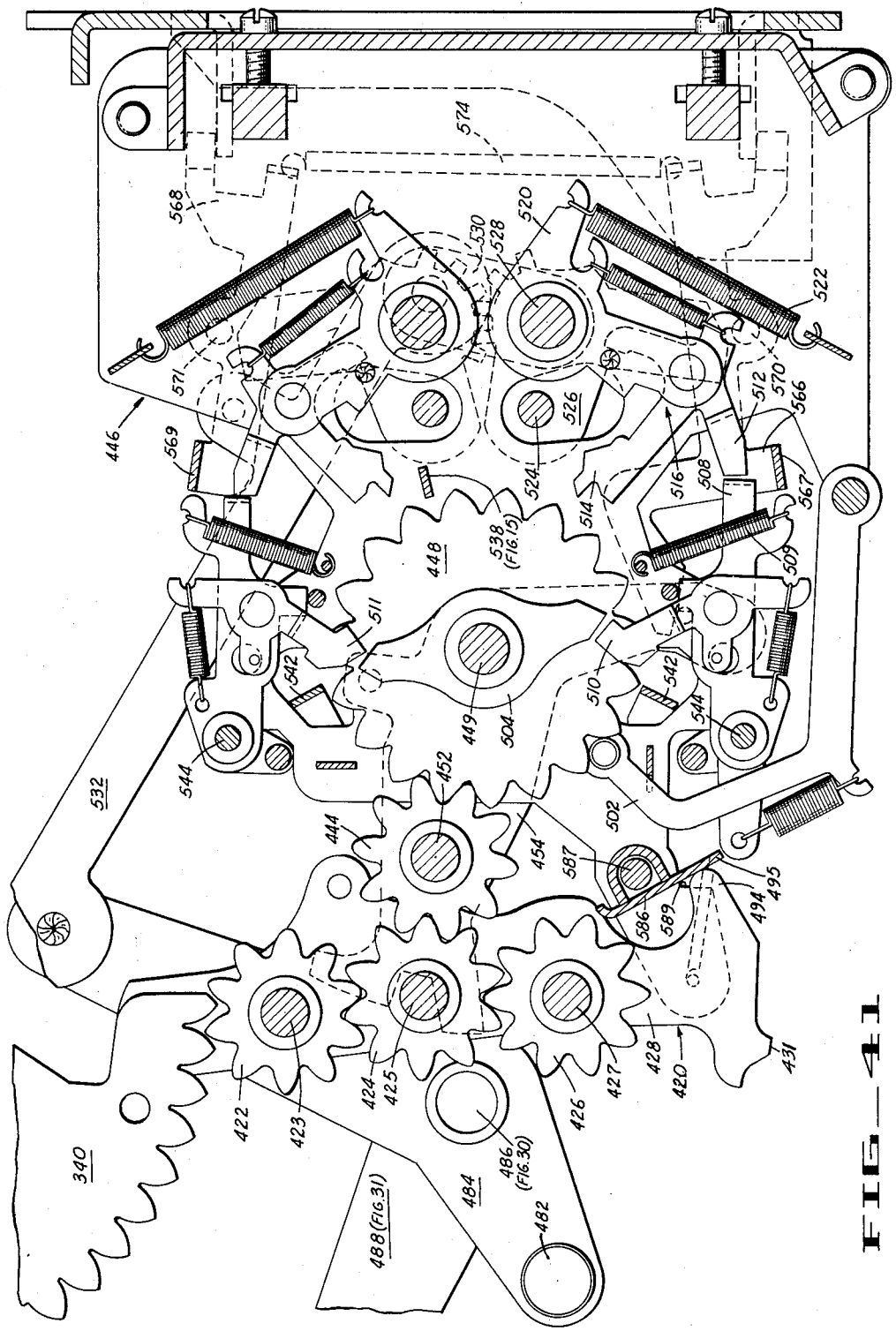

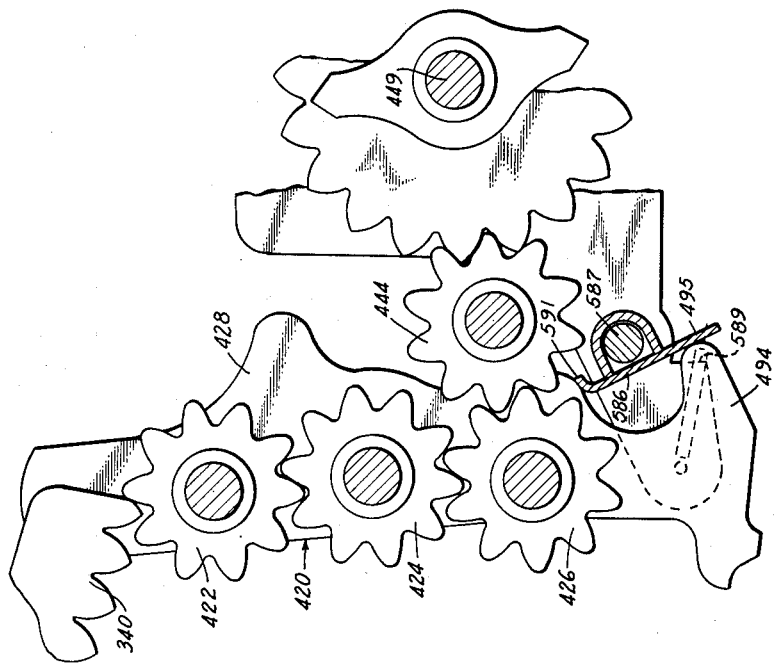
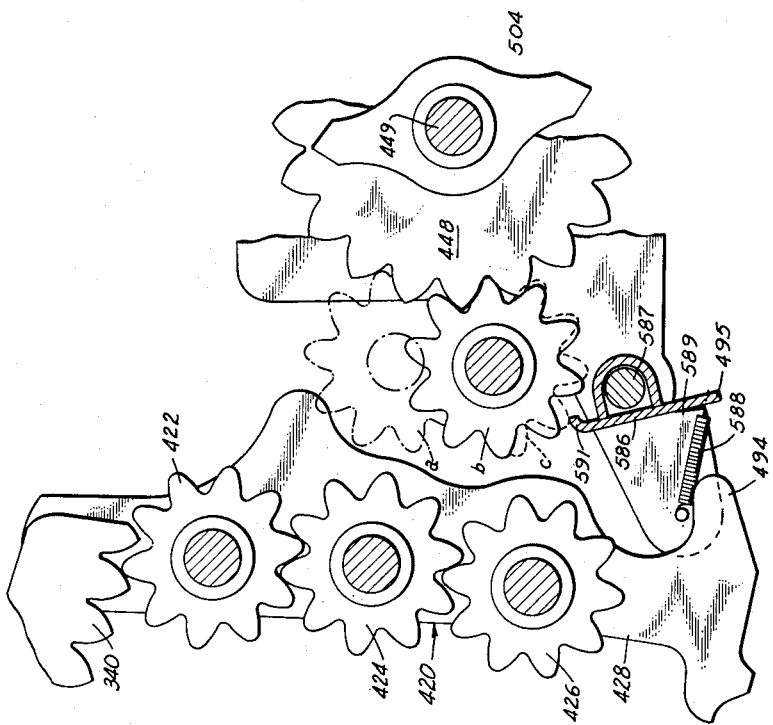

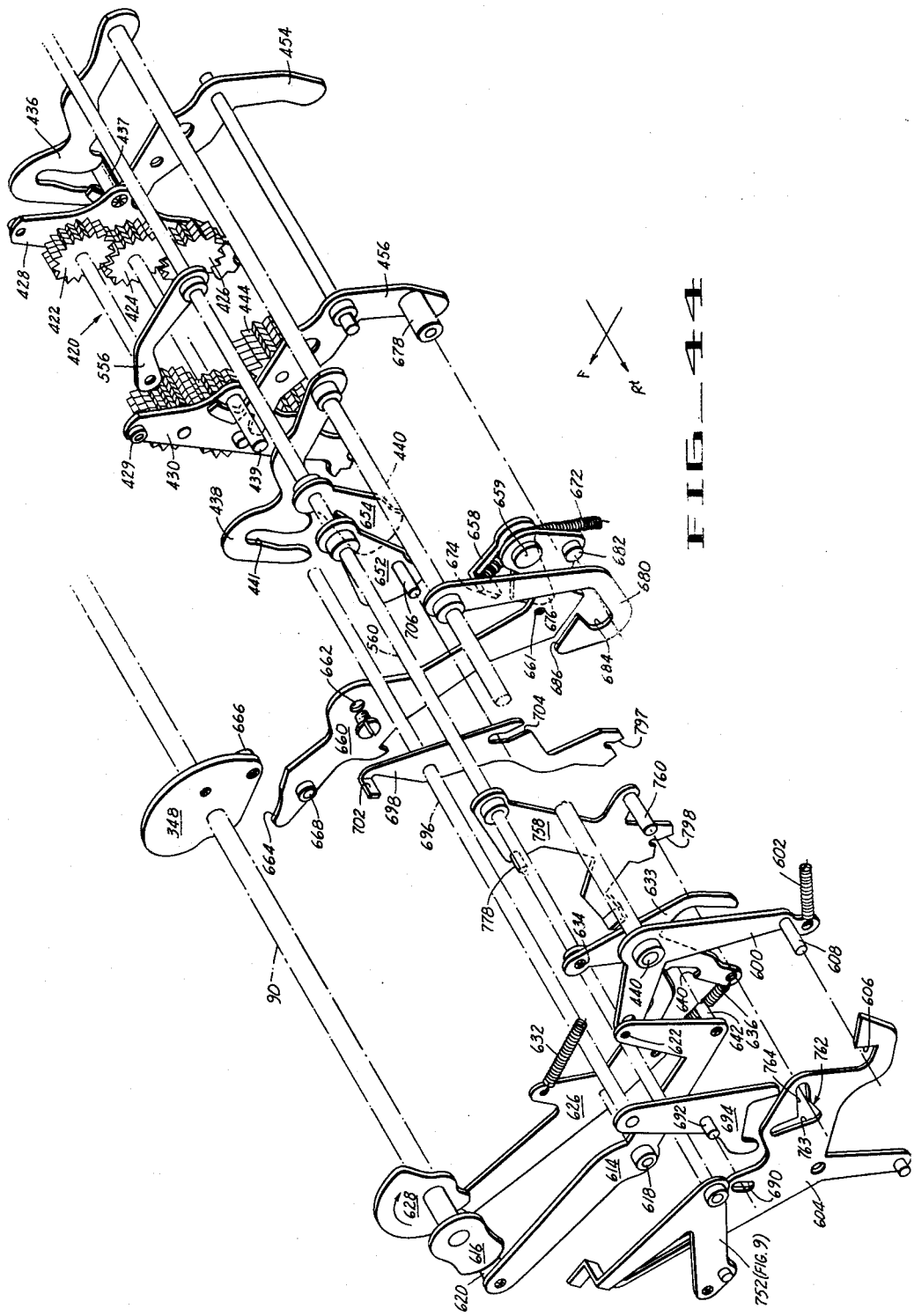

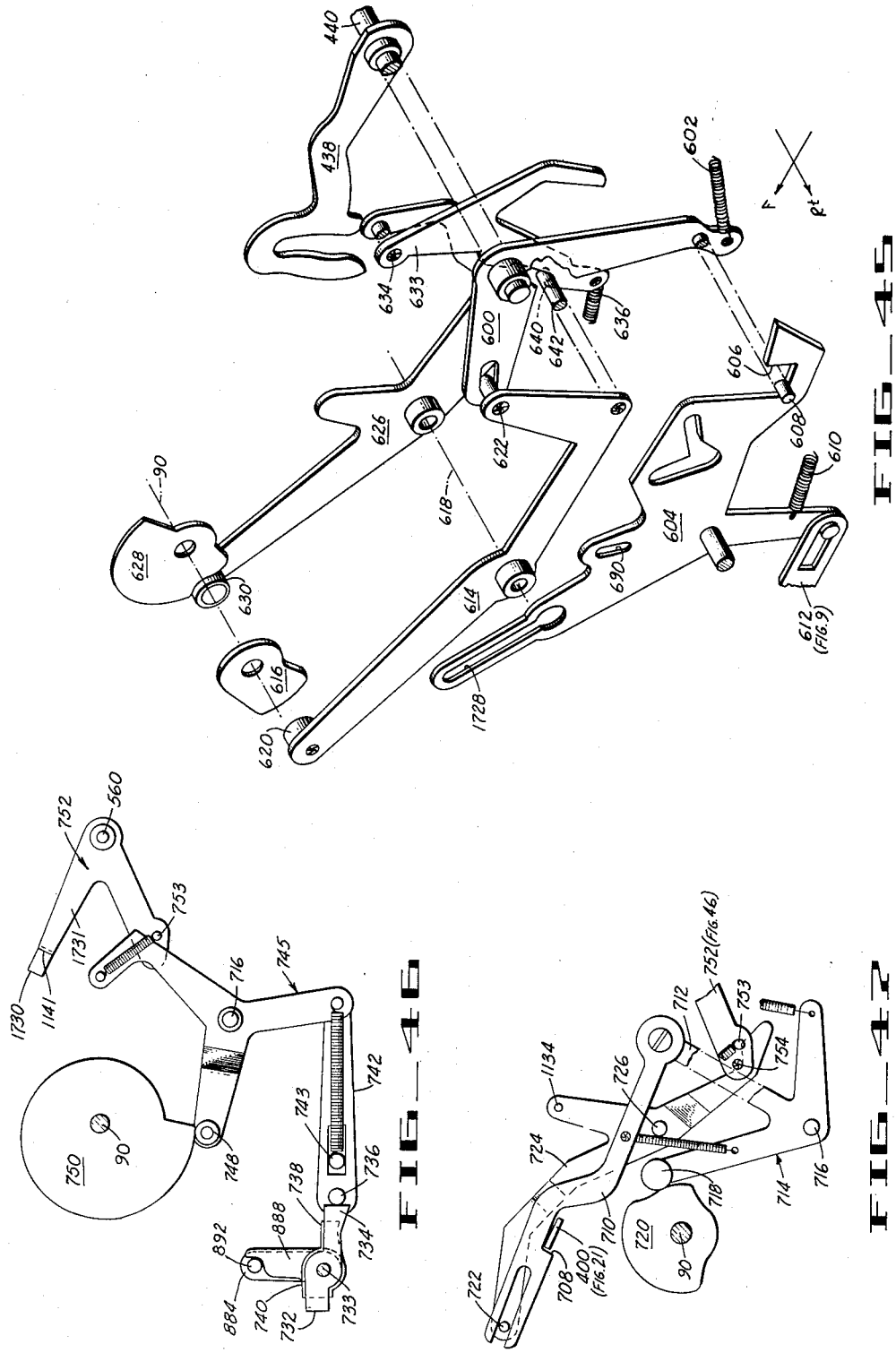

Aug. 25, 1964 H. J. CHALL 3,145,923
MULTIPLIER CONTROL MECHANISM FOR A SHORT
CUT MULTIPLICATION MACHINE
Filed Sept. 18, 1961 51 Sheets-Sheet 29
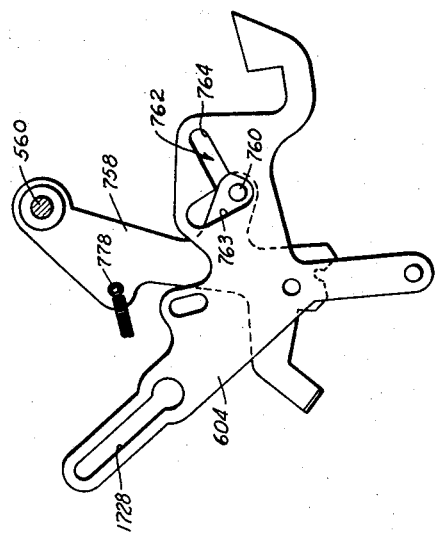
FIG_49
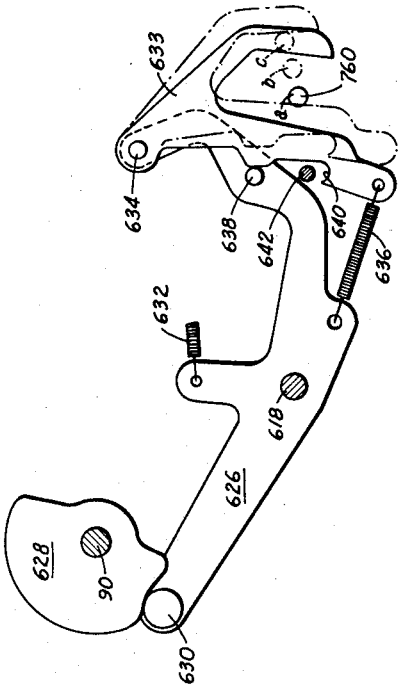
FIG_50
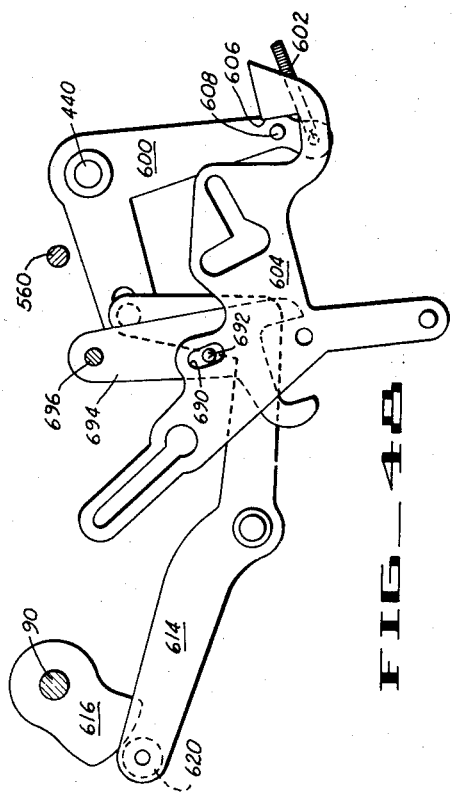
FIG_48
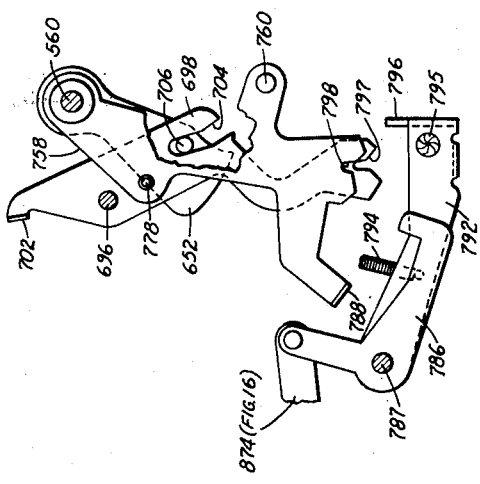
FIG_51

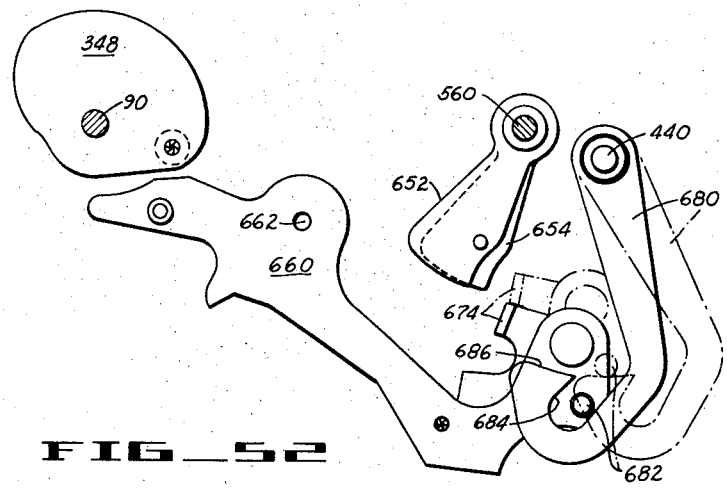
FIG_52
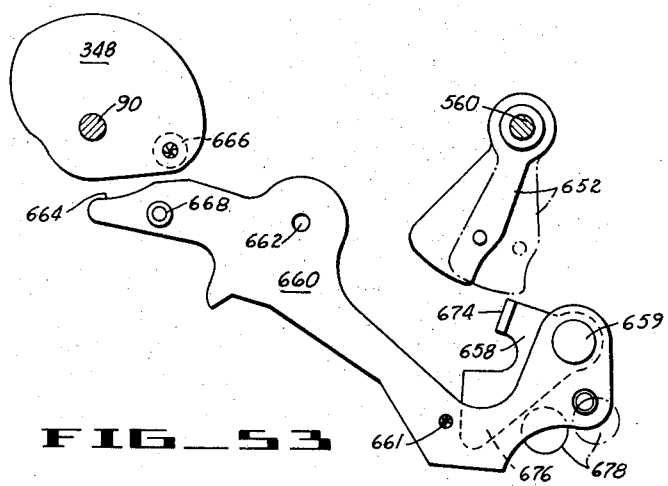
FIG_53
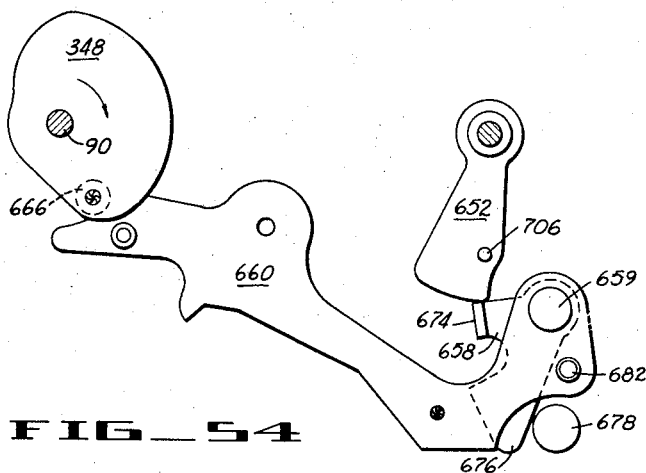
FIG_54

Aug. 25, 1964
H. J. CHALL
3,145,923
MULTIPLIER CONTROL MECHANISM FOR A SHORT
CUT MULTIPLICATION MACHINE
Filed Sept. 18, 1961
51 Sheets-Sheet 31
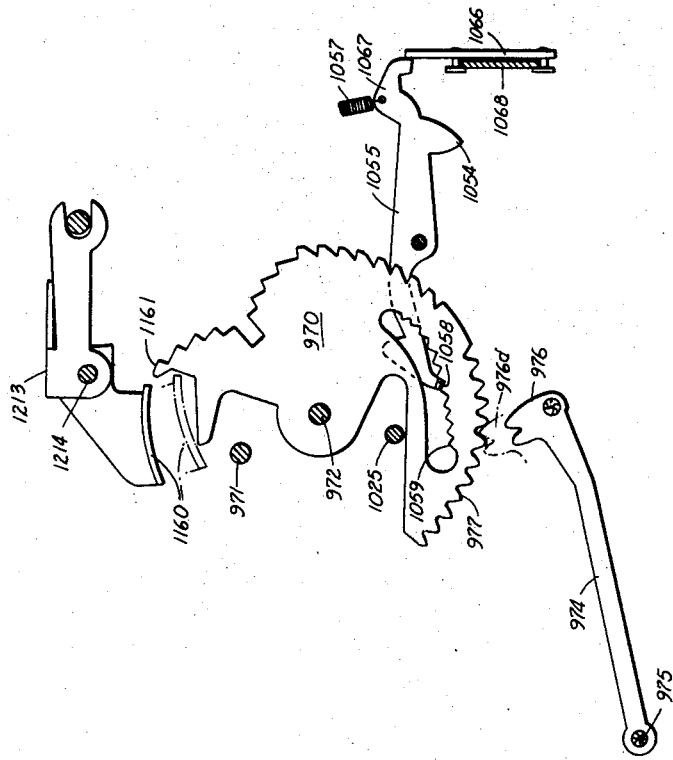
FIG_56
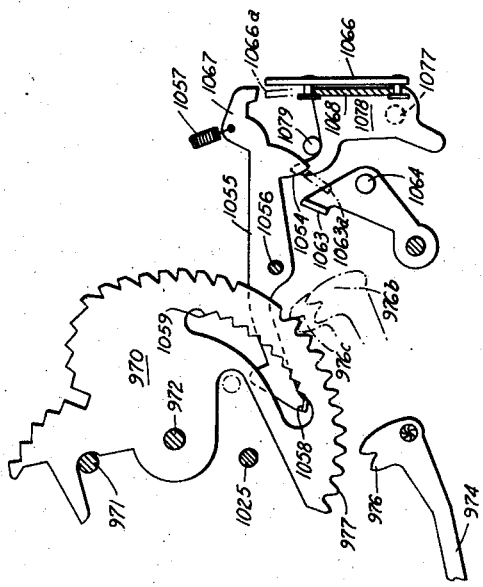
FIG_55

Aug. 25, 1964    H. J. CHALL    3,145,923
MULTIPLIER CONTROL MECHANISM FOR A SHORT
CUT MULTIPLICATION MACHINE
Filed Sept. 18, 1961    51 Sheets-Sheet 32
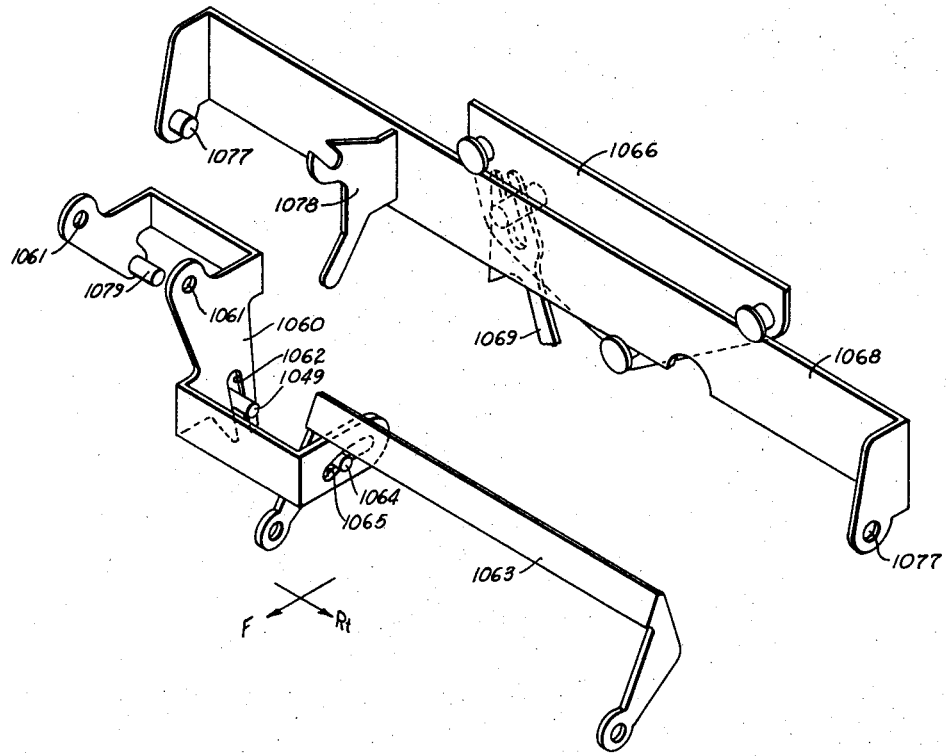
FIG_57
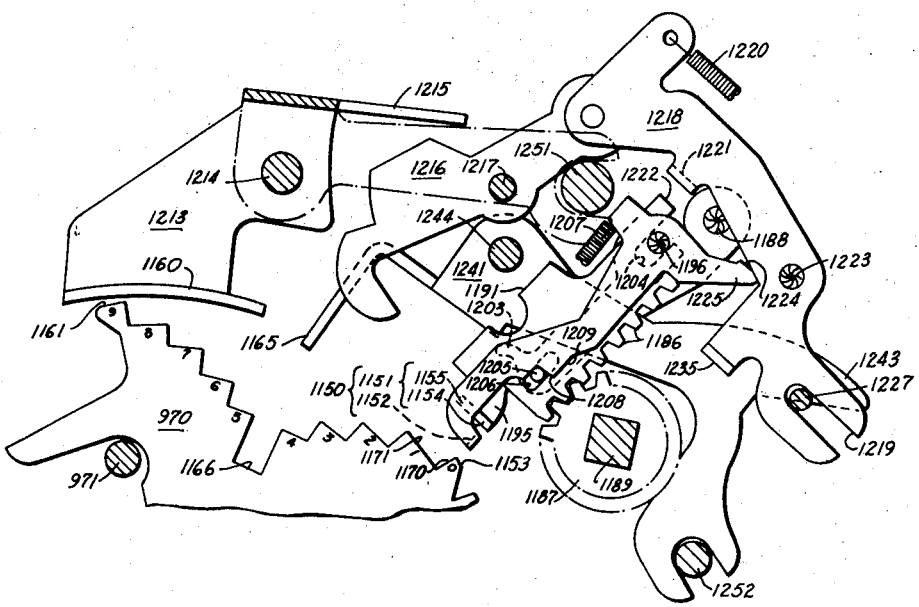
FIG_58

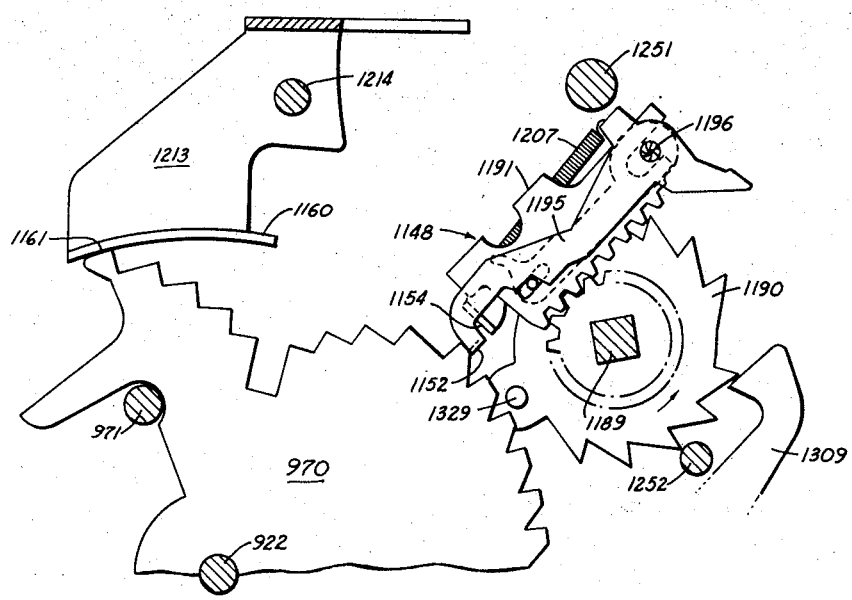
FIG_59
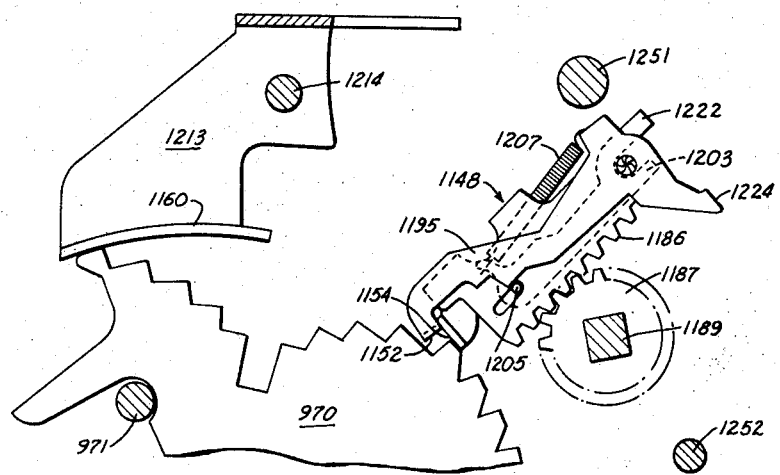
FIG_60

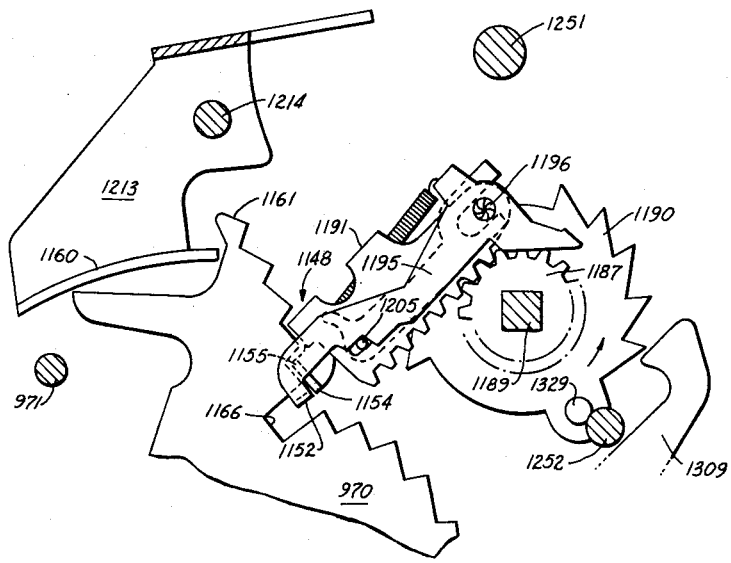
FIG_61
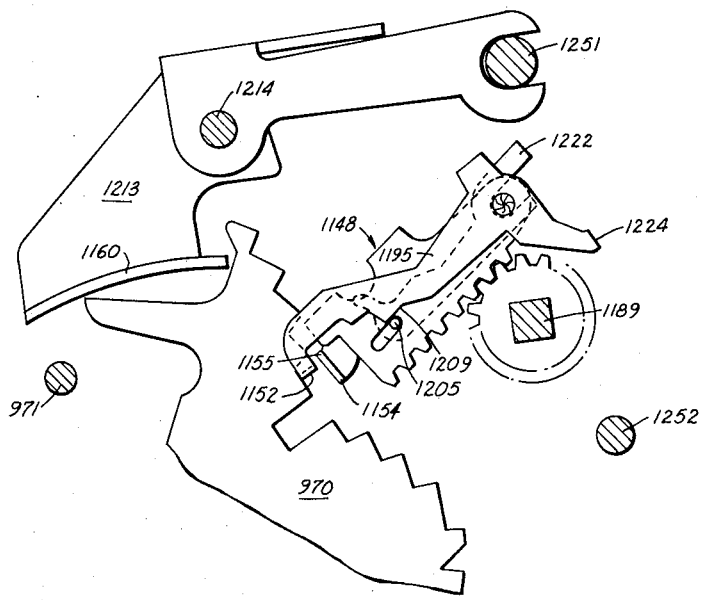
FIG_62

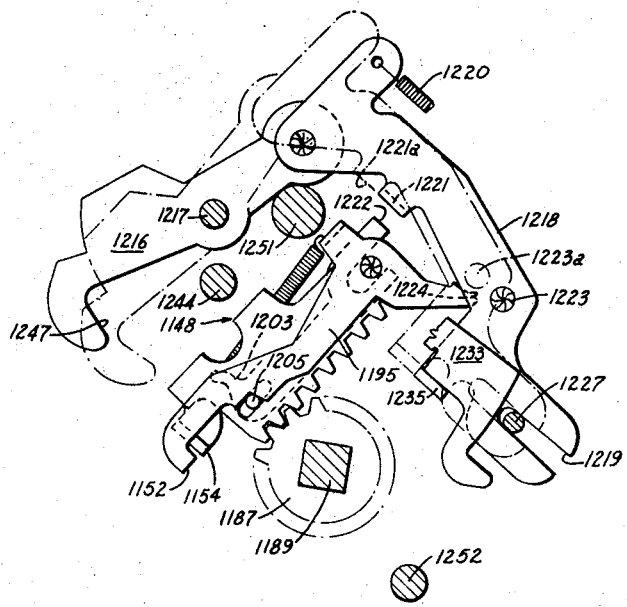
FIG_63
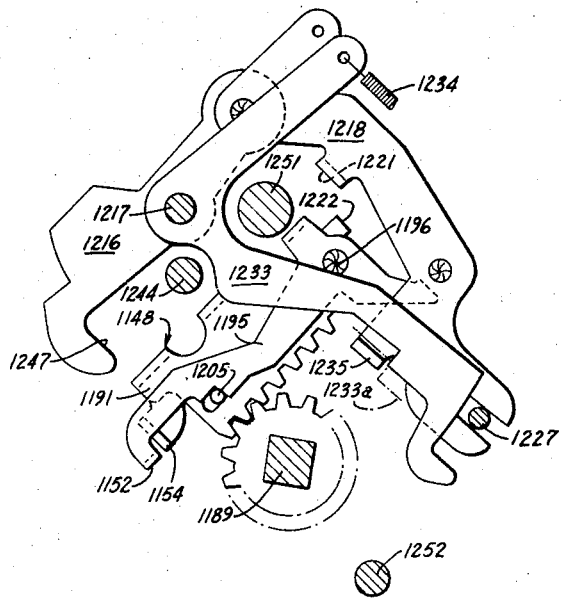
FIG_64

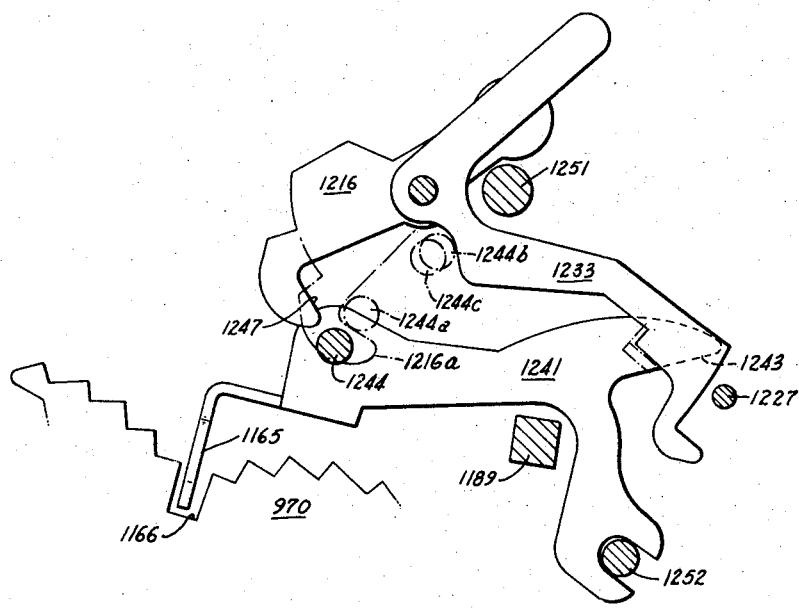
FIG_66
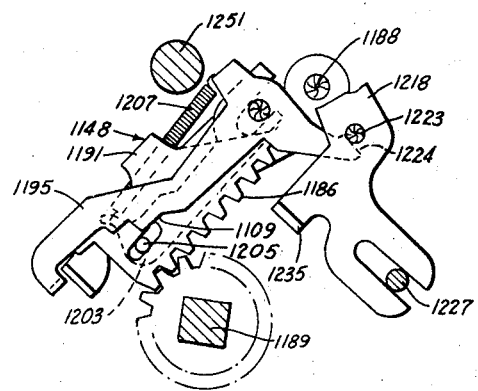
FIG_65

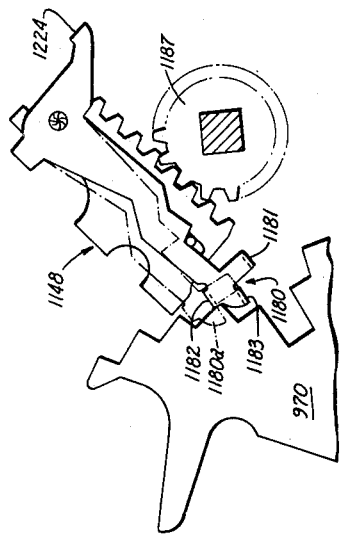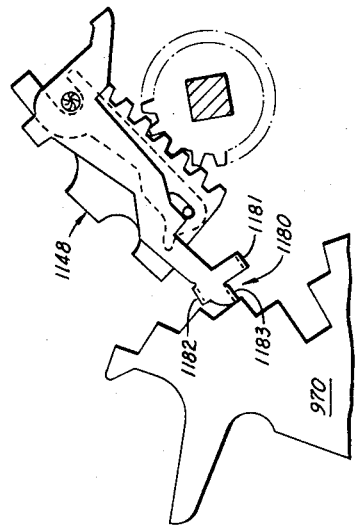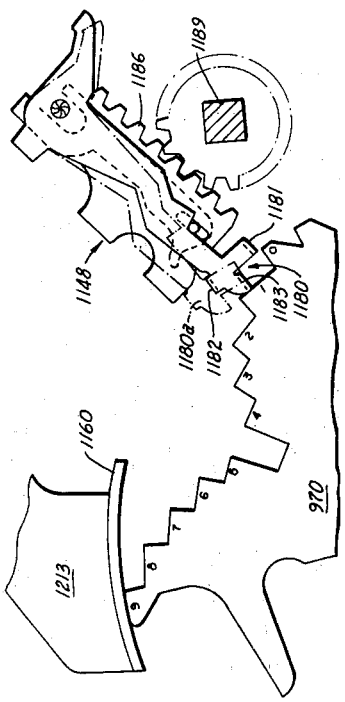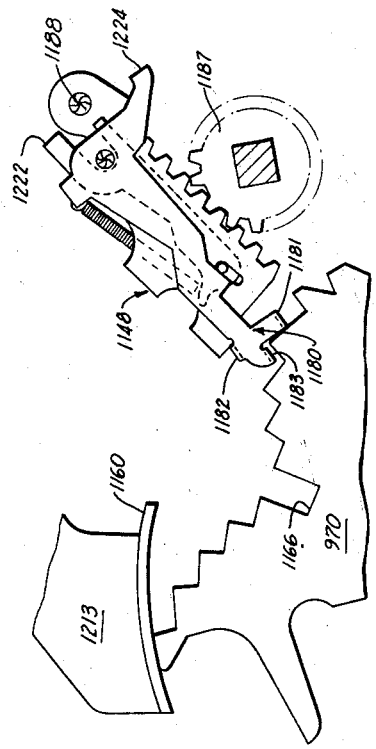

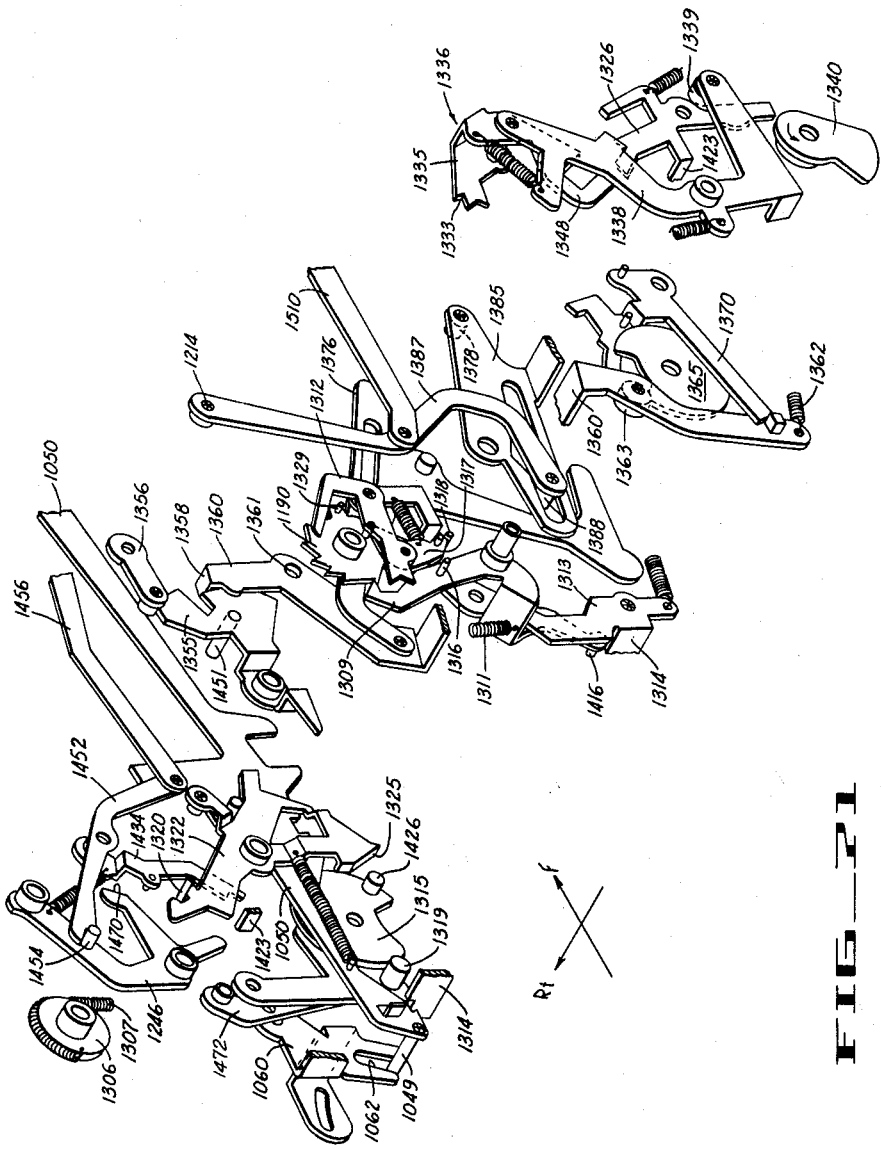

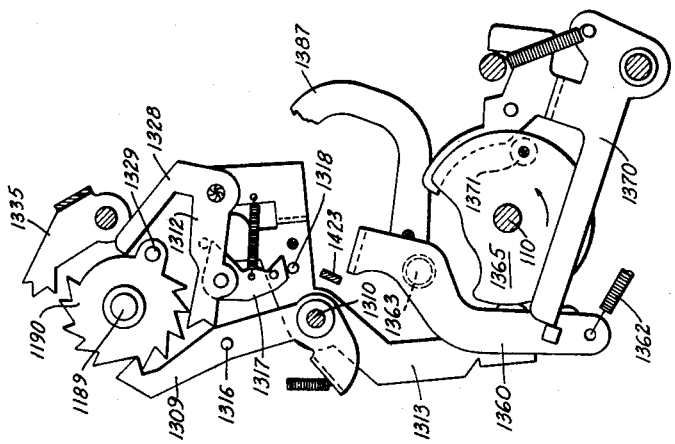
FIG_74
FIG_73
FIG_72

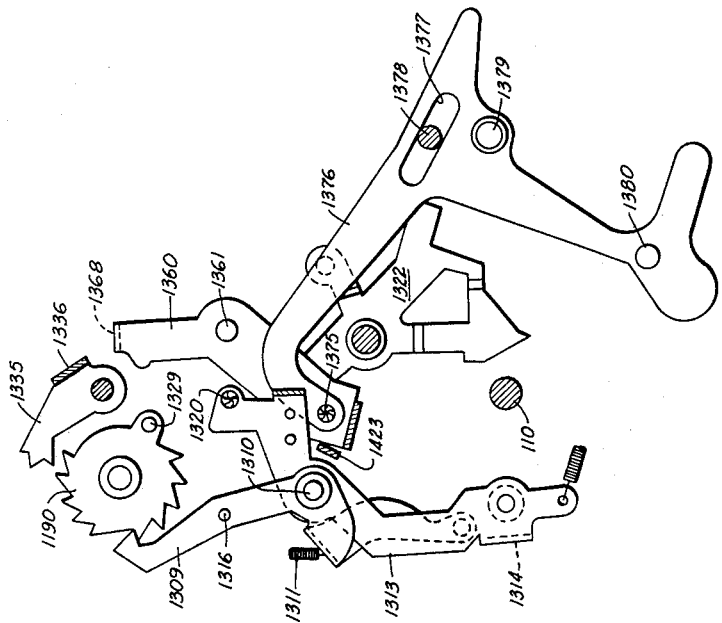
FIG_76
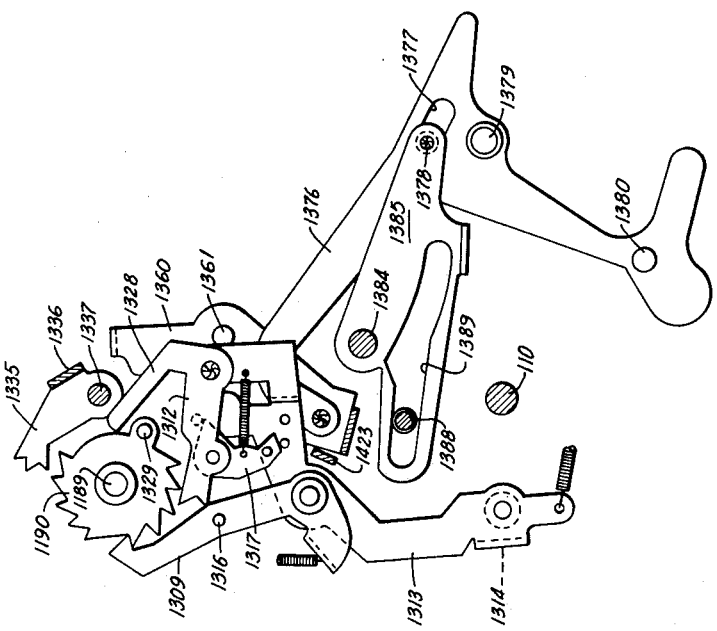
FIG_75

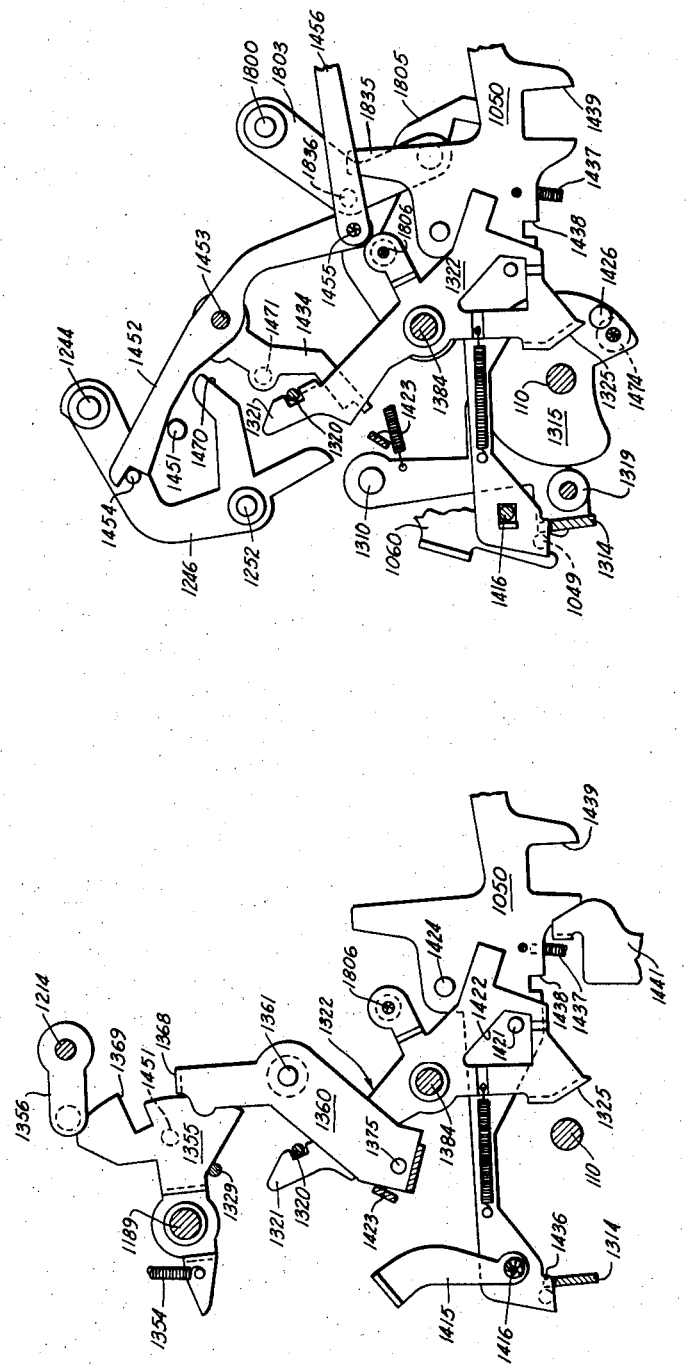

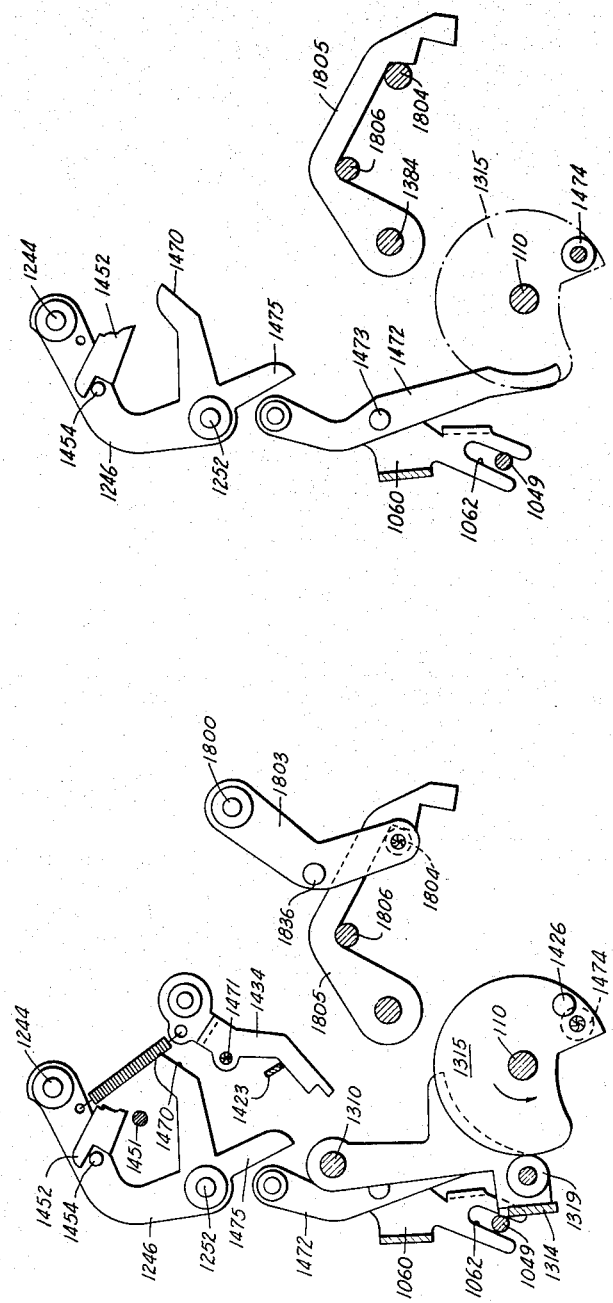

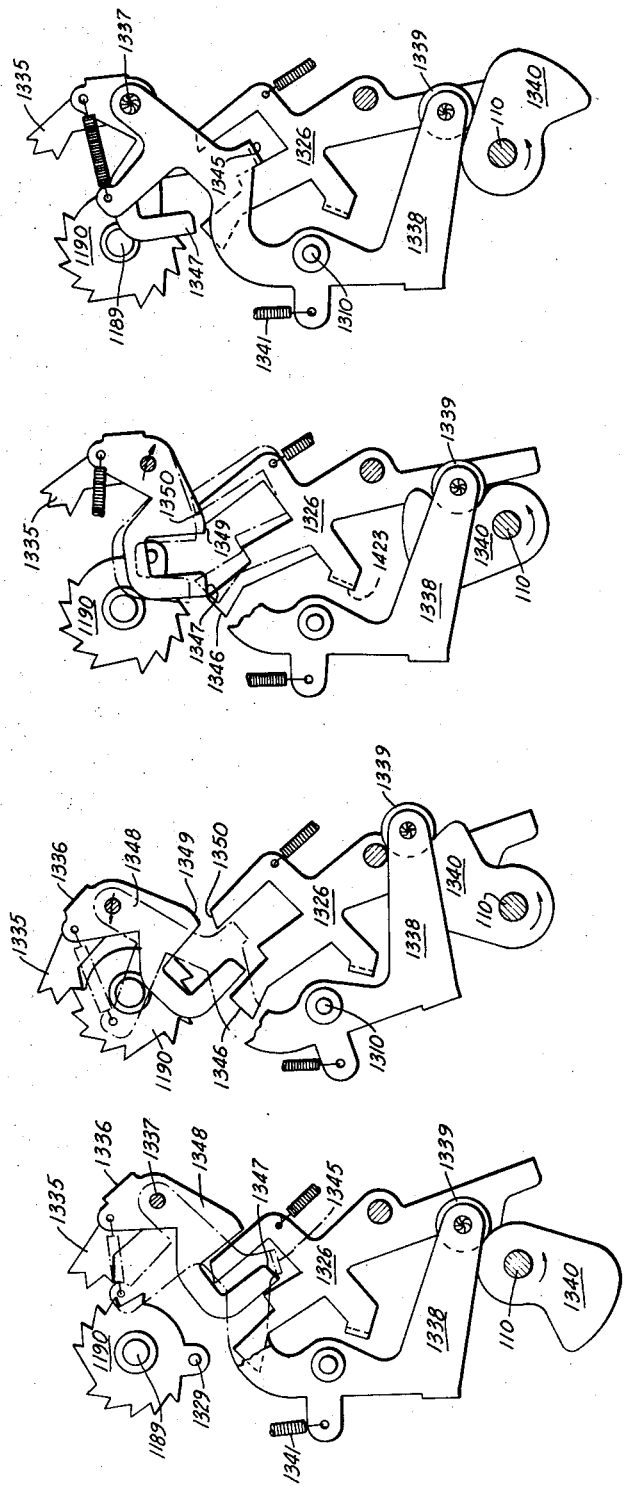

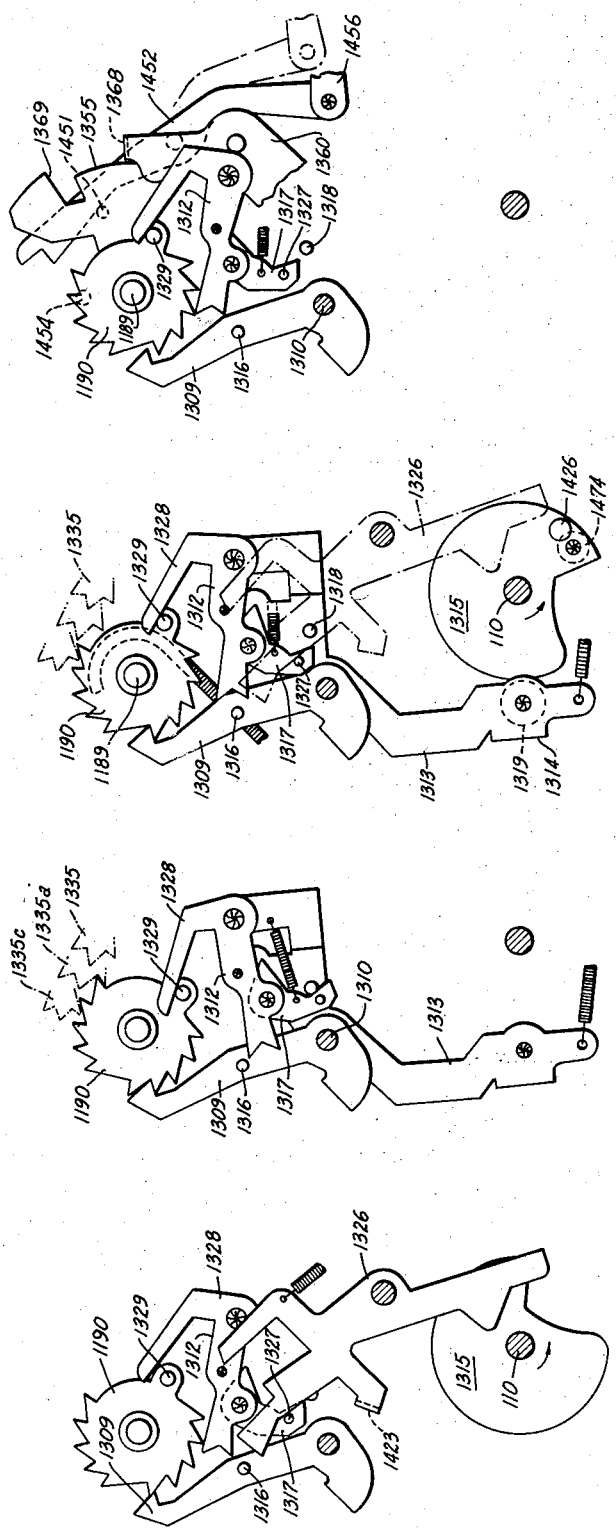
FIG_85  FIG_86  FIG_87  FIG_88

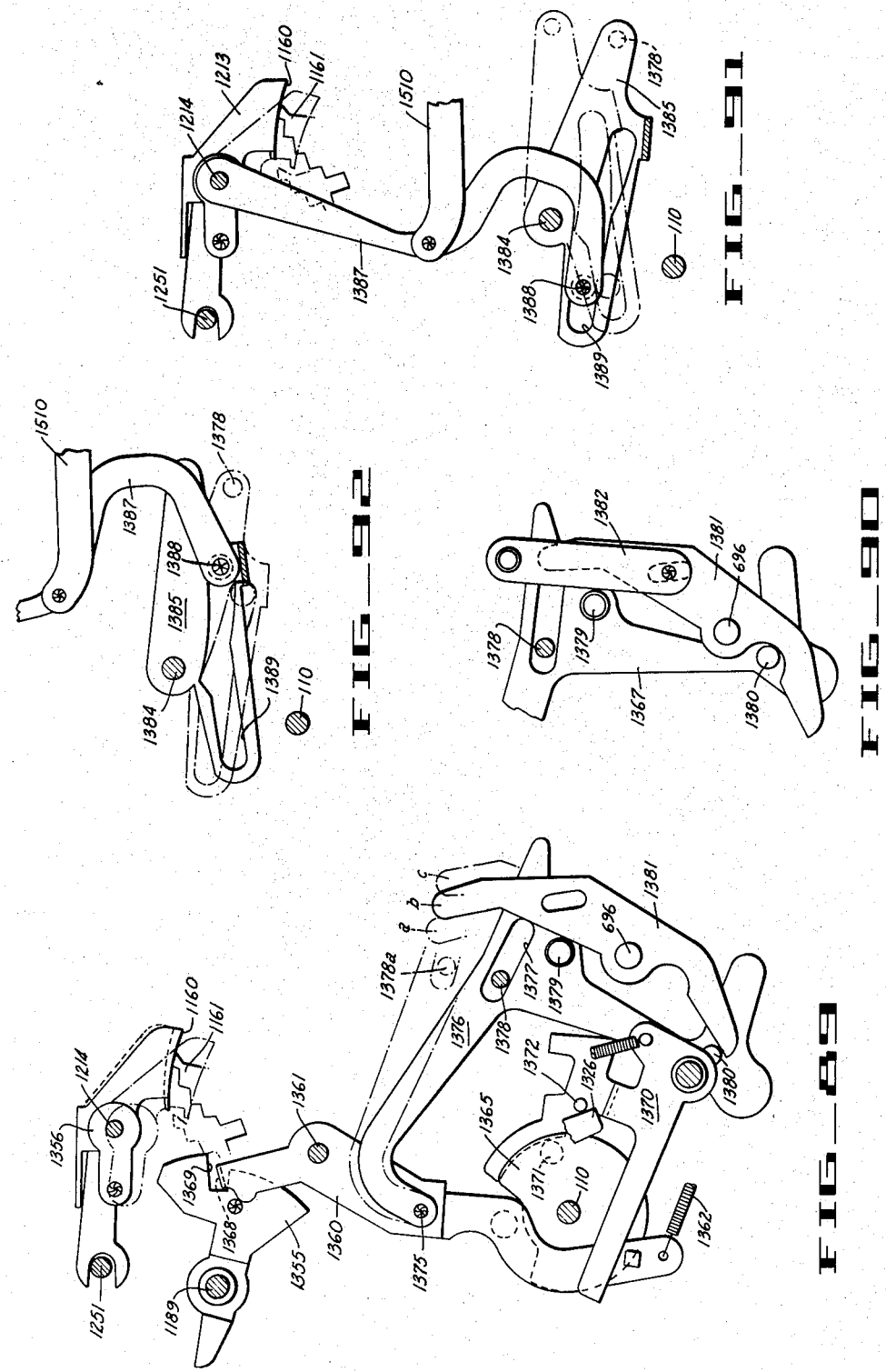

Aug. 25, 1964  H. J. CHALL  3,145,923
MULTIPLIER CONTROL MECHANISM FOR A SHORT
CUT MULTIPLICATION MACHINE
Filed Sept. 18, 1961  51 Sheets-Sheet 46
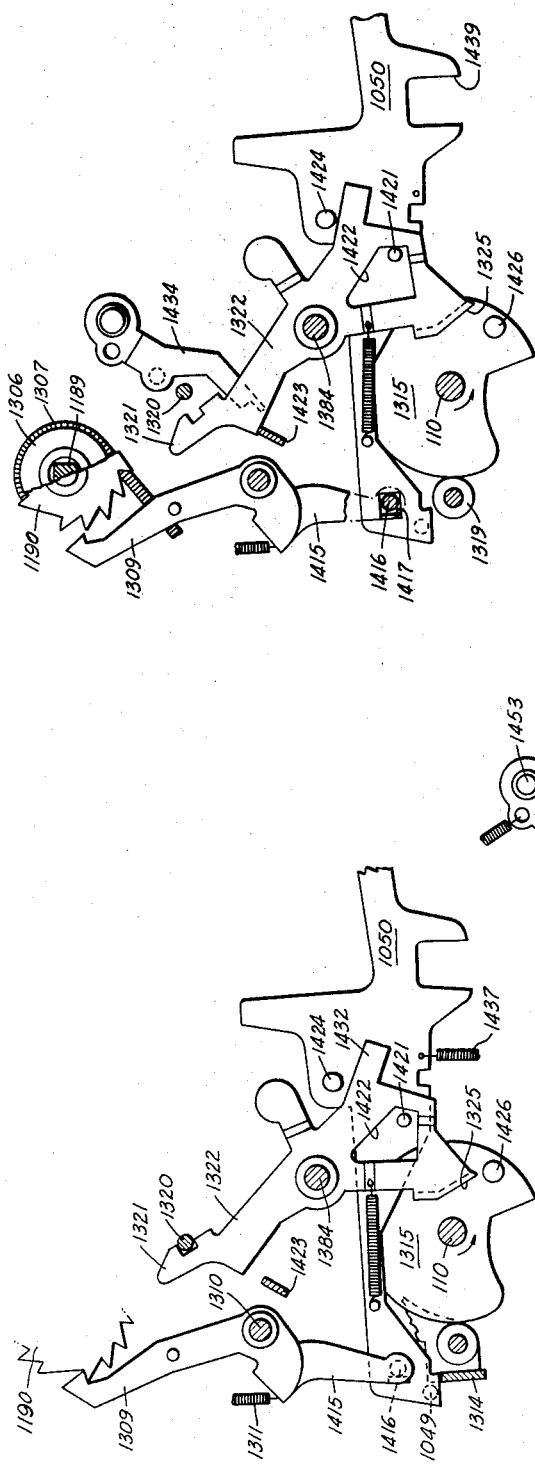

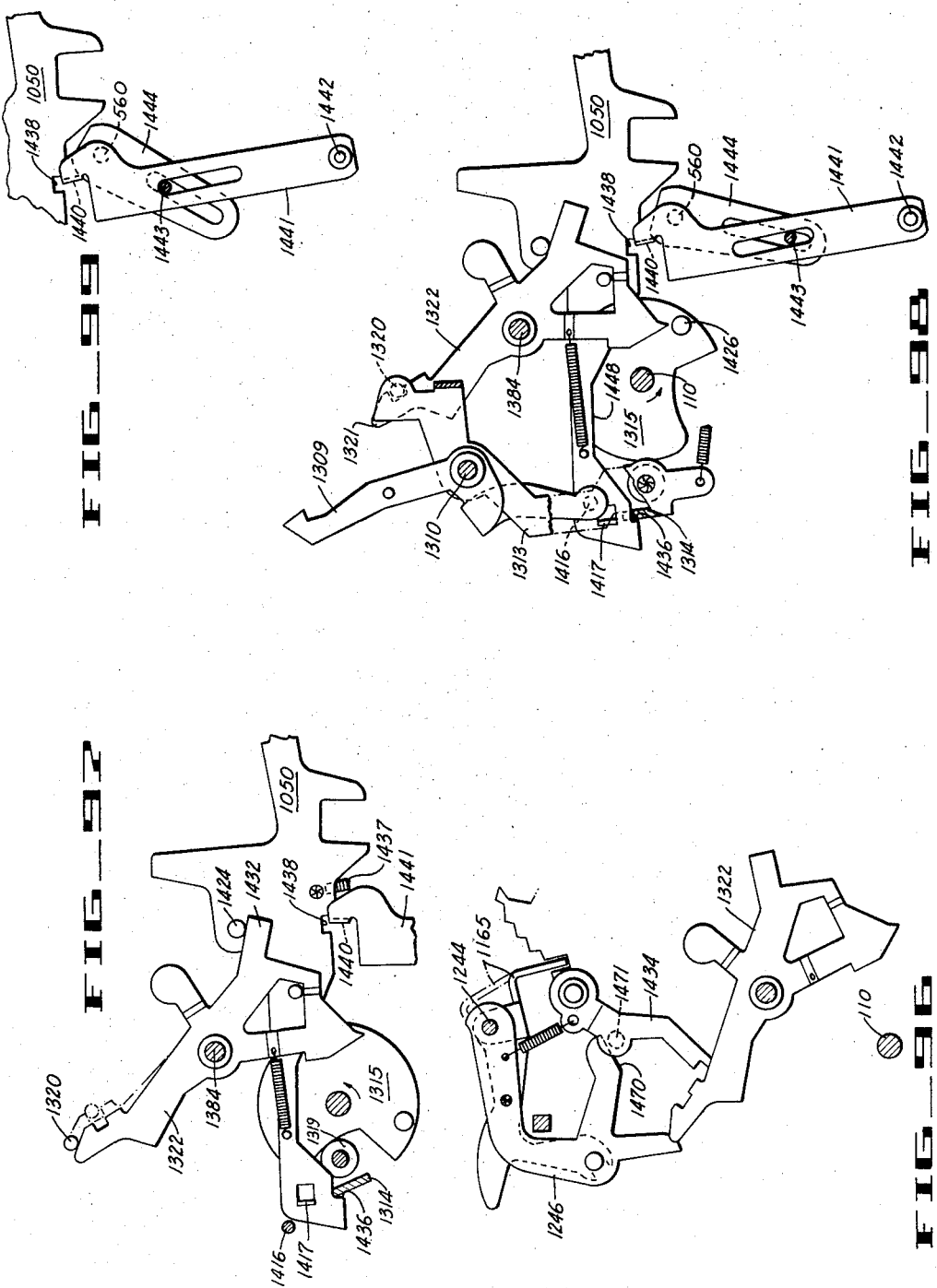

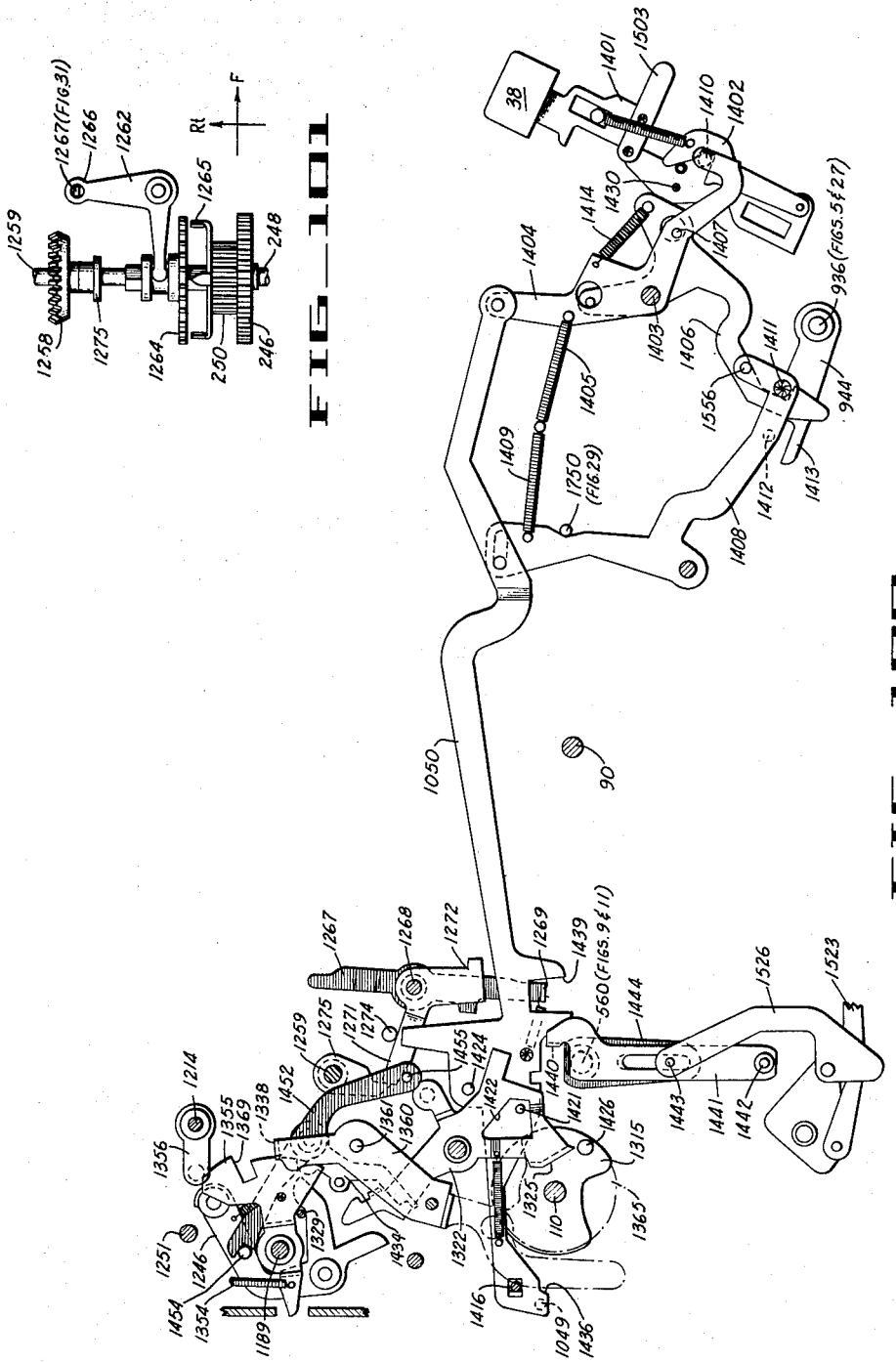

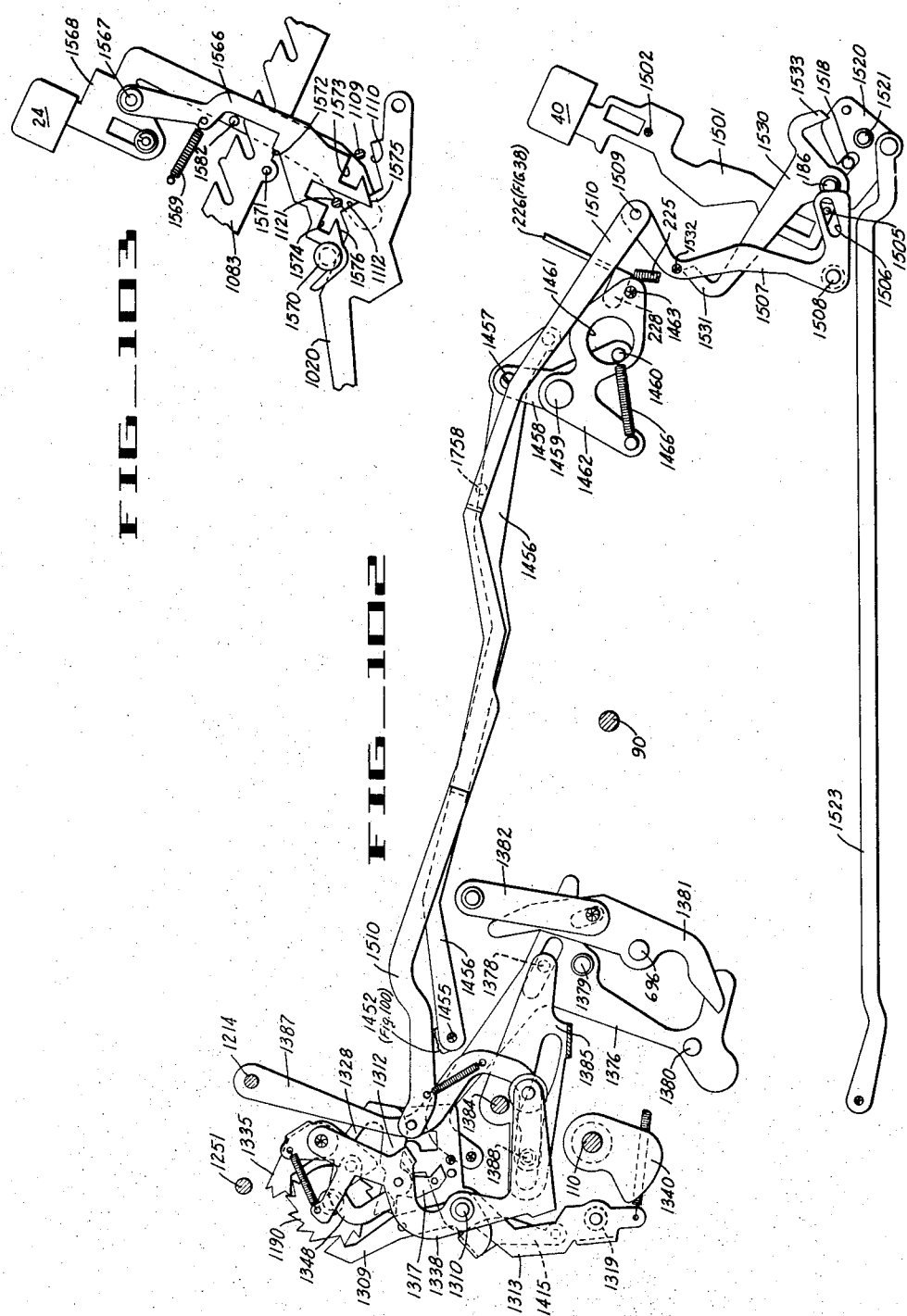

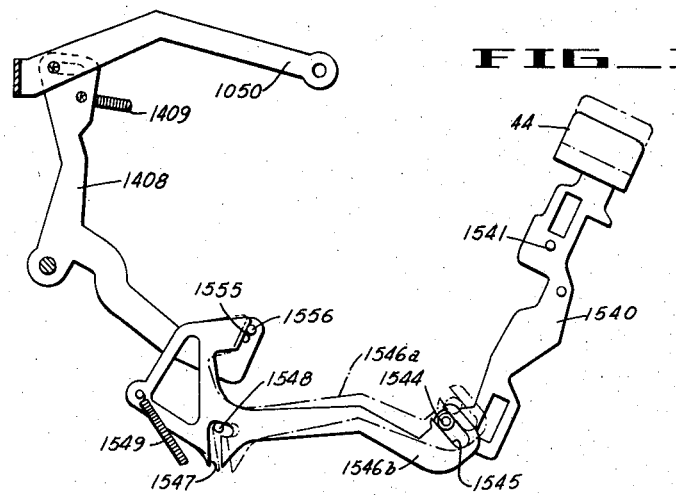
FIG_104
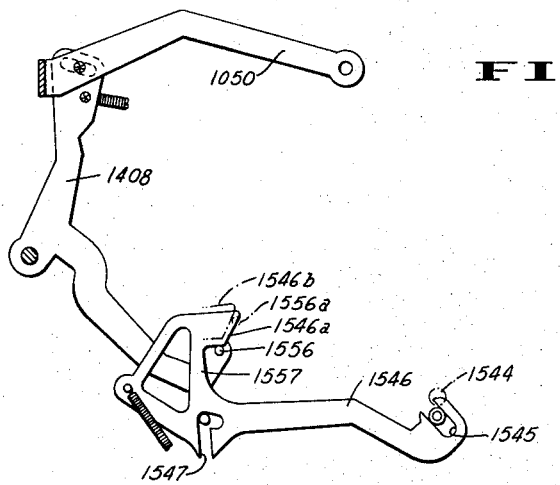
FIG_105
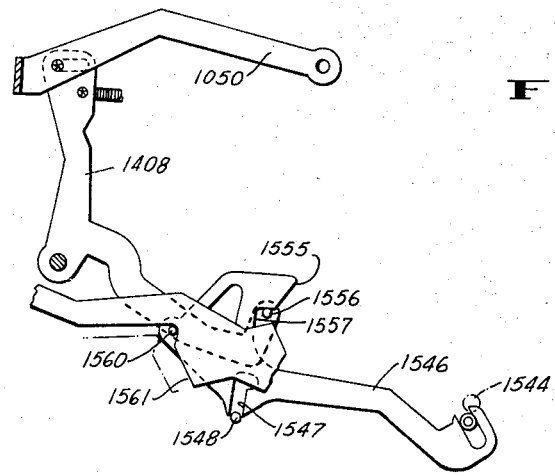
FIG_106

3,145,923
MULTIPLIER CONTROL MECHANISM FOR A SHORT CUT MULTIPLICATION MACHINE

Harold J. Chall, Castro Valley, Calif., assignor, by mesne assignments, to Friden, Inc., San Leandro, Calif., a corporation of Delaware
Filed Sept. 18, 1961, Ser. No. 138,645
11 Claims. (Cl. 235—60)

TABLE OF CONTENTS

| | Column |
|---|---|
| I. General Operation | 5 |
| II. Drive System | 7 |
| III. Single Cycle Action | 7 |
| IV. Overlapping Keyboard Action | 9 |
| V. Selection Unit | 10 |
|     1. Homing the Selection Carriage | 11 |
|     2. Zero Interlock | 12 |
| VI. Actuator | 12 |
| VII. Selector Clearing Bail | 13 |
| VIII. Front Gear Pendant | 13 |
| IX. Rear Gear Pendant | 14 |
| X. Accumulator Drive Gears | 14 |
| XI. Actuator Backup Pawls | 15 |
| XII. Accumulator | 16 |
|     1. High Speed Features | 17 |
|         (a) Movable Tens-Transfer Blocks | 17 |
|         (b) Drive Gear Stop | 18 |
| XIII. Mechanism for Controlling Entrees Into, and Readouts From, the Accumulator | 19 |
|     1. Swinging the Rear Gear Pendant | 19 |
|         (a) For Subtotal | 19 |
|         (b) For Addition, Subtraction and Total | 20 |
|     2. Shifting the Accumulator Drive Gears | 20 |
|     3. Interlocking the Drive Gears and Rear Pendant | 21 |
|     4. Addition and Subtraction | 21 |
|     5. Total and Subtotal | 22 |
|         (a) Setting Total-Subtotal Shaft 560 | 22 |
|         (b) Setting Hook Plate 604 (FIG. 44) | 22 |
|         (c) Control of Hook 633 (FIG. 50) | 23 |
|         (d) Miscellaneous Actions | 23 |
|         (e) Sign Control | 23 |
|     6. Aligning Lever 792 (FIG. 51) | 24 |
| XIV. Right Side Control Keys | 24 |
|     1. Print-Only, Addition and Subtraction | 24 |
|     2. Total and Subtotal | 25 |
|     3. Repeat | 26 |
| XV. Multiplier Storage, or Memory, Unit | 28 |
|     1. Over-Capacity Test | 28 |
|     2. Operation of Actuator Pawls 974 | 30 |
|     3. Memory Clearing Bail | 31 |
| XVI. Control of Memory Entry and Readout Operations | 31 |
|     1. Multiplier-Entry (X) Key | 31 |
|     2. Input Cycle | 32 |
|     3. Squaring Entry ($X^2$) Key | 33 |
|     4. Memory Input (MI) Key | 34 |
|     5. Memory Output (MO) Key | 34 |
|     6. Readout Cycle | 35 |
| XVII. Clear Keyboard and Backspace | 36 |
| XVIII. Short Cut Mutiplication | 38 |
| XIX. Sensors for the Multiplier Storage Sectors | 38 |
|     1. Method of Sensing Digits | 39 |
|     2. Alternative Digit Sensor | 39 |
|     3. Carry Mechanism of Digit Tester | 40 |
|     4. Short-Cut Test | 40 |
|     5. Holding the Carry In Short-Cut Tester | 41 |
|     6. Transferring the Carry to Digit Tester | 41 |
|     7. Termination Test | 41 |
|     8. Resetting the Termination and Short-Cut Testers | 42 |
| XX. Sensor Carriage | 42 |
|     1. Clutch for Sensor and Selector Carriages | 42 |
|     2. Homing the Sensor Carriage | 43 |
| XXI. Multiplication Control Mechanism | 43 |
|     1. Counter Ratchet Wheel 1190, Stop Pawl 1309, and Poker 1312 | 43 |
|     2. Counter Ratchet Feed | 44 |
|     3. Digitation Block Cam 1355 | 45 |
|     4. Digitation Set | 46 |
|     5. Digitation Sign Control | 46 |
|     6. Multiplier Key and Multiplier Bar 1050 | 47 |
|     7. Main Multiplication Lever 1322 | 48 |
|     8. Counter Overstroke and Termination Test | 49 |
| XXII. Example of Multiplication (Multiplier "4950") | 50 |
|     1. Initial Setting of Controls | 51 |
|     2. Initial Half-Cycle (Multiplier Digit "0") | 51 |
|     3. Mid-cycle; Counter Overstroke | 52 |
|     4. Second Half of First Cycle: Shifting, Testing Next Order (Digit "5," "No-Carry"), Setting Controls | 52 |
|     5. Four Cycles of Second Order | 53 |
|     6. Fifth Cycle of Second Order | 53 |
|     7. Third Order (Digit "9" With Carry) | 54 |
|     8. Fourth Order (Digit "4" With Carry), Termination Test | 55 |
|     9. Print-Out Cycle, Homing the Controls | 56 |
| XXIII. Negative Multiplication and Accumulative Multiplication | 56 |
| XXIV. Product Transfer Operation | 57 |
| XXV. Printing, Ribbon and Paper | 58 |
| XXVI. Symbols for Operations by the Right Side Control Keys | 60 |
| XXVII. Color for Right Side Operations | 61 |

TABLE OF CONTENTS—Continued

| | Column |
|---|---|
| XXVIII. Symbols for Operations by the Left Side Control Keys | 62 |
| XXIX. Symbol Suppression | 62 |
| XXX. Control of Printing, Symbols and Speed by Left Side Operations | 63 |
|     1. Memory Symbol "X" | 63 |
|     2. Multiplication Symbols "=" and "−=" | 64 |
|     3. High Speed During Multiplication | 64 |
|     4. Print-Out Symbols | 65 |
| XXXI. Operational Control of Symbols | 65 |
| XXXII. Settable Decimal Point | 66 |

The present invention relates to printing calculating machines.

In particular, the invention constitutes an improvement on the well-known Friden ten-key adding machine, shown, for example, in Chall, Patent No. 2,832,530, and includes mechanism for automatically carrying out multiplication and for registering the results thereof in various manners. The machine of the present invention, in addition to performing the usual adding machine operations, will calculate and print out the products of two numbers entered in succession, will calculate and print out the square of a single number, will perform multiplication and accumulate the products positively or negatively, will transfer a product automatically to a combined multiplier and storage unit for storing the number and for facilitating chain multiplication, will permit a value involved in any of the usual adding machine operations to be entered into the storage unit for storage or for use in multiplication, and will permit the readout of a number from the storage and its transfer, either positively or negatively, to the total accumulator.

The present invention is embodied in the same machine as that of the copending application of the applicant herein and Charles W. Wiedeman, Serial No. 117,096 filed June 14, 1961, now U.S. Patent 3,108,745, issued October 29, 1963, and accordingly the present application discloses that same machine. For convenience in cross-reference the same reference numerals are used for identical parts in the application.

It is an object of the present invention to provide a versatile and improved calculating machine capable of performing addition, subtraction, and automatic multiplication, and of printing a simple and concise record of those operations.

It is an object of the invention to provide an improved calculator having simplified control keys for the squaring of numbers, for the positive and negative entry of products, and for the accumulation of products.

It is an object of the invention to provide an automatic printing calculator and multiplier that prints a concise but complete record of each operation, that prints the multiplier, multiplicand, and product with identifying symbols, that automatically prints subtotals in accumulative multiplication operations, and that prints a complete record of all register entries and readouts, and interregister transfers.

A further object of the invention is the provision of an improved calculator that permits numbers involved in other machine operations to be entered into a multiplier storage register, that permits the storage of a number in such register for storage or for use as a multiplier, that permits a non-clearing print-out of a number in such register, and that permits the transfer of such number to an accumulator.

A further object of the invention is the provision of an improved, automatic, high speed, printing multiplying machine that utilizes a nonshifting multiplier register and short-cut multiplication, that utilizes improved nondestructive sensing of the multiplier for facilitating repeat multiplication by a "common factor," and that permits the automatic transfer of a product, or the contents of a product accumulator, to a multiplier register for facilitating "chain multiplication."

It is a further object to provide a calculating machine that has a simple control for the symbols that identify specific operations, that has a simple control for printing the correct symbols for multiple key operations and for corrective operations, and that has a symbol control responsive to the machine operations themselves.

A further object is the provision of an improved multiplication control for a calculating machine in which a single short-cut sensor tests each order of the multiplier register for determining the required sign of the digitation and the need for a carry, in which the carry so determined is set into a digit sensor for altering the effective spacing thereof with respect to the multiplier register, in which the digit sensor sets a counter, in which a termination sensor tests both for a zero condition in higher orders and the absence of a carry, and in which such a counter controls digitation and the operation of all the sensors.

A further object of the invention is the provision of an improved multiplication control for a calculating machine in which multiplier sensors set the controls for each order of multiplication before the first cycle of digitation corresponding to that order, in which the counter sets the digitation controls for each machine cycle before the beginning thereof, in which the home position of the multiplier sensors is at the lowest order of the multiplier storage register, and in which the multiplier sensor is actuated by the operator keys for sensing said first order and setting the multiplier controls before the initial machine cycle.

A further object is the provision of an improved multiplication control in which a digitation counter is provided with an overstroke beyond its full-count position, and in which said overstroke is utilized for controlling the end-of-order actions including a test for completion, the setting of sensors, controlling the carry and shifting to the next order.

A further object is the provision of a multiplying calculator having cam-controlled digitation initiating means conditioned for sign as required by both the short-cut multiplication and the positive and negative accumulation of products.

A further object is the provision of a high speed, automatic calculating machine in which all digitation is performed early in each machine cycle for making a maximum time available for spring-driven tens-transfer in the accumulator, in which the accumulator connections to the actuator are provided by a single gear pendant and a shiftable drive gear, in which the movement of the gear pendant to an operative position is spring-driven and cam-controlled, in which a cam-driven mechanism for shifting the drive gear from one operative position to the other operates during each machine cycle and is connected to the drive gear by a controllable interponent.

A further object is the provision in a high speed, calculating machine of an improved accumulator control in which latches for spring-driven tens-transfer levers for one direction of digitation are blocked during digitation in the opposite direction, and in which latches for spring-driven tens-transfer levers are blocked during the resetting of those levers.

A further object is the provision of a calculating machine having mechanism for positively clearing a register for facilitating a transfer of a number therefrom to an actuator.

And it is a further object of the present invention to provide an improved high speed printing calculator.

These and other objects and advantages of the present invention will be apparent from the following description of a specific embodiment thereof, and from the claims, taken in connection with the accompanying drawings in which:

FIG. 2 is a skeleton plan view of the machine, showing the location of certain of the frame members and shafts.

FIGS. 3 and 4 are exploded perspective views from the upper right front showing the came on the main drive shaft and rear drive shaft, respectively.

FIG. 5 is a right elevational section taken along the line 5—5 of FIG. 2, showing particularly part of the drive system and clutch control.

FIG. 6 is a right elevational partial section taken along the line 6—6 of FIG. 2, showing the clutch.

FIG. 7 is an electric circuit diagram for the motor.

FIG. 8 is an enlarged detail of part of the single-cycle, clutch-control action of FIGS. 5 and 6.

Figure 1:
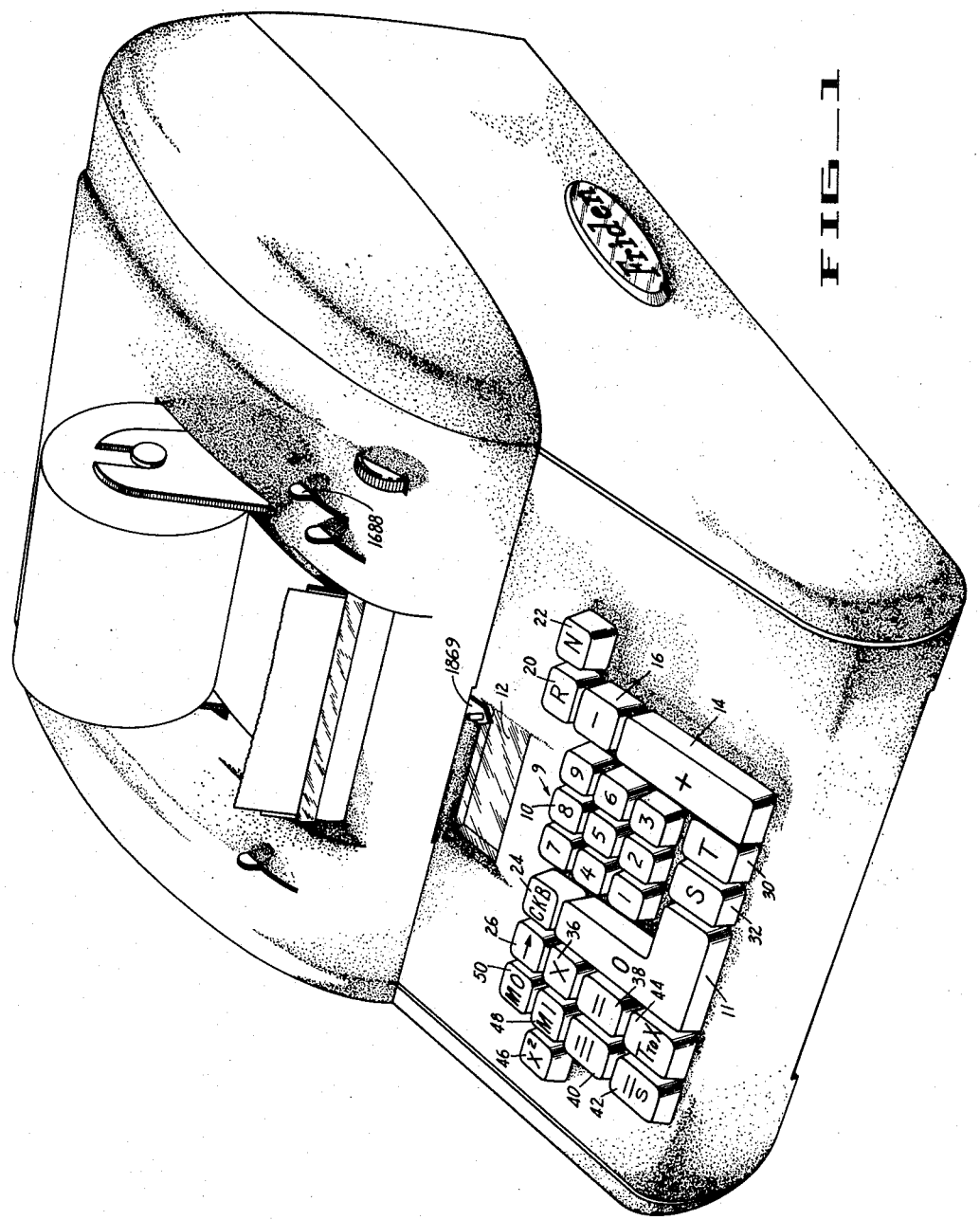
FIG. 1 is an external, perspective view of a machine, complete with case, embodying my present invention, taken from the upper right front.

FIGS. 9 and 10 are right elevational sections taken along the lines 9—9 and 10—10, respectively, in FIG. 2, showing, for example, some of the mechanism for accumulator entries and total operations.

FIG. 11 is a right elevational partial section taken along the line 11—11 of FIG. 2, also showing mechanism for accumulator entries and totals.

FIGS. 12, 13 and 14 are enlarged detail elevations for explaining part of the operation of the clutch-control mechanism shown in FIG. 5.

FIG. 15 is an exploodoed perspective taken from the upper right rear for explaining the operation of the mechanism appearing in FIGS. 11, 16 and 18, for testing the sign of the number in the accumulator.

FIG. 16 is a right elevational section taken along the line 16—16 in FIG. 2.

FIG. 17 is a right elevational partial section taken substantially along the line 17—17 of FIG. 2 for showing the mechanism for blocking the symbol print wheel for the right side controls.

FIG. 18 is a right elevational section taken substantially along the line 18—18 in FIG. 2 and showing the accumulator and its gear pendant.

FIGS. 19 and 20 are right elevational views of part of the mechanism shown in FIG. 18 for explaining its operation.

FIG. 21 is a right elevational section taken along the line 21—21 in FIG. 2.

FIG. 22 is a perspective view from approximately the right front showing the digit sensor of the multiplier unit.

FIG. 23 is a perspective from the upper right front of the upper rear portion of the machine, showing the multiplier storage or memory sectors and parts of the multiplication control mechanism.

FIG. 24 is a rear elevation of the machine.

FIG. 25 is a left elevational section taken along the line 25—25 of FIG. 2.

FIG. 26 is an exploded perspective view from approximately the upper left rear showing the blocking bails for the zero latches of the selector unit, which blocks are used during the repeat and backspace operations.

FIG. 27 is a left elevational section taken along the line 27—27 in FIG. 2.

FIG. 28 is a left elevational partial section taken along the line 28—28 in FIG. 2, showing the mechanism for operating the clearing bail of the multiplier storage, or memory, unit.

FIG. 29 is a left elevational partial section taken substantially along the line 29—29 in FIG. 2, showing parts of the print wheel aligner and the left side symbol control.

FIGS. 30 to 36, inclusive, are left elevational sections taken along the lines 30—30 to 36—36, inclusive, in FIG. 2, showing particularly parts of the multiplication control and carriage control mechanisms.

FIG. 37 is an exploded perspective of part of the overlapping keyboard mechanism shown in FIG. 5.

FIG. 38 is a perspective from the upper right front of the escapement mechanism of the selector unit.

FIG. 39 is a rear elevational partial section showing the escapement of the selector unit.

FIG. 40 is a perspective from the upper left front showing the mechanism for interconnecting and controlling the carriages for the selector unit and the multiplier control unit.

FIGS. 41, 42 and 43 are enlarged right elevational sections for showing the accumulator and its gear pendant, and for explaining their operation.

FIG. 44 is an exploded perspective view from the upper right rear showing certain parts of the mechanism that control the entry into, and readout from, the accumulator.

FIG. 45 is an exploded perspective view from the right upper rear showing part of the mechanism for controlling the gear pendant for the accumulator.

FIGS. 46 and 47 are enlarged right elevational detail views of part of the total-subtotal control shown in FIG. 9.

FIGS. 48 through 54 are enlarged right elevational details for explaining the operation of the mechanisms shown, for example, in FIG. 44.

FIGS. 55 and 56 are enlarged right elevational details for explaining the operation of the multiplier storage, or memory, unit.

FIG. 57 is an exploded perspective taken from the upper right front showing parts of the multiplication mechanism which appear also, for example, in FIG. 21.

FIG. 58 is an enlarged right elevational detail showing the multiplier sensors, which appear also, for example, in FIG. 21.

FIGS. 59 through 62 are enlarged right elevational details for explaining the operation of the digit sensor in sensing a number in the storage unit.

FIGS. 63 through 65 are enlarged right elevational details for explaining the action of setting the digit sensor for the "carry" and "no-carry" conditions.

FIG. 66 is an enlarged right elevational detail depicting the termination test.

FIGS. 67 through 70 are right elevational views, similar to FIGS. 59 through 62, showing a modified construction for the digit sensor and depicting its operation.

FIG. 71 is an exploded perspective from the upper left rear showing certain parts of the multiplication control, which parts appear also in FIGS. 31 through 35.

FIGS. 72 through 80 are enlarged left elevational sections of the mechanism shown in FIG. 71, and constitute enlarged details of part of the mechanism shown in FIGS. 32 through 35.

FIGS. 81 through 99 are enlarged left elevational views of the mechanism of FIG. 71 for explaining its operation.

FIG. 100 is a left elevational fragmentary section showing part of the mechanism of FIGS. 30, 31 and 32.

FIG. 101 is a top detail view indicated substantially by lines 101—101 in FIG. 35.

Figure 33:
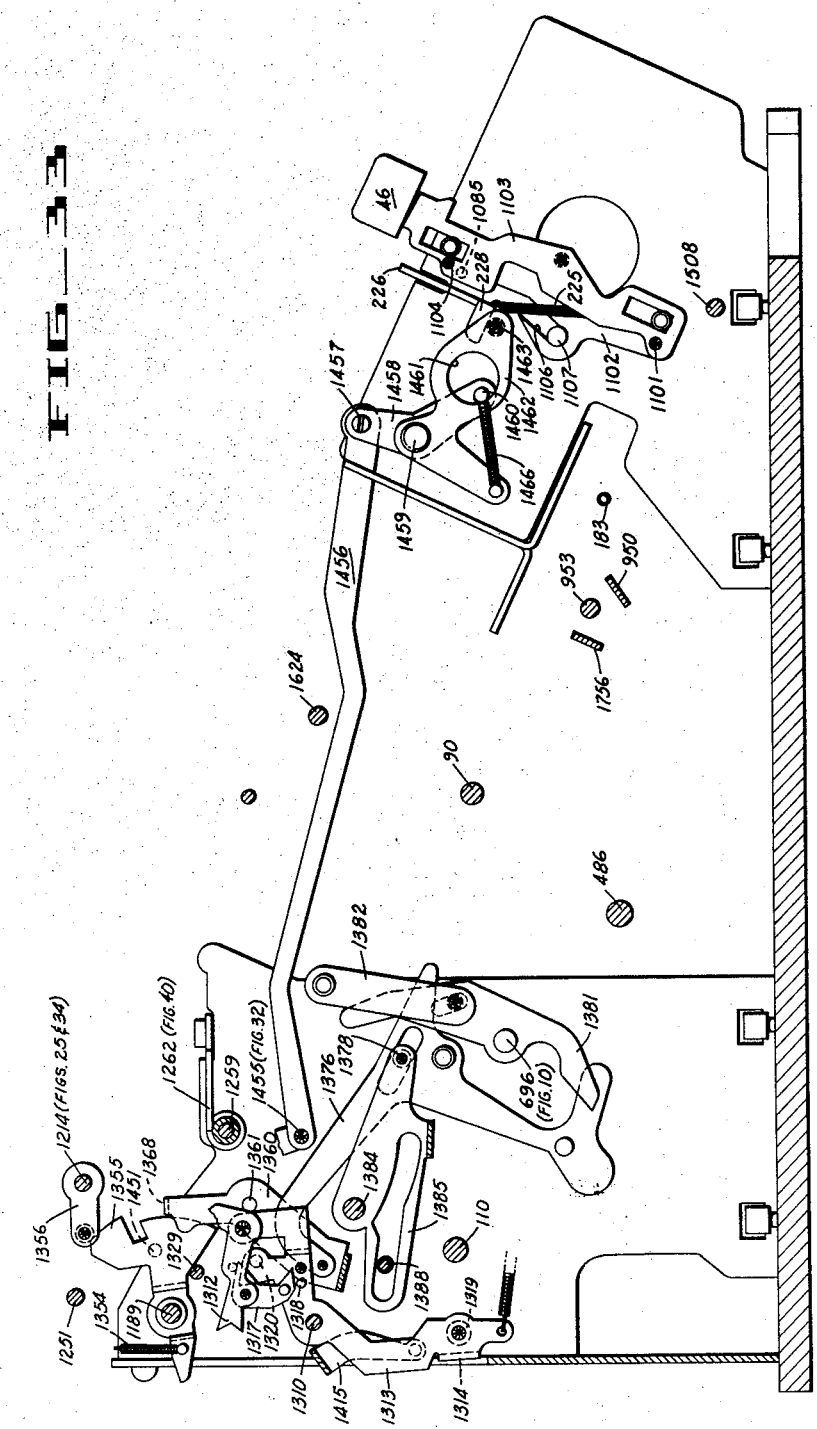
Figure 102:
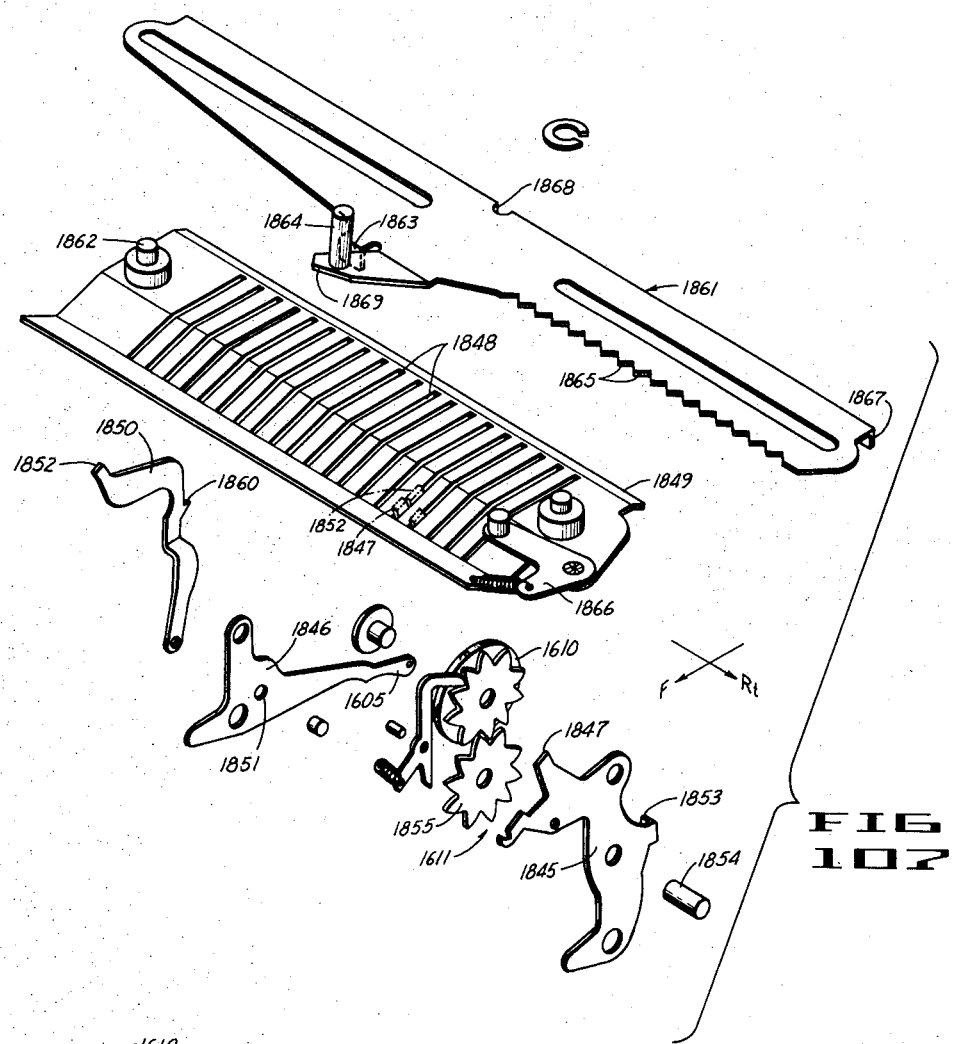

FIG. 102 is a left elevational fragmentary section showing part of the mechanism of FIGS. 33, 34 and 35.

FIG. 103 is a left elevational partial section supplementing the view of FIG. 31.

FIGS. 104 through 106 are left elevational views of part of the product transfer (total to multiplier or "T to ×") mechanism of FIG. 30 for explaining its operation.

FIG. 107 is an exploded perspective from the upper right front showing a numeral print wheel and the decimal point selection mechanism.

Figure 108:
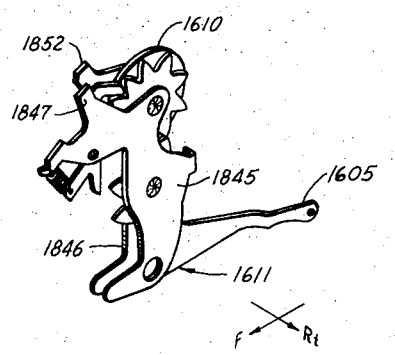
Figure 109:
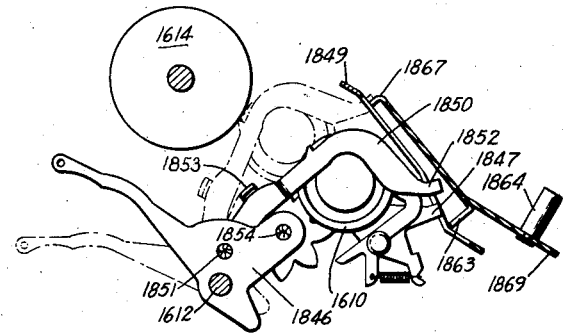

FIG. 108 is a perspective from the upper right front of a print wheel assembly with a decimal point printing element. And, FIG. 109 is a left elevational view for explaining the operation of the decimal printing member.

I. GENERAL OPERATION

The calculating machine shown in the drawings is of the ten-key, reciprocating actuator type and in its general features is constructed in accordance with U.S. Patent No. 2,832,530, and is similar to the well-known Friden adding machine.

A number may be entered in a movable selector unit by means of selection keys 9 (FIG. 1), which include the nine numeral keys 10 and the zero key 11, and the number so entered appears in a check window 12 on the check dials 197 of the selector segments 196 (FIG. 16). Depression of an addition key 14 or a subtraction key 16 then initiates an operation that transfers the number to the actuator and also to the accumulator, and prints it, the operation clearing the number from the selector unit. Depression of a repeat (R) key 20 causes a number in the selector to be entered additively in the accumulator without clearing it from the selector. Simultaneous depression of the repeat key 20 and subtract key 16 similarly enters the number subtractively into the accumulator without clearing it from the selector. A print only (N) key 22 causes the number in the selector to be printed and cleared. A clear keyboard (CKB) key 24 causes the number in the selector to be simply cleared therefrom by returning the selector unit to its home position. A backspace key 26 causes the movable selector carriage to move one space to the right and clear out the digit last entered. A depression of a total (T) key 30 causes the number in the accumulator to be transferred to the actuator and to be printed, leaving the accumulator clear. Depression of a subtotal (S) key 32 similarly transfers the value from the accumulator to the actuator for printing, but in addition returns it to the accumulator.

With a number in the selector unit, and showing in the check window 12, depression of a multiplier-entry (×) key 36 transfers the number from the selector to the actuator, and also to a multiplier storage, or memory, unit 970 (FIG. 21) and prints the number, leaving the selector clear. A multiplicand may then be entered in the selector by means of selection keys 9. Then depression of a multiplication (=) key 38 causes the multiplicand to be printed once, the multiplication to be performed automatically, the product to be accumulated additively in the accumulator and the number of the accumulator to be printed out in a total operation. Alternatively the multiplication operation may be initiated by the depression of an accumulative multiplication (=S) key 42, which causes a similar multiplication operation but ends with a subtotal operation, thereby leaving the accumulated product in the accumulator. Depression of a negative multiplication (—=) key 40 causes an operation similar to that of multiplication key (=) 38, but enters the product negatively in the accumulator. A depression of a product transfer (T to ×) key 44 produces the same operation as the multiplication key 38, with the addition that the final value in the accumulator is transferred to the multiplier storage, or memory, unit. Any combination of the keys 38, 40, 42 and 44 may be depressed simultaneously.

With a number in the selector, a squaring entry ($\times^2$) key 46 may be depressed to cause the number in the selector to be entered in the multiplier storage unit and also retained in the selector. Then any of the keys 38, 40, 42 or 44 may be depressed to cause an automatic multiplication for producing the square of the number.

A memory input (MI) key 48 and a memory output (MO) key 50 are preparatory keys and do not, by themselves, cause an operation of the machine. The memory input key 48 may be depressed previously to, or simultaneously with, keys 14, 16, 20, 22, 30 or 32 to cause the number that is printed to also be entered in the multiplier storage, or memory, unit. The memory output key 50 may similarly be used with the print-only key 22 for printing out the number standing in the multiplier storage unit. The memory output key 50 may also be used with either the addition key 14 or subtraction key 16 for printing the number in the multiplier storage unit and entering it additively or subtractively, respectively, into the accumulator. No memory output operation leaves the multiplier storage unit clear. The number is transferred from the multiplier storage, or memory, unit to the actuator for printing, and then is returned to the multiplier storage unit. Clearing of the storage unit is performed only in preparation for the entry of a new number.

II. DRIVE SYSTEM

As shown in FIGS. 5, 6 and 7, a motor 52 includes an armature 53 and field coils 54 and 55, and is provided with a governor 56 having two pair of centrifugally operated contacts 57 and 58 adjusted to open at two different speeds of the motor. A main switch 60 supplies current through low speed contacts 57 to the motor 52 for operation at low speed. The series combination of a high speed switch 62 and the high speed governor contacts 58 is connected across the low speed contacts 57 so that when both switches 60 and 62 are closed, the motor operates at high speed. The action of the governor is simply to open the contacts and interrupt the power to the motor when the speed exceeds the value for which the contacts are set. Since contacts 58 open at a higher speed than do contacts 57, they will maintain the circuit up to the higher speed even though the low speed contacts 57 open. A capacitor 64 and resistor 66 constitute a filter for suppressing electric arcs and noise at the contacts 57 and 58. Automatic multiplication is begun and ended at low speed and is otherwise operated at high speed. All other key-initiated operations are preformed at low speed.

The motor 52, through a coupling 70, drives a shaft 72 carrying a worm 74 (FIG. 6), which drives a worm gear 76 fixed to a shaft 78, which, in turn, carries a pinion 80 which drives a clutch ratchet gear 82 clockwise as seen in FIG. 6. Gear 82 and a clutch ratchet 84 fixed to it, rotate free on a main drive shaft 90. Fxed to the main drive shaft 90 is a clutch plate 92 which carries a clutch pawl 94 which is journalled at 95 and urged by a spring 96 to engage the ratchet 84 for completing the drive connection between the motor 52 and the main drive shaft 90. Shaft 90 extends through to the left of the machine where, as shown in FIG. 36, a gear 102 is fixed to it. This gear drives an idler gear 104 which, in turn, drives a gear 106 fixed to a gear drive shaft 110. Gears 102 and 106 have the same number of teeth, so that shaft 110 is driven in synchronism with the main drive shaft 90. The cams and clutch carried by the main drive shaft 90 are shown in the exploded view of FIG. 3. Similarly the cams on the rear drive shaft 110 are shown in FIG. 4.

The main clutch is controlled by a dog 114, best shown in FIGS. 6 and 8. In the home position of the main drive shaft 90 a shoulder 116 on the dog 114 intercepts a shoulder 118 of the clutch pawl 94 and holds the pawl tooth 120 clear of the drive ratchet 84. When the dog 114 swings forward (counter-clockwise in FIG. 6) on its support 115, its shoulder 116 disengages the shoulder 118 of pawl 94, so that the spring 96 swings the pawl clockwise as seen in FIG. 6, about its support 95 for engaging the clutch and causing the drive shaft 90 to be rotated clockwise. If then, the clutch dog 114 is returned to its home position, in which it is shown in FIG. 6, its shoulder 116 will intercept the shoulder 118 of the pawl 94, so that the rotation of the clutch plate 92 forces the pawl to disengage the ratchet 84. The construction and operation of the clutch thus far described is well-known. The rotated position in which the drive shaft 90 is thus stopped by the dog 114 establishes the home position of the drive mechanism. Each revolution of main shaft 90, from home to home, constitutes a machine cycle. A pin 117 on clutch dog 114 moves against the operating arm 61 (FIGS. 5 and 8) of the main switch 60 for energizing motor 52 before the dog releases clutch pawl 94.

III. SINGLE CYCLE ACTION

In FIGS. 6 and 37, a link 124, which constitutes a part of an overlapping keyboard action, is articulately pinned at 125 to the clutch dog 114, and a spring 126 is connected to a pin 127 at the forward end of this link for biasing the clutch dog 114 forward, that is, to its pawl-releasing, or clutch-enabling, position.

Clutch dog 114 is controlled by a latch 130 (FIGS. 6, 12, 13 and 14) journalled on a pin 131 on the frame of the machine. The upper end of this latch carries a pin 132 which engages a slot in the upper end of the dog 114. A lower front corner 134 on the latch 130 constitutes a shoulder cooperating with a pin 136 on a clutch control bar 138. This bar is supported for longitudinal movement on links 139 (FIG. 6) and 140 (FIG. 5), and is arranged to be moved forward, in a well-known manner, by all of the keys (FIG. 1) that are required to set the machine into operation. Latch 130 has a live tip 144 journalled on a pin 145 at its upper forward corner and spring-urged against a stop pin 146. This live tip, in the position shown in FIGS. 6 and 12, covers the forward face of the shoulder 134 and extends below the lower edge thereof. When clutch bar 138 is moved forward, pin 136 pushes the lower end of live tip 144 forward and lets the shoulder 134 fall behind the pin 136 so that the latch 130 assumes the position shown in solid lines in FIG. 13. This counter-clockwise motion of the latch 130, through pin 132, also swings the clutch dog 114 counter-clockwise for disengaging the shoulder 118 of pawl 94, thereby engaging the clutch so that the entire clutch mechanism and the drive shaft 90 rotate counter-clockwise with the motor-driven ratchet 84.

Near the end of the first revolution of shaft 90, the mechanism shown in FIG. 8 returns the clutch dog 114 to its pawl-intercepting position. In FIG. 8, a cam 150 (see also FIG. 3) is fixed to the main drive shaft 90 and carries a roller 151 that actuates a rocker arm 152. This arm is journalled on a pin 148 and is biased forward by a spring 155 against a stop 157, and has a forward extension carrying a pin 153 on which is journalled a hook 154. As cam 150 is rotated (clockwise in FIG. 8), roller 151 descends against a cam face 156 on the rocker arm 152 and rocks the arm rearward. The resulting clockwise swing of arm 152 lifts the pin 153 and hook 154. This upward movement of hook 154 is guided by a pin 159 on a lever arm 161, journalled at 163, to cause a shoulder 158 on hook 154 to engage pin 117 on the dog latch 114 for swinging the dog 114 (clockwise in FIG. 8) to intercept the shoulder 118 of pawl 94 for stopping the drive shaft 90 in its home position.

This clockwise motion of dog 114 swings the dog latch 130 (FIGS. 6 and 12) to which it is connected (clockwise in those figures) so that shoulder 134 is lifted to release pin 136 for rearward motion. If at this time the clutch control bar 138 is free to move rearward, the parts move from the solid line position in FIG. 13 to the home position shown in FIG. 12. However, if bar 138 is held forward, as when an operator maintains finger pressure on an operating key, the parts move from the solid line position in FIG. 13 to that in FIG. 14. In FIG. 14 the clockwise rotation of the dog latch 130 has lifted the live tip 144 and let it swing rearward, under force of its own spring, to lie above the pin 136 on clutch control bar 138. It will be noted in FIG. 8 that when the cam 150 and roller 151 reach their home position, the rocker arm 152 is free to swing (counterclockwise in this figure) under the force of the spring 155, and no longer holds the clutch dog 114, which is urged toward its clutch-operating position by spring 126 (FIG. 37). However, because the live tip 114 overlies the pin 136 (FIG. 14), the dog 114 is held in its clutch-disengaging position, even though the clutch control bar 138 is held forward by the continued depression of an operating key. Then the release of the key by the operator permits the bar 138 (FIG. 14) to move rearward and return the parts to the position of FIGS. 6 and 12 so that another depression of the operating key will produce another cycle of machine operation. This operation of the mechanism shown in FIGS. 8 and 12 thus limits the machine operation to a single cycle in response to each separate depression of an operating key. For repeat operation, under control of repeat key 20 and during the multiplication program, the guide pin 159 is moved by its arm 161, to lift the hook 154 clear of the pin 117, as will be described.

Clutch plate 92 also has a peripheral cam surface that cooperates with a roller 162 (FIGS. 3, 6 and 12) on the clutch control bar 138. It will be recalled that the bar 138 moves forward for engaging the clutch and initiating a machine cycle, and in so doing becomes latched in the forward position by the latch 130. In a well-known manner, this latching of bar 138 also holds down the particular operating key that drove the bar forward. Although the latch 130 holds the bar 138 forward (to the position shown in FIG. 13), the bar is capable of a bit more motion. After about one-sixth of a revolution of the drive shaft 90 and clutch plate 92 (clockwise in FIG. 12), the high part of the periphery of plate 92 comes under the roller 162 for driving the bar 138 to its extreme forward position, as indicated by the dotted line position 136a of pin 136 in FIG. 13. By thus driving the bar 138 forward, the plate 92 tightens down the operating key that initiated the operation, for ensuring precision in the other control operations initiated by that key. Plate 92 again frees the clutch bar 138 about one-fourth of a revolution before the end of the cycle. This difference between the positions in which a key is held by latch 130 and plate 92 also serves another function, as will be explained in connection with the operation of the repeat key 20.

IV. OVERLAPPING KEYBOARD ACTION

The overlapping keyboard mechanism employs an extensible connector 165 which includes links 124 and 166 (FIGS. 5 and 37) having a pin-and-slot connection with each other. A spring 168 urges the links to the contracted position of the connector. A latch 170 is journalled on an ear of the link 166 and is urged by spring 172 into engagement with a pin 174 on the member 124 for holding the connector in its extended position. A pin 176 on the latch 170 extends through an opening in the machine frame into position to be abutted by the right frame member 178 of the movable selector carriage (FIG. 9) for dislodging latch 170 from the pin 174 for permitting the link to change to its contracted configuration. The forward end of link 166 is articulately pinned to the up-extending arm 182 of a bail 184 which rocks on a shaft 186. At the left end of bail 184 (FIGS. 16 and 38) an up-extending leg 188 cooperates with a lever 190. This lever constitutes part of the escapement mechanism of the selection unit, and is depressed whenever any digit from "0" to "9" is entered by means of the keys 9 (FIG. 1). As may be seen in FIG. 16, when bail 184 is in its normal position, shown, the upper end of bail leg 188 is clear of the lever 190. In FIG. 6, when the clutch dog 114 is released by the latch 130 and swung forward by spring 126 to release the clutch and set the machine into operation, the connector 165 also moves forward and swings bail 184 (counter-clockwise as seen in FIGS. 5 and 16), and positions the upper end of bail leg 188 under the lever 190 for blocking all of the selection keys 9. As is well known, an operation which is to include the clearing of the selection unit, such as an add operation, includes the return of the selection carriage to its right-hand position in the machine. It is driven to the right slightly beyond its home position, for restoring the leftmost pins in the pin box, and then is permitted to return left to its home position. The selector carriage reaches this extreme right position at about the two-thirds point in the cycle and in this position strikes the pin 176 (FIG. 37) which is then at the dotted line position 176a in FIG. 9, thereby driving latch 170 away from pin 174 so that spring 168 contracts the extensible connector 165, pulling link 166 rearward until it is stopped by a pin 167 (FIGS. 5 and 37), striking a part of the machine frame. As may be seen in FIG. 5, this rearward movement of link 166 swings the bail 184 clockwise and swings the bail leg 188 (FIG. 16) rearward to clear the lever 190 and permit immediate entry of the next number, even though the machine has not completed its operating cycle. Near the end of the cycle the dog 114 is swung rearward by hook 154, as previously described. Link 124 is pulled rearward with dog 114, and the pin 167 abuts the frame to prevent rearward motion of link 166. Consequently this action extends the connector 165 and permits the latch 170 (FIG. 37) to re-engage the pin 174.

V. SELECTION UNIT

The selection unit is similar to the constructions shown in U.S. Patents Nos. 2,371,752, 2,832,530 and 2,832,532. A stationary portion includes the digit keys 9 (FIG. 1) and setting levers 194 (FIGS. 16 and 21), the location of which constitutes a selection station. A selection carriage, including right and left frame members 178 and 179 (FIGS. 9 and 16), slides transverse the machine on rods 180 and 181, and is spring-biased toward the left by a spring 183 (FIGS. 27 and 40). The carriage also includes a selection sector 196 in each of sixteen numerical orders, and a biasing spring 195, a column of stop pins 198 and a zero latch 199 for each sector. As is explained in the prior patterns referred to, in the home position of the selector, the leftmost order is aligned with the setting levers 194 at the selection station. Depression of one of the digit keys 10 sets a pin 198 and releases the zero latch 199 of the sector at the selection station for differentially setting the selector segment 196 of that order in accordance with the number, and indexes the carriage one order to the left to bring that order into alignment with the rightmost order of the actuator, and to bring the next order of the selector carriage in line with the setting levers 194. Each selector sector 196 carries a check dial 197 bearing numerals which are exposed through the check window 12 for showing the number set in the selector unit.

In FIGS. 38 and 39, the selector carriage includes a rack 202 having teeth 204. An escapement mechanism on the stationary part of the selector unit cooperates with these teeth for indexing the selector carriage order-by-order to the left as digits are entered. As seen in FIG. 39, the escapement includes levers 206 and 208 which carry teeth 207 and 209, respectively. These levers are biased by a spring 212 for holding tooth 209 in engagement with the rack teeth 204 for blocking movement of the selection carriage and for holding tooth 207 above and clear of the rack teeth 204. Whenever a digit key 10 (FIG. 1) is depressed, a bar 214 (FIGS. 21 and 38) is depressed, to depress lever 206 which in turn depresses lever 208. This depression and subsequent return of the two levers 206 and 208 indexes the selector carriage one order to the left (to the right as seen in FIG. 39), as explained in the afore-mentioned patents.

It is also desirable to index the selector carriage to the left order-by-order during a multiplication operation, and for this purpose there is included a lever 220 having a tooth 222, which, in its normal position shown in FIGS. 38 and 39, lies above and clear of the escapement teeth 204. Lever 220 is journalled on the same pin 224 as is lever 208 and includes a left extending arm 226 to which is connected a spring 225 (also see FIG. 25) and by which lever 220 is rocked during the multiplication operation. When the tooth 222 is lowered, it passes between a pair of adjacent teeth of the rack 204 and then engages and depresses the escapement lever 208. Thus the lowering and raising of the tooth 222 by its lever 220 operates the escapement and indexes the selector carriage one order to the left (right in FIG. 39).

A lever 216 (FIG. 21) has a tip 217 aligned with check dial 197 of the selector sector 196 at the selecting position, for depressing the lever 208 (FIG. 39) as the sector is released by its zero latch 199. This action ensures positive release of the selector carriage under certain critical operating conditions, and is more fully described in the Chall and Foreman Patent No. 3,055,579, issued September 25, 1962.

A selector clearing bail includes bail arms 384 (FIGS. 5 and 25) fixed to shaft 382 and carrying bail rod 386. As will be described under "SELECTOR CLEARING BAIL," this bail provides a positive drive for rotating all selector sectors 196 to their "0" positions during the first half of each machine cycle for insuring accurate transfer of values from the selector to the accumulator. It also eases the sectors back to their set positions to reduce bouncing during the high speed repeat operations of multiplication.

Journalled on a rod 960 (FIG. 25) are two blocking bails 962 and 964, which are shown best in FIG. 26. The purpose of these bails is to block the zero latches 199 (FIG. 16) for preventing the resetting of the selector sectors during repeat and backspace operations in the manner shown and described, for example, in U.S. Patent No. 2,832,532. Bail 964 is positioned in front (to the right in FIGS. 25 and 26) of the bail 962 and is drawn to it by a spring 965. A bail edge 966 on the bail 964 is aligned with the zero latch of the lowest order of the number that has been entered in the selector for blocking it, and a ledge 963 on the bail 962 is arranged to block the zero latches of the second and all higher orders of the selector. During repeat operations, the bail 962 is swung rearward (to the left as seen in FIGS. 25, 26 and 27) by a pin 949 acting against a cam edge 955, and the bail 964 is moved with it by force of its spring 965 so that the two blocking ledges 963 and 966 block the zero latches 199 (FIG. 16) of all orders of the selector to the left of the selection position, that is, all orders that are aligned with the actuator. For backspacing operations the bail 962 is similarly moved rearward (to the left in FIG. 26) and the bail 964 is blocked by a bail arm 951 (FIG. 27) which moves into position to obstruct pin 956.

(1) Homing the Selection Carriage

The selector carriage is moved right to its home position by means of a mechanism shown in FIGS. 35 and 40, which mechanism also serves other functions. The left frame member 179 of the selector carries an angle bar 230 which extends to the left. This bar includes a rearward facing rack portion 232 which is coupled through a pair of gears 234 and 236 to a rack portion 240 of an angle bar 242 extending longitudinal of the machine and guided by a roller 243 and a spool 245 (FIG. 35). The rear end of this bar carries an up-facing rack 244 which meshes with a gear 246 fixed to a shaft 248, which also carries a broad-faced gear 250. In mesh with this gear 250 is the up-facing rack 252 of an interponent 254, which also slides in a groove of spool 245. This interponent has a longitudinal slot 258 for receiving a guide pin 262 carried by lever 264 journalled at 266. Lever 264 carries a roller 268 which rides on a cam 270 on the main drive shaft 90. Cam 270 carries a roller 274 which, during the second half of each machine cycle, is driven by the rotation of the cam (counter-clockwise in FIG. 40) against the forward end 276 (FIGS. 34 and 40) of a forward extending arm 278 of a lever 280 journalled to the machine frame at 282. Lever 280 carries pins 284 and 286 which support a lever 290 which has a vertical slot 292 at its upper end and a large square opening 294 at its lower end for receiving the pins 284 and 286, respectively. The lever 290 is thus movable on the pins 284 and 286, but springs 296 and 298 normally hold the lever 290 in the position shown in FIG. 34. Lever 290 (FIG. 40) includes a forward extending arm 308 with a left extending ear 310 at its forward end. An abutment face 256 at the forward end of interponent 254 is arranged to be engaged and driven by the ear 310 for returning the selector carriage to its extreme right, or home, position.

The mechanism in FIG. 40 is shown in its home position. When a number is entered into the selector unit by means of the entry keys 9 (FIG. 1), the selector carriage, and with it the frame member 179 (FIG. 40), moves to the left order-by-order, as previously described. This leftward movement is transmitted by the rack 232 through the gears 234 and 236 to the longitudinal bar 242 which moves forward in the machine as the selector carriage moves left. This motion drives the gear 246, the shaft 248 and gear 250 (counter-clockwise in FIG. 40) and moves the interponent 254 forward. In this forward movement, the interponent is guided by the pin 262. During an addition operation, for example, the shaft 90 and the cam 270 rotate counter-clockwise in FIG. 40. The initial rotation of cam 270 out of its home position lowers the lever 264 and the interponent 254 to align the abutment 256 with the ear 310 on the lever 290. Then, slightly past the mid-point of the cycle, roller 274 abuts the cam surface 276 of the lever 280 to carry the ear 310 rearward against the abutment face 256, for driving the interponent 254 rearward and, through the connections previously mentioned, for driving the rack 232 and the selector carriage to the right, beyond its home position. Near the end of the cycle, roller 274 runs off the cam face 276, permitting the levers 280 and 290 to return to their home positions, and also permitting the selector carriage to move left to its home, or first selection, position. Also, near the end of the cycle, cam 270 lifts roller 268 for lifting the interponent 254 and raising the abutment 256 clear of the ear 310.

The freedom of movement of lever 290 on the lever 280 is an overload release device. Normally there is no movement between these two levers. However, the springs 296 and 298 must support the lever 290 in this position against the force exerted on it by the abutment 256. When this load exceeds the magnitude that the springs 296 and 298 will support, the lever 290 tilts, principally about the pin 284, so that the ear 310 slides under the interponent 254.

Lever 264 includes a forward extending arm 265 having an ear 267. A lever 314 has, at its upper end, a forward extending arm 316 arranged to be swung over the ear 267. During machine operations in which the number is not to be cleared out of the selector unit, such as repeat and multiplication, the arm 316 is swung over the ear 267 to prevent the lever 264 from being controlled by cam 270, and for holding the interponent 254 up and clear of the ear 310 on lever 290.

(2) Zero Interlock

The front face 320 of the lower flange of the bar 230 constitutes a cam face for controlling a lever 322. As shown in FIG. 25, this lever 322 is a bellcrank journalled at 324 and cooperates with a second bellcrank 326 journalled at 328. The up-extending arm of this bellcrank 326 is bifurcated and the rear prong 330 lies under a part of the stem of the "0" key 11. When the selection carriage is in its home position, cam face 320 holds the lever 322 counter-clockwise as seen in FIGS. 25 and 40. This action, through a spring 325, holds bellcrank 326 clockwise so that prong 330 lies under the "0" key and blocks it. When the selection carriage moves left one order, that is, to its second-order selection position, cam 320 (FIG. 40) permits lever 322 to swing clockwise, thereby moving prong 330 out of alignment with the flange of the "0" key, and thereby removing the block. This interlock arrangement requires that the first digit entered be a significant digit and so prevents the capacity of the machine from being reduced by the entry of initial "0's."

VI. ACTUATOR

The actuator includes seventeen actuator sectors 340 (FIGS. 21 and 25) separately rotatable on a transverse actuator shaft 342. These sectors are similar in construction to those of the machine described in U.S. Patent No. 2,832,530, already referred to. A separate sector 340 is provided for each numerical order of the machine. These sectors are oscillated about the shaft 342 during each operating cycle of the machine by an actuator bail rod 344, which lies in slots 341 in the sectors.

Bail rod 344 is driven by actuator cams on the main drive shaft 90. A lead cam 348 and a trail cam 349 (FIGS. 16 and 3) engage two rollers 350 and 352, respectively, carried by a yoke 354 which is fixed to the right end of a transverse shaft 356. This yoke includes gear segment 358 (FIG. 16), which meshes with a segment 360 fixed on the actuator shaft 342. A bail arm 362, fixed to the shaft 342, carries the right end of the bail rod 344, and a similar bail arm 364 (FIG. 27), also fixed to the actuator shaft 342, supports the left end of the bail rod 344. Also located on the left side of the machine (FIG. 27) is a second gear segment 376, similar to segment 360 and similarly fixed to the shaft 342. Gear segment 376 meshes a gear segment 374 which is part of a lever 372 journalled on shaft 356. Lever 372 carries a pin 373 which lies under a rearward extending arm 371 of a lever 377 which carries a roller 379 riding a cam 370. During the first half of each operating cycle of the machine, the actuator cam 348 (FIG. 16) and the cam 370, through lever 377 and pin 373 (FIG. 27), drive the actuator bail 344 down (counter-clockwise in FIG. 21). During this motion, the bail 344 drives against a hook-shaped, spring-loaded member, or sickle, 345 on each actuator sector 340 for driving the sector as far (counter-clockwise in FIG. 21) as it is free to rotate. As is well known, the limit on the rotation of each actuator sector is imposed by the element, such as a selector sector 196, from which a digit is being transferred to the actuator sector. During the second half of each operating cycle of the machine, the bail 344 is returned to its home position, shown in FIG. 21, for returning all of the actuator sectors 340 to their uppermost, or home, positions.

VII. SELECTOR CLEARING BAIL

Cam follower 377 (FIG. 27) also includes a gear segment 378 which drives a pinion 380 on the shaft 382, which supports the selector sectors 196 (FIGS. 16 and 25), and carries the two bail arms 384 and bail rod 386 previously described. The bail rod 386 provides an auxiliary drive for positively returning the selector sectors 196 to their "0," or home, position, during each operating cycle of the machine, and so relieves the spring-controlled drive members 345 (FIG. 21) of part of their load. It ensures that all selector sectors 196 are returned to their "0" positions whether they are aligned with actuator sectors or not, and permits the selector to be cleared during total and subtotal operations, as will be described.

Bail rod 386 also controls the spring-urged operation of the selector sectors 196 during repeat operations and multiplication. In each cycle of such an operation, after the sectors 196 have been driven to their "0" positions for transferring the number from the selector to the actuator, they are released to be reset by their individual springs 195 (FIG. 16), the zero latches 199 being then blocked by the bails 262 and 264 (FIG. 26). At that time bail rod 386 pauses slightly away from its extreme excursion, and the sectors 196 stop against it. Then as the rod 386 rocks (clockwise in FIG. 16) to its home position, the sectors 196 follow it and are stopped individually in their selected positions, as by the pins 198. This action greatly reduces the tendency of the sectors 196 to bounce, and so, during the high speed operation for multiplication, it increases reliability by ensuring that the sectors will be at rest when they are re-engaged by the gear pendant at the beginning of the next machine cycle.

VIII. FRONT GEAR PENDANT

The actuator is arranged to be connected to the selector unit by means of a front gear pendant 390 of well-known construction. It includes a pair of frame members 392 (FIG. 25) and 394 (FIG. 21) supported on a transverse shaft 396. This shaft 396 and shafts 397 and 398 carry three gears for each order, the uppermost gear 395 being permanently in mesh with the actuator sector 340 and the lowest gear being arranged for movement into and out of mesh with the selector sector 196. Frame member 394 carries, at its upper end, an ear 400 which is normally embraced by a notch 708 of a link 710 (FIGS. 9 and 47) for moving the pendant.

Link 710 extends forward from an up-extending arm 712 of a bellcrank 714 journalled at 716. A second arm carries a roller 718 riding a front pendant control cam 720 on the main drive shaft 90. Bellcrank 714 is spring-biased (counter-clockwise as seen in FIG. 47) for holding the roller 718 against the cam. Cam 720 moves the link 710 rearward early in each machine cycle, holds it there until mid-cycle, and then moves it forward again. With the link 710 engaging the ear 400 of the front gear pendant 390, this action swings the pendant into engagement with the selector sectors 196 (FIG. 21) during the first half of the cycle so that the number set into the selector is transferred to the actuator, as is required in addition, subtraction, and certain other operations, and disengages the pendant from the selector at mid-cycle. The forward end of the link 710 is slotted, and guided on a pin 722 (FIGS. 9 and 47) on a bellcrank 724, which is journalled at 726. For totaling, memory-output, clear keyboard, and backspace operations, the bellcrank 724 is rocked clockwise in FIG. 47 for lifting the link 710 and notch 708 clear of the ear 400, as will be explained.

An aligning mechanism for the pendant 390 includes left and right blocking levers 404 and 406 (FIGS. 25 and 16) fixed to opposite ends of a transverse shaft 408. These levers include ears 410 arranged to engage the forward and rear sides of projections 412 on the pendant frames 392 and 394 for holding the pendant in its home position and engaged position, respectively. These aligning levers 404, 406 are rocked by a lever 414 (FIG. 21), having a roller 415 riding a cam 416 on the main drive shaft 90. The aligning levers 404 and 406 hold the pendant 390 against movement during the downstroke, and again during the upstroke, of the actuator sectors 340, but release it for shifting at the home and half-way positions of the cycle.

IX. REAR GEAR PENDANT

A rear pendant indicated generally by the reference numeral 420 (FIG. 21) includes an upper gear 422, a middle gear 424 and a lower gear 426 for each numerical order of the actuator. Left and right frame members 428 and 430 (see also FIG. 44) are journalled on pins 429 and in turn carry shafts 423, 425 and 427 (FIGS. 19 and 20) on which the several gears 422, 424, and 426, respectively, turn free. The upper gears 422 (FIG. 21) are in constant mesh with their respective actuator sectors 340 and similarly the gears 422, 424 and 426 in each order are constantly in mesh. Left and right box cams 436 and 438 on a transverse shaft 440 (FIGS. 21, 25 and 44) embrace pins 437 and 439 for swinging the pendant 420 rearward and forward to carry gears 424, or alternatively the gears 426, as will be explained, into and out of engagement with drive gears 444 of an accumulator indicated generally by the reference numeral 446. The upper portions 441 of the cam surfaces lie at a small angle with their direction of arcuate motion for providing a "dwell" for effectively locking the pendant 420 in its rear, or engaged, position.

X. ACCUMULATOR DRIVE GEARS

Each of the drive gears 444 is in constant mesh with a register gear 448 and is arranged to occupy its normal, upper, or home position, shown in FIG. 21, and a lower, alternative position shown in FIG. 43 for engagement with the gears 424 and 426, respectively. The drive gears 444 turn free on a shaft 452 carried by a pair of brackets 454 and 456 (FIGS. 18, 20 and 25) journalled on the shaft 449 of the register gears 448, and are biased to their upper, normal position by a spring 455, as shown in FIG. 25.

The forward end of the brackets 454 and 456 carry interlocking notches 457 (FIG. 20), which are aligned with the shafts 449 and 452. In the upper position of gear 444 (FIG. 19), notch 457 is aligned with the shaft 425 of the pendant gears 424, and in the lower position of the gear 444 (FIG. 20), the notch is aligned with the shaft 427 of the lowermost gears 426. These shafts enter the notches 457 for holding the gears in positive alignment during their engagement. The forward end of the drive gear brackets 454 and 456 also include an arcuate interlock portion 459 for obstructing the rearward motion of shaft 425 whenever the drive gear brackets 454 and 456 are between their extreme upper or lower positions. The upper and lower limits of the motion of the brackets 454 and 456 are determined by a pin 460 which extends through a hole 461 in the brackets. This interlock action between arms 454 and 456 and shafts 425 and 427 ensures proper alignment of the gears when engaged and also ensures that the pendant 420 is clear of the gears 444 as they move between their lower and upper positions.

In the operation of addition, a number is transferred from the selector to the actuator and simultaneously from the actuator to the accumulator 446. In this operation the drive gears 444 remain in their upper or normal position and the pendant 420 is moved rearward for engaging the gears 424 with the drive gears 444. The register gears 448 accordingly rotate (counter-clockwise as seen in FIG. 21) for the positive entries. The subtraction is performed similarly except that the drive gears 444 are moved to their lower position and are engaged by the lowest pendant gears 426 for driving the register gears 448 clockwise in FIG. 21. When a total or subtotal is read out of the accumulator 446, the drive gears 444 are controlled by a credit balance indicator 536 (FIGS. 18 and 15) as will be described. For a negative value in the accumulator, the drive gears 444 remain in their upper, or normal, position for engagement with the pendant gears 424. For a positive value in the accumulator, the drive gears 444 move to their lower position for engagement with the lowest pendant gears 426. For a total operation, the number is read out of the accumulator during the first half-cycle of operation and is printed, leaving the accumulator clear. For a subtotal operation, the number is read out of the accumulator in the first half-cycle, printed and then returned to the accumulator during the second half-cycle.

XI. ACTUATOR BACKUP PAWLS

Backup pawls 466 (FIGS. 21 and 25) which, in prior constructions, have directly engaged the actuator sectors 340 in the present construction, engage the lowest gears 426 of the rear pendant. The purpose of these pawls, as in prior devices, is to hold the actuator sectors stationary at mid-cycle, during the short interval that the front and rear pendants 390 and 420 are disengaged from the actuator. A seperate pawl 466 is provided for each order, and all are free on a shaft 467. Each pawl has two projections 468 and 470 for engaging an inter-tooth space of the gear 426 in the forward and rear positions of the pendant, respectively. Fixed to shaft 467 are left and right brackets 472 (only one of which is shown, FIG. 25) which carry a pair of rods 476 and 478 which embrace all of the backup pawls 466 for controlling them. Also fixed to the shaft 467 is a lever arm 480 which is engaged by a roller 482 at the lower end of a lever 484 (see also FIG. 30) fixed to a shaft 486 of the tens-transfer mechanism. This shaft 486 is rocked by a lever 488 carrying a roller 490 (see also FIG. 31) which rides on the tens-transfer cam 492 on the main drive shaft 90. The cam 492 lowers the backup pawls 466 early in the operating cycle and holds them disengaged until the actuator sectors have completed their downward movement. It is particularly desirable to remove the load of these backup pawls during the readout of the total or subtotal from the accumulator to ensure that the spring-urged, sickle-shaped levers 345 (FIG. 21) on the actuator sectors can drive the register wheels 448 of the accumulator to their zero stops. At mid-cycle the cam 492 (FIG. 25) lets the backup pawls 466 rise and re-engage the gears 426. During the second half of the operating cycle, the actuator sectors are positively driven to their home positions by the engagement of the bail 344 (FIG. 21) against the top of the slots 341 in the actuator sectors. During this return, the gears 426 (FIG. 25) slip over the backup pawls 466, ratchet-like. To prevent the backup pawls 466 from interfering with the movement of the gear pendant 420 (FIG. 21) into and out of engagement with the drive gear 444 of the accumulator, the pendant frame members 428 and 430 are provided with cam surfaces 431 (FIG. 41) at their lower ends which engage the rod 476 (FIG. 25) for depressing the brackets 472 and 474 as the pendant moves from one of its two positions to the other. No special aligning device, such as the aligning lever 404 or 406 for the front pendant 390 (FIG. 16), is required for the rear pendant 420 because the box cams 436 and 438 (FIG. 44) provide a sufficiently rigid control of the rear pendant.

XII. ACCUMULATOR

The accumulator 446 is best shown in FIGS. 18 and 41 and includes mechanism shown and described in the U.S. Patent No. 2,832,530 already referred to. Thus, the accumulator (FIG. 41) includes, for each numerical order, a twenty-tooth register gear 448 which is provided with a spring-pressed detent 502 for centering it in each digital position.

Fixed to each gear 448 is a two-pointed cam 504 which initiates the tens-transfers. The tens-transfer mechanism operable for positive entries (counter-clockwise in FIG. 41) includes a spring-urged lever, or gate, 508 carrying a spring-pressed live tip 510 arranged to be rocked by the cam 504 when the number in the gear changes from "9" to "10." When rocked, the gate 508 releases a tip 512 of a three-armed, spring-urged lever 516, which is carried on a spring-driven lever 520. When the tip 512 is released, a spring 522 urges the lever 520 (clockwise as seen in FIG. 41). The pawl 514 at the tip of lever 516 is arranged to drive against the teeth of the register gear 448 of the next higher order for driving it an additional tooth-space in the positive direction (counter-clockwise in FIG. 41) for effecting the tens-transfer. However, the transfer lever 520 is restrained by a bail rod 524 during the entry of the number from the actuator, and is permitted to operate only after the pendant gear has been disengaged from the drive gear 444 of the accumulator. The bail rod 524 is carried by a pair of similar brackets 526 (FIGS. 18 and 25) on a shaft 528, which also carries a lever 530. The lever 530 (FIGS. 25 and 30) is connected by a link 532 to the lever 484, previously described, which, through the shaft 486 and lever 488, is controlled by the tens-transfer cam 492 (FIG. 31).

The tens-transfer cam 492 is shown in its home position in FIGS. 25 and 31. Upon the initiation of the machine cycle, the first action of the cam 492 is to rock the arm 488 down. This action swings the bail 524 (FIG. 41) to its lowest position for setting all the arms 520 and causing the tips 512 to engage the gates 508 for latching the levers 516 in a set position. By the time the pendant 420 (FIG. 21) has been engaged with the drive gear 444 and the motion of the actuator begun, the tens-transfer cam 492 (FIG. 31) has permitted the lever 488 to rise slightly and has raised the bail rod 524 (FIG. 41) enough to permit the levers 520 to be unlatched by operation of the gates 508 during the entry of the number from the actuator. Then at about mid-cycle, when the entry from the actuator has been completed, the shoulder 534 (FIG. 31) of the cam 492 passes the roller 490 to raise bail 524 to its uppermost position and permit the tens-transfer operation to be completed. At this time any secondary tens-transfers induced by the primary tens-transfers will be promptly completed, the whole tens-transfer operation being driven by the springs 522.

A "fugitive-one" transfer from the highest to the lowest order is provided for permitting the readout of true negative values, or true "credit balances," as is well known. Similar tens-transfer and fugitive-one transfer mechanism is provided for negative entries, which mechanism includes a live tip 511 (FIG. 41) for each order, arranged to be actuated by the same tens-transfer cam 504 that initiates the positive tens-transfer.

The accumulator includes an indicator of a well-known type, responsive to the fugitive-one transfer, for indicating the sign of the number in the accumulator. A bellcrank, or sign indicator, 536 (FIGS. 18 and 15) turns free on the main register shaft 449 and has a tongue 538 (see also FIG. 41) that lies in alignment with the pawl ends of the lever arm 516 and the corresponding arm of the negative tens-transfer lever in the lowest (right-hand) order. Tongue 538 will be rocked in opposite directions by these transfer pawls when the register goes through "0" in the positive and negative directions. Bellcrank 536 will lie in a clockwise or counter-clockwise position to indicate that the last fugitive-one transfer was negative or positive, respectively. The indicator 536 includes also an up-extending lever 540 which will be sensed by the mechanism shown in FIG. 15 during the readout of the totals and subtotals.

The present accumulator includes zero blocks of a well-known type consisting of bails 542 journalled on shafts 544 for blocking the live tips 510 and 511. For example, when the register gear 448 and tens-transfer cam 504 rotate clockwise in FIG. 41 for the readout of a positive number, they will be stopped when the tens-transfer cam 504 abuts tip 510, which is, in turn, blocked by the bail 542, then in a position (clockwise or to the right of the position shown in FIG. 41) for blocking the tip 510. As shown in FIG. 18, the two bails 542 are connected to a slide 546 which includes an abutment 548 at its extreme left, as seen in FIG. 18. The slide 546 is spring-urged to the left in this figure for normally holding the rocking bails 542 (FIG. 41) clear of the tips 510 and 511 so that normally the blocks are in position to permit entry of numbers into the accumulator. The right-hand frame 430 of the gear pendant 420 (FIG. 18) carries an interponent 550, which is connected thereto by a pin 552 on the pendant frame for guiding a slot 554 in the interponent.

The upper end of interponent 550 is pinned to an arm 556 fixed to a total-subtotal shaft 560. Whenever a total or subtotal is to be taken, the shaft 560 is rotated counter-clockwise as seen in FIG. 18. The rotation is greater for the subtotal, but either motion is sufficient to place the lower end of interponent 550 opposite the abutment 548 of the zero block 546, so that the rearward motion (to the right in FIG. 18) of the gear pendant 420 moves the slide 546 rearward for setting the blocking bails 542 (FIG. 41) behind the tips 510 and 511.

(1) High Speed Features

Under certain conditions of operation, the maximum speed at which the machine may be operated is set by the occurrence of erroneous operations. This limit is, in part, determined by the relationship between the inertias of the parts and the forces exerted by the springs, as, for example, the springs on the gate 508, the live tip 510, the lever 520, the lever 516, and the detent 502 (FIG. 41). While the occurrence of such errors can be moved to a higher speed by increasing the tension of the springs 509 and others, heavier springs are undesirable because they impose additional loads on other parts of the machine. In the present accumulator this difficulty is overcome by providing movable blocks for the tens-transfer levers and the drive gears.

(a) *Movable tens-transfer blocks.*—One tendency for errors occurs in the tens-transfer mechanism during the entry of values from the actuator. For example, if a cam 504 is in the position shown in FIG. 41 during a negative entry, additional rotation of the cam (clockwise in FIG. 41) will rock the live tip 510 of the positive tens-transfer mechanism. It is intended that this tip should simply rock counter-clockwise for letting the cam 504 pass, but under high speed operation there is a tendency for this action to rock the gate 508 down and release the lever 516.

A tendency for erroneous transfers occurs also as a result of the operation for resetting the tens-transfer levers at the beginning of the machine cycle. For example, in FIG. 41, when the bail rod 524 is swung down against the levers 520 for restoring any such levers as have been tripped during the previous machine cycle, the tip 512 of lever 516 strikes the gate 508. It is intended that tip 512 be rocked by gate 508 and then slip into the set position shown in FIG. 41 without moving gate 508. But at high speed, the momentum of the lever 516 may oppose this rocking so that the gate 508 is moved down against its spring and then does not recover quickly enough to block the tip 512 before the bail 524 rises to release the levers 520.

In either of these situations the tip 512 is left disengaged from the gate 508 so that an erroneous tens-transfer is made from that order during that cycle. Accordingly, a bail 566 is provided, having a crosspiece 567 that underlies the rear tip of the gates 508. A similar bail 568 has a crosspiece 569 overlying the similar gates of the negative tens-transfer mechanism. These bails are journalled at 570 and 571 and are biased to nonblocking position by a spring 574 (see also FIGS. 18 and 25). A pin 576 on a down-extending leg of the left-hand frame member 454 of the drive gear assembly (FIG. 25) engages a cam edge at the forward end of blocking bail 566 for lifting the crossbar 567 of the bail 566 into position for blocking the gates 508 of the positive tens-transfer mechanism whenever the drive gears 444 are in their lower, or negative-entry, position. As may best be seen in FIG. 25, the bellcrank 526 of the positive tens-transfer mechanism has a cam surface 580 at its lower end arranged to engage a pin 582 on the blocking bail 566. When the bellcrank 526 and the bail rod 524 are moved to their extreme clockwise position in FIG. 25 for resetting the levers 520 (FIG. 41) of the tens-transfer mechanism, cam surface 580 engages pin 582 and rocks the bail 566 for lifting the crosspiece 567 and locking all of the gates 508. Similar mechanism sets the bail 568 of the negative tens-transfer mechanism for blocking erroneous operation during the resetting of the tens-transfer levers.

(b) *Drive gear stop.*—When the drive gears 444 are shifted from their upper position shown in FIG. 21 to their lower position, for example, for a subtraction operation, each gear 444 rolls about its corresponding register gear 448, which at that time is stationary. This shifting of the gears is performed very quickly because the gears 444 must be shifted before the pendant 420 is brought into engagement with them, and the pendant must be engaged before the bail rod 344 begins to move down for driving the actuator sectors. Because of the high speed with which the gears 444 thus roll, there is some danger that their rotational momentum will be sufficient, when their descent is suddenly stopped by the pin 460 (FIG. 20), to rotate the register wheels 448 against the restraint imposed by the spring-pressed detents 502 (FIG. 41). To prevent any such overthrow errors, the gears 444 roll against a stop bar 586 (FIGS. 42 and 43). This bar is rockably mounted on a rod 587 and urged clockwise in FIG. 42 by a spring 588 against a shoulder 589. In this normal, spring-held position of the bar 586, a forward edge 591 projects into the lower gear space, where it will lie against the face of a tooth of each of the gears 444 when those gears are in their lower position. Thus in FIG. 42, the normal position of the drive gears 444 is the dotted position "a". As these gears are moved to their lower position, they must roll about the register gears 448, and the solid line position "b" shows the drive gears only slightly above their lowermost position. The final position is the dotted position "c". The two positions "b" and "c" depict the rolling motion, and show how the teeth of the gears strike against the forward edge 591 of the stop bar. In addition to thus serving as an abutment for stopping the gears 444, the bar 591, in the position shown in FIG. 42, also blocks further rotation in the rolling direction (counter-clockwise in this figure). As is shown in FIG. 43, the left-hand frame member 428 of the pendant 420 carries a projection 494 which, when the pendant is brought into engagement with the drive gears, strikes a projection 495 on the stop bar 586 and rocks it (counter-clockwise in FIGS. 42 and 43) for swinging the forward edge 591 thereof clear of the drive gears 444, so that those gears are free to be driven by the actuator.

XIII. MECHANISM FOR CONTROLLING ENTRIES INTO, AND READOUTS FROM, THE ACCUMULATOR

The principal mechanism for controlling the transfer of numbers into and out of the accumulator is located to the right of the accumulator and appears in FIGS. 9, 10, 11 and 16. Parts of it also appear in the exploded perspective of FIG. 44. The function of this mechanism is to move the gear pendant 420 into and out of engagement with the drive gears 444 of the accumulator (FIG. 21), to move the drive gears 444 to their lower position when required for negative entries or positive readouts, and to test the sign of the accumulator, all in response to the actuation of other controls which simply call for addition, subtraction, total, or subtotal, and also to control the printing of symbols and the ribbon color, as will be described.

First, it should be noted that for positive and negative entries to the accumulator, and for total operations, the gear pendant 420 must connect the actuator to the accumulator only during the first half of the machine cycle, whereas, for a subtotal operation, the connection must be maintained during both halves of the cycle. Second, it should be noted that the drive gear 444 must be left in its upper, normal position for addition operations and for the readout of negative numbers, and must be shifted to its lower position for subtraction operations and positive readouts.

(1) Swinging the Rear Gear Pendant

The box cams 436 and 438 (FIG. 44), which control the gear pendant 420, are operated by a bellcrank 600 fixed to the same shaft 440. This bellcrank is biased by a spring 602, which urges the bellcrank 600 and the box cams (in a counter-clockwise direction as seen in FIG. 44) for pulling the gear pendant 420 into engagement with the drive gears 444 (FIG. 21). Normally the box cams are blocked in their upper position (clockwise position in FIG. 44) by a hook plate 604, a hook 606 of which engages a pin 608 on the lower end of the bellcrank 600 as shown, for example, in FIGS. 10 and 45. The hook plate 604 is biased counter-clockwise as seen in these figures by a spring 610 to the limit permitted by a control link 612 (FIGS. 9 and 45), in which position the hook 606 engages the pin 608. When released from the hook 606, the bellcrank 600 may be controlled by a lever 614 and a main rear-pendant cam 616 on the main drive shaft 90. The lever 614 is journalled on a stud 618 (FIG. 10) and carries the roller 620 at its forward end for engaging the cam 616. Its rear end is connected to the forward end of the bellcrank 600 by pin-and-slot connection 622.

(a) *For subtotal.*—As may best be seen in FIG. 10, the cam 616 has a high portion engaging the roller 620 only near the home position there shown. Consequently, when the arm 614 is controlled by the cam 616, the arm 614 rocks (clockwise in FIGS. 10 and 44) early in the cycle for lowering the box cams 436 and 438 and thereby engaging the gears of the rear pendant 420 with the drive gears 444 of the accumulator (under force of the spring 602). These parts remain in this position through most of the cycle, as is required for a subtotal operation, and as the cam 616 approaches the home position, the high portion thereof again engages the roller 620 for lifting the box cams 436 and 438 and disengaging the gear pendant 420.

(b) *For addition, subtraction and total.*—Alternatively, the rear pendant 420 may be controlled in part by a lever 626 (FIGS. 10, 44 and 45) and an auxiliary, rear-pendant cam 628 on the main drive shaft 90. Lever 626 is journalled on the stud 618 adjacent the lever 614, and at its forward end carries the roller 630 for riding the cam 628. Lever 626 is biased clockwise as seen in FIGS. 10 and 44 by a spring 632, and it carries a hook 633 pinned to it at 634 biased by a spring 636 against a stop pin 638 (FIG. 50). The crook 640 of the hook member 633 is arranged to normally engage a pin 642 on the lever 614. When the hook is so engaged, the two cams 616 and 628 operate together for controlling the gear pendant 420, as shown in FIG. 45. As may be seen in FIG. 10, a relieved portion of cam 628 at the home position lowers the hook 633 slightly below pin 642 for easy engagement and disengagement. As the machine cycle begins (FIG. 45), the high portion of the cam 616 moves away from the roller 620, and as in the case of the subtotal operation, lets the spring 602 rotate the bellcrank 600 for moving the gear pendant into engagement with the accumulator (FIG. 45). At about mid-cycle, the high portion of cam 628 (FIG. 10) moves into engagement with the follower roller 630 and rotates the arm 626 counter-clockwise as seen in these figures. The crook 640 of hook 633 now comes into engagement with the pin 642 so that the arm 614 rotates counter-clockwise with the arm 626, thereby lifting the box cams 436 and 438 for disengaging the gear pendant 420. Cam 628 continues to hold the gear pendant disengaged during the second half of the machine cycle. This is the operation required for add, subtract, and total operations of the machine.

(2) Shifting the Accumulator Drive Gears

The shifting of the drive gears 444 is controlled by two similar blocking members 652 and 654 journalled free on the total-subtotal shaft 560 (FIGS. 16, 44 and 52). These blocking member are normally held in the position shown in FIG. 16, but when a shift of the drive gears 444 is required, one or the other of these blocking members moves rearward. Their position is then tested by a dog 658 that is journalled on a pin 659 on a lever 660. This lever is journalled on a stud 662 and its forward end (left in FIGS. 16 and 44) has a cam surface 664 arranged to be engaged at the start of each machine cycle by a roller 666 between the two actuator cams 348 and 349. Lever 660 also carries a roller 668 that is held depressed by the periphery of cam 348 until about mid-cycle. Lever 660 is biased to its lower position, and the dog 658 is biased against a pin 661 (clockwise as seen in these figures) by a spring 672 (FIG. 16) that is fastened to an ear 674 on the dog 658 and extends over the pin 659 and down to the frame of the machine. A tail portion 676 of the dog 658 lies forward of a roller 678 (FIGS. 20, 44 and 52) on the lower end of the right-hand arm 456 of the drive gear assembly.

Promptly at the beginning of each machine cycle, the roller 666 on the cams 348 and 349 depresses the cam surface 664 on the lever 660 for lifting the dog 658 to test the positions of the blocks 652 and 654. If these blocks are in their normal positions, so that no shifting of the drive gears 444 is required, the ear 674 on the dogs 658 will simply rise to the rear of the two blocking members 652 and 654, as shown in dotted lines in FIG. 52. But if either blocking member has been moved rearward, it will overlie the ear 674, for example, as shown in FIG. 53. Under this condition, when the lever 660 is rocked to lift the dog 658, the ear 674 is blocked and the dog 658 must turn (counter-clockwise as shown in FIG. 54). This action swings the tail 676 rearward against the roller 678 for swinging the arm 456 (FIG. 19) counter-clockwise for lowering the drive gears 444. This shifting takes place promptly at the start of the machine cycle and is completed before cam 616 (FIGS. 44 and 45) permits the pendant 420 to be engaged.

(3) Interlocking the Drive Gears and Rear Pendant

A second interlock action between the motions of the drive gear assembly and the gear pendant 420 is provided by a curved arm 680 (FIGS. 11 and 52) fixed to box cam shaft 440 and cooperating with a pin 682 on the lever 660. In FIG. 52, these parts are shown in their normal position in solid lines, which show pin 682 lying in a slot 684 provided by the hook-shaped lower end of the arm 680. The initial action is the lifting of the rear end (right in FIG. 52) of the lever 660, and since the lever turns about its support 662, the pin 682 swings substantially free in the slot 684. The highest position of pin 682 is its dotted position in FIG. 52. In this position the pin is clear of the end surface 686 of the crook portion of arm 680. Accordingly, shaft 440 and arm 680 can now turn (counter-clockwise in FIG. 52) for lowering the box cams 436 and 438 (FIG. 44) and bringing the gear pendant 420 into engagement with the drive gears 444. This movement of arm 680 brings the end surface 686 under the pin 682, as shown by the dotted position of these two parts in FIG. 52, so that the arm 680 prevents return movement of arm 660 as long as the box cams 436 and 438 hold the gear pendant 420 in engagement with the drive gears 444. This interlock action between arm 680 and pin 682, among other things, holds lever 660 in its upper position until shaft 440 lifts the box cams 436 and 438 for disengaging the gear pendant 420. This control of lever 660 is particularly desirable during a subtotal operation, because in that operation the pendant is kept in engagement until near the end of the machine cycle, whereas cam 348 releases lever 660 near mid-cycle.

(4) Addition and Subtraction

For an addition operation, the link 612 (FIGS. 9 and 45) is moved forward (left in these views) a short distance and rocks the hook plate 604 clockwise sufficiently that hook 606 unblocks pin 608. Plate 604 also has a slot 690 (FIG. 44) which receives a pin 692 carried by a lever 694 fixed to an add-subtract shaft 696 to which is also fixed a lever 698. At the top of this lever is an ear 702 which is part of the symbol control mechanism (FIG. 11), as will be described. Below the shaft 696, the lever 698 has a slot 704 which embraces a pin 706 on the blocking member 652 (see also FIG. 51). The slight rotation (counter-clockwise in these views) of this lever 698 and the consequent counter-clockwise in these views) of this lever 698 and the consequent counter-clockwise rotation of the blocking member 652 brings this member into alignment with the position of the other similar blocking member 654 (FIG. 16), but does not bring it far enough rearward (right in this view) to intercept the ear 674 of the dog 658. Consequently, for this addition operation the drive gears 444 will be left in their upper, normal position. Since the slight rotation of the hook plate 604 (FIG. 45) has disengaged the hook 606 from the pin 608, and since nothing has disengaged the hook 633 from the pin 642, the machine will perform an addition operation as previously described.

For a subtraction operation the link 612 moves forward a distance substantially twice the distance it is moved for an addition operation. This action produces a greater rotation of the hook plate 604 (FIG. 44), lever 694, lever 698 and the block 652. This greater rearward movement of block 652 brings it into the blocking position, shown, for example, in dotted lines in FIG. 53, so that it intercepts the dog 658 (FIG. 54) and causes the drive gears 444 to be shifted to their lower position for the negative entry. Like the addition operation, the subtraction operation disengages the hook 606 from the pin 608 (FIG. 45) for engaging the pendant 420 with the drive gears under control of both of the cams 616 and 628.

The add-subtract control shaft 696 (FIGS. 10 and 44) extends through to the left side of the machine (FIG. 33) for actuation by the multiplication control, as will be described.

(5) Total and Subtotal

For a total operation a bail 732 (FIGS. 9 and 46) is rocked on its shaft 733 for lifting the tip 734 and releasing a pin 736 for forward movement (left in these figures). When so released, pin 736 moves forward into engagement with a similar, but shorter, tip 738 on a similar subtotal bail 740. For a subtotal operation, both bails 732 and 740 are rocked for releasing pin 736 for a greater forward movement. Pin 736 is carried on a link 742 guided at its forward end on a stationary pin 743 and connected at its rear end to a down-extending leg of a bellcrank 745 journalled on the stud 716. A forward-extending arm of the bellcrank carries a roller 748 that rides a total control cam 750.

(a) *Setting total-subtotal shaft 560.*—Normally the link 742 and bell crank 745 are restrained by the tip 734 of bail 732, but if the total bail 732, or both bails 732 and 740, have been rocked, the roller 748 drops off the high point of cam 750 promptly at the beginning of the machine cycle. The resulting rotation of bellcrank 745 (clockwise in FIGS. 9 and 46) rocks a bellcrank 752 which is fixed to the total-subtotal shaft 560 (see also FIG. 44). The connection between bellcranks 745 and 752 is provided by a pin 753 on the bellcrank 752, which is spring-urged against one leg of the bellcrank 745. As may be seen in FIG. 47, a second pin 754 on the bellcrank 752 overlies the rearward extending arm of the bellcrank 724. Thus the clockwise rotation of bellcrank 745 (in FIG. 46) and the resulting counter-clockwise rotation of bellcrank 752, lifts the forward end of bellcrank 724 (FIG. 47) and disengages the notch 708 from the ear 400 of the front gear pendant, so that the actuator will not be connected to the selector unit during the total and subtotal operations.

(b) *Setting hook plate 604 (FIG. 44).*—Fixed to the total-subtotal shaft 560 is a control lever 758 (FIGS. 11, 44 and 51) which carries a pin 760 that lies in an opening 762 of the hook plate 604 (FIGS. 10 and 44). The pin 760 is shown in its normal position in the slot 762 in FIGS. 10 and 49. The slot includes a portion 763 which clears the pin 760 when the hook plate 604 is rocked (clockwise in these figures) for the add and subtract operation previously described. The slot 762 also includes a portion 764 into which the pin 760 moves for the total and subtotal operations. This portion 764 is cam-shaped so that the rearward movement of pin 760 rocks the plate 604 for disengaging the hook 606 from the pin 608 so that the bellcrank 600 (FIG. 45) can be rocked by the spring 602 under control of the cams 616 and 628 for rocking the box cams 436 and 438 for engaging the rear gear pendant 420 with the drive gears 444.

It will be recalled that the bails 732 and 740 (FIGS. 9 and 46) permit different amounts of motion of the link 742 and the bellcrank 745. Accordingly, the shaft 560 and control level 758 rock (counter-clockwise in FIGS. 44 and 49) one amount for the total operation, and a greater amount for the subtotal operation. The shape of the lower edge 764 of the slot in the cam plate 604 is such that the movement of pin 760 through these two different distances for the total and subtotal produces the same angular motion of plate 604. Furthermore, this is the same amount of motion as the plate 604 makes for the addition operation previously described, so that the resultant movement of blocks 652 (FIGS. 44 and 52) is the same amount as for the addition operation and is insufficient to make the block 652 intercept the gear 674 of the dog 658. Consequently, this action does not control the position of the drive gear 444.

(c) *Control of hook 633 (FIG. 50)*.—The pin 760 (FIG. 44) extends between the two legs of the hook member 633 (FIGS. 10 and 50). The normal position of the pin with respect to this hook member is shown in solid lines at position "a" in FIG. 50, and the position to which it is moved for a total operation is indicated at "b." In neither of these positions does the pin 760 move the hook member 633. Consequently, the hook remains in engagement with the pin 642 (see also FIG. 45) so that the bellcrank 600 is controlled by both of the cams 616 and 628 for engaging the gear pendant 420 with the drive gears only during the first half of the machine cycle, as previously described. For the subtotal operation, the greater rotation of the lever 758 moves the pin 760 to the dotted position "c" in FIG. 50 so that it rocks the hook member 633 to the position shown in dotted lines and disengages the hook 633 from the pin 642. Consequently, in the subtotal operation the bellcrank 600 (FIG. 44) and the gear pendant 420 are controlled only by the main rear-pendant cam 616 so that the gear pendant 420 is held in engagement with the drive gears 444 of the accumulator during both the first and second halves of the machine cycle.

(d) *Miscellaneous actions*.—As was previously explained, the shaft 560 carries an arm 556 (FIG. 18) which, in turn, controls an interponent 550 through which the zero blocks 542 of the accumulator (for example, FIG. 41) are set for readout (total and subtotal) operations. Shaft 560 also extends through to the left side of the machine (for example, FIG. 32) to permit total and subtotal operations to be initiated in connection with automatic multiplication. The bail arm 771 and lever 776 (FIGS. 11 and 15) also control the printing of symbols, as will be explained.

As shown in FIGS. 11 and 51, a hook lever 786 journalled on a stud 787, is arranged to intercept an ear 788 on the total-subtotal control lever 758. This hook 786 is arranged to be raised into intercepting position by the total key 30 so as to limit the motion (counter-clockwise in FIGS. 44 and 51) of the lever 758 to the amount required for the total operation. This action to hook 786 is a precaution against the lever 758 being carried too far by its momentum when the roller 748 (FIG. 46) drops off the cam 750 for a total operation.

(e) *Sign control*.—It will be recalled that in a subtotal or total operation, the position of the drive gears 444 must correspond to the sign of the number that is being withdrawn from the accumulator, and that the sign is indicated by the indicator 536 (FIGS. 15 and 18) which stands in the position in which it was set by the most recent fugitive-one transfer. If the number in the accumulator is negative, the up-extending arm 540 of the indicator 536 (FIG. 15) stands directly under, and just clear of, an ear 768 on the rear end of a bail arm 770 of a bail 772 journalled on a shaft 774 (see also FIG. 11). Bail arm 770 carries a pin 777 which lies in a slot 775 of blocking member 654 (see also FIG. 16). Also journalled on the shaft 774 is the lever 776 (FIGS. 11 and 15) having a notch that embraces a pin 778 on the total-subtotal control lever 758 (FIG. 44). A spring 780 connected between the pin 778 and a pin 782 on the bail arm 771 of bail 772 biases the bail 772 (clockwise as seen in FIGS. 11 and 15) and normally holds the pin 782 against the lever 776, as seen, for example, in FIG. 11. When the lever 758 (FIG. 44) is rocked counter-clockwise in either a total or subtotal operation, the engagement of the pin 778 in the notch of the lever 776 causes that lever to turn (clockwise in FIG. 11). The lever 771, being urged by spring 780, tends to follow this movement, but if the number in the accumulator is negative, the ear 768 (FIG. 15) immediately abuts the upper end of the arm 540 of the sign indicator. The bail 772 then is unable to follow the motion (clockwise in these figures) of the lever 776 and so does not transmit any motion to the blocking member 654. Consequently, the block 654 (FIG. 52) remains clear of the dog 658 and the drive gears 444 are left in their upper position which is correct for reading out the negative number.

However, if there is a positive number in the accumulator, the arm 540 of indicator 536 (FIG. 15) will stand clear (to the left in FIG. 15) of the ear 768 of the bail 772. Accordingly, this bail, urged by spring 780, will follow the motion of lever 776 (see FIG. 11). This action swings blocking member 654 toward the rear and puts it in position to block the ear 674 of the dog 658, similarly to the action of member 676 shown in FIG. 54. Consequently, as the arm 660 rises, dog 658 rotates about its support 659 and drives the roller 678 rearward (FIGS. 54 and 19) for shifting the drive gears 444 to their lower position for the readout of a positive number.

(6) *Aligning Lever 792 (FIG. 51)*

In FIG. 16, an aligning lever 792 journalled at 793 is urged up by a spring 794. A pin 795 on the lever 792 underlies the lever 660. Consequently, the spring 794 holds the lever 792 up so that the pin 795 rides on the bottom of lever 660. Lever 792 includes a blade, or ear, 796 which engages the lower ends of the control levers 698 and 758 (FIGS. 11, 44 and 51). It will be recalled that lever 660 is lifted early in the cycle by cam roller 666 (FIG. 16) and then held beyond mid-cycle by cam 348, and that during subtotal operations it is held up still longer by the interlocking lever 680 (FIG. 52). When the levers 698 and 758 are in their normal positions (shown, for example, in FIG. 51) the blade 796 rises to the rear of these levers for holding them in those normal positions during the operation. The lever 698 has a notch 797 in its lower end that is aligned with the blade 796 when the lever is in its addition setting. When this lever is in its fully operated position, that is, the subtraction position, the blade 796 rises to the front of it. Lever 758 has a similar notch 798, and is similarly locked by blade 796. Thus, the blade 796 of the lever 792 prevents either of these control levers from changing its position during any operation.

XIV. RIGHT SIDE CONTROL KEYS (1) *Print-Only, Addition and Subtraction*

The simplest machine operation is print-only (N) initiated by key 22 (FIGS. 1 and 5). The stem of this key carries a pin 810 lying above an inclined cam surface 812 on the main clutch control bar 138. When key 22 is depressed, pin 810, acting against cam surface 812, forces the bar 138 forward for releasing the main clutch, as was previously described in connection with FIGS. 6 and 12. As was described in connection with FIGS. 8, 12, 13 and 14 the machine operates through only one cycle. Since the ear 400 (FIG. 9) of the front gear pendant is normally engaged by the link 710, the operation of the machine, through one cycle, causes the cam 720 (FIG. 47), through the bellcrank 714 and link 710, to engage the pendant with the selector so that the number in the selector is transferred to the actuator for printing, and then cleared from the machine.

The addition key 14 (FIG. 10) has a stem 814 carrying a pin 816 which overlies a tongue 818 on a lever 820 fixed to the clutch control shaft 186. Accordingly, depression of the addition key 14 rotates the shaft 186 (counter-clockwise in this figure) and, through the arm 140 (FIG. 5), drives the clutch control bar 138 forward for initiating a single machine cycle. Again, because the link 710 (FIG. 9) normally engages the ear 400 of the front gear pendant 390, this action causes the number in the selector to be transferred to the actuator for printing. The pin 816 on the add key stem also carries a roller 817 which overlies a cam surface 824 on the forward end of the add-subtract link 612. The depression of the add key thus moves link 612 forward the single unit of distance required for putting the machine into an addition operation, as has been described, for example, in connection with FIG. 45. Consequently, the number in the selector is transferred by the actuator to the accumulator simultaneously with its receipt from the selector.

The subtraction key 16 (FIG. 9) has a stem 832 carrying a pin 834 overlying a cam edge 836 on the add-subtract bar 612. Depression of the subtraction key 16 causes the pin 834 to act against the cam edge 836 for driving the link 612 forward the two units of distance required for putting the rear pendant control mechanism into subtract operation, as described, for example, in connection with FIGS. 45 and 53. Key stem 832 also carries a pin 838 which lies in a notch 840 of a rearward-extending arm 842 of a bellcrank 844 which carries a pin 848 at the lower end of down-extending arm 846. As shown in FIG. 10, this pin 848 lies to the rear of a tongue 852 of a lever 850 fixed to the clutch control shaft 186. Consequently, depression of the key 16, through the bellcrank 844 and lever 850, rocks the clutch control shaft 186 (counter-clockwise as seen in these figures) and through lever 140 (FIG. 5) moves the clutch bar 138 forward for initiating a single machine cycle for entering the number from the selector subtractively into the accumulator.

It is to be noted that no interlocks are required or provided between any of the keys 22, 14 and 16, whose actions have just been described. The addition key 14 sets up the same controls as does the print-only key 22 and, in addition, moves the link 612. Depression of these two keys 22 and 14 simultaneously results in an addition operation. Depression simultaneously of the print-only and subtraction keys 22 and 16 similarly results in a subtraction operation. The subtraction and addition operations differ in the distance that the link 612 is moved forward, so that simultaneous depression of the two keys 14 and 16 results in a subtraction operation.

(2) *Total and Subtotal*

The total key 30 (FIG. 16) has a key stem 856 carrying a pin 858 which overlies the tongue 860 of a lever, similar to the lever 820 (FIG. 10) and similarly fixed to the shaft 186 so that depression of the total key moves the clutch control bar 138 (FIG. 5) forward for initiating a single machine cycle. Key stem 856 also has an ear 864 overlying the inner bail 866 of two similar bails 866 and 868 journalled on shaft 867. Although it is not shown, the stem of the subtotal key 32 similarly rocks a lever similar to the lever 820 (FIG. 10) and has an ear similar to the ear 864 (FIG. 16) but overlying the outer bail 868. The two bails 866 and 868, rockably mounted on the shaft 867, rock similar levers 870 and 872 (FIG. 16) which, in turn, actuate links 874 and 876 which move forward upon depression of their respective keys.

The total link 874 (FIG. 16) has a slot 880 embracing a pin 882 on an up-extending arm 884 at the left end of bail 732, previously described in connection with FIGS. 9 and 46. Total link 874 continues rearward and is connected to the upper arm of the hook 786 previously described, for example, in connection with FIGS. 11 and 51. Accordingly, depression of the total key 30, in addition to initiating a machine cycle, moves the link 874 (FIG. 16) forward for rocking the bail 732 (counter-clockwise in FIG. 46) and lifting the hook 786 (FIG. 51) for intercepting the ear 788 for setting the rear pendant controls (FIG. 44) for a total operation.

The subtotal link 876, at its rear end, is pinned to an up-extending arm 888 (FIG. 10) of the subtotal bail 740 (FIG. 46). Arm 888 (FIG. 10) includes an ear 890 which lies behind a pin 892 on the upper end of arm 884 of the total link 732 (see also FIG. 16). Accordingly, depression of the subtotal key 32, in addition to setting the machine into operation, rocks both of the bails 732 and 740 for setting up the rear pendant controls (FIG. 44) for a subtotal operation, as previously described.

No interlock is provided between the total and subtotal keys 30 and 32. If these two keys are depressed simultaneously, the rocking of the two bails 732 and 740 (FIG. 46) would permit a subtotal operation, but the action of hook 786 (FIGS. 11 and 51) limits the motion of lever 758 (FIG. 44) so that a total operation results.

However, an interlock is required between the subtotal and total operations on the one hand, and the subtract operation on the other. The subtract operation requires that the hook plate 604 (FIG. 44) rock through its greater angle for setting block 652 for lowering the accumulator gears 444, whereas the subtotal and total operations require that the shifting of the drive gears be controlled by the credit balance indicator 536.

One such interlock between subtraction and readout operations is provided by the pin 760 and slot 762 (FIG. 49). For total and subtotal operation, pin 760 moves into part 764 of slot 762 and prevents hook plate 604 from rocking far enough to cause a subtraction operation. And for subtraction, part 763 of the slot embraces the pin 760 for blocking lever 758 from swinging for setting up a total or subtotal operation. But it is desirable that the keys also be interlocked. Therefore, the bail 868 (FIG. 16), which is actuated by the subtotal key 32, includes an up-extending arm 902 to which is connected a rearward-extending link 904 having a notch 906 underlying a pin 908 extending to the left from the subtraction key 16 (see also FIG. 10). A similar link is connected to a similar arm on the total bail 866 (FIG. 16). Thus when either the total or subtotal key is depressed, its link 904 moves forward and carries the notch 906 out of alignment with the pin 908 so that the link blocks depression of the subtraction key 16. Conversely, the depression of the subtraction key moves the pin 908 into the notches 906 and prevents the depression of either the total or subtotal key. A similar pin 910 may be provided on the addition key 14 (see also FIG. 10) overlying a notch 912 in the two links 904 for similarly preventing operation of the addition key simultaneously with either the total or subtotal key. However, in the machine of the present invention, this last interlock is not required. It will be recalled that an addition operation is set up in the rear pendant control (FIGS. 44 and 48) by a rotation (clockwise in this view) of the hook plate 604, one unit of rotation for disengaging the hook 606 for the pine 608. It will also be recalled that this same motion of hook plate 604 is induced by the pin 760 carried by lever 758 for both the total and subtotal operations. Consequently, the depression of the addition key simultaneously with the total, or the subtotal, key will not alter the total or subtotal operation.

No interlock is required between the selection unit and the total or subtotal keys. The lifting, during the total and subtotal operations, of link (FIG. 9) that controls the front pendant prevents any number in the selector from interfering with the readout from the accumulator, and bail 386 (FIG. 5) sweeps the selector sectors to "0." So normally, a total or subtotal operation clears the selector, but depression of the repeat key 20 with the total or subtotal key prevents the selector from being cleared.

(3) *Repeat*

The repeat (R) key 20, by itself, controls a repeat-add operation. It is mounted on a bellcrank 916 (FIG. 9) journalled at 917. It includes an arm 918 at its rear end having an inclined cam surface 919 which overlies a pin 920 (FIG. 5) on the clutch control bar 138. Thus depression of the repeat key 20 causes cam surface 919 to drive the pin 920 forward for releasing the clutch and setting the machine into operation. The forward arm 922 (FIG. 9) of the bellcrank 916 carries a pin 923 which lies to the rear of an up-extending arm 926 of a bellcrank 930 journalled free on the shaft 186. Another up-extending arm 927 of the bellcrank 930 lies behind the pin 932 on the add-subtract slide 612. Thus depression of the repeat key, and consequent rocking of the bellcrank 916 (clockwise in FIG. 9) also causes pin 923 to drive against the arm 926, swing the bellcrank 930 (counterclockwise in this figure), and drive arm 927 against pin 932 for moving the add-subtract bar 612 forward the distance required for initiating an addition operation. The third arm 928 of the bellcrank 930 carries a pin 933 that is spaced below an arm 934 fixed to a shift 936. To the right end of shaft 936 (FIG. 5) is fixed a lever 938 which is connected by a pin 939 and a spring 940 to the lever 161 which carries the pin 159 (FIG. 8) which guides the hook 154. It will be recalled that hook 154 drives against pin 117 near the end of a machine cycle for disengaging the main drive clutch so that, in most operations, the machine operates through only a single cycle. In the repeat operation, however, the rotation of bellcrank 930 (FIG. 9) lifts the lever 934 and, through the shaft 936, lever 938 and spring 940 (FIG. 5), rocks the lever 161 (counter-clockwise in this figure) for lifting the pin 159 (FIG. 8), thereby lifting the hook 154 clear of the pin 117 and disabling the single cycle action. In this situation spring 126 (FIGS. 6 and 37) holds the clutch dog 114 forward (to the left in FIG. 8), the tooth 120 of the clutch pawl 94 (FIG. 6) remains in engagement with ratchet 84, and the machine repeats, cycle after cycle, as long as key 20 is held fully depressed.

The spacing of pin 933 below arm 934 (FIG. 9) is such that only the final motion of the repeat key 20 moves arm 934. The minimum motion of the key for tripping latch 130 (FIGS. 12 and 13) brings pin 933 into contact with arm 934. Then when the key 20 is tightened down by the action of plate 92 against roller 162 (FIG. 12) for moving the clutch bar, as previously described, the final motion of the key lifts lever 934 (FIG. 9) for lifting hook 154 (FIG. 8). Then at about the three-quarter cycle position, the high part of cam plate 92 leaves the roller 162, to permit the key 20 to rise enough to drop hook 154 into alignment with pin 160 (FIG. 8) for resetting dog 114 and terminating the operation. However, if key 20 is manually held at its lowest position, hook 154 will be held clear of pin 160 so that dog 114 will not be reset, and the machine will continue into another cycle.

Shaft 936 also extends through to the left side of the machine where a lever 944 (FIG. 27) is fixed to it. This lever has an ear 945 overlying a tongue 946 of a lever arm 947 of a bail 950, journalled on a shaft 953, so that when the shaft 936 is rocked upon depression of the repeat key (counter-clockwise in FIG. 27), it rocks the bail 950 (clockwise in FIG. 27). Bail 950 includes the arm 314 (FIGS. 35 and 40) which disables the selector carriage return, as previously described, by blocking the lever 264 to prevent it from rocking (counter-clockwise in FIG. 35).

Returning to FIG. 27, arm 947 includes another extension 948 carrying the pin 949 which overlies a cam edge 955 of a blocking bail 962 for the zero latches 199 (FIGS. 25 and 26) of the selector unit. As previously explained in connection with the selector unit, this action moves both of the bails 962 and 964 for blocking all of the zero latches 199 so that none of the selector sectors are reset to "0." Although the extension 951 is also a part of bail arm 947, it does not move far enough during a repeat operation to move the pin 956.

Accordingly, depression of the repeat key, through cam edge 919, engages the main drive clutch that puts the machine in operation through bellcrank 930 and add-subtract link 612 sets the rear pendant control for the addition operation, and through lever 934 rocks the shaft 936 which disables the single cycle control, prevents the return of the selector unit to its home position and prevents the resetting of the sectors of the selector unit.

The repeat key 20 and subtraction key 16 may be depressed simultaneously. In this operation, the subtraction key 16 (FIG. 9), through its pin 834 acting against cam edge 836, moves the add-subtract control link 612 forward through the greater distance required for the subtract operation. Consequently, it modifies the repeat (R) operation by causing the value to be entered in the accumulator subtractively rather than additively.

The repeat key 20 may also be depressed simultaneously with the print-only key 22, the total key 30, or the subtotal key 32, and will simply modify those operations by preventing the selector from being cleared. Consequently, no interlocks are required between the repeat key and any of the other right side control keys, particularly the keys 14, 22, 30 and 32, although interlocks may be provided if they are desired.

XV. MULTIPLIER STORAGE, OR MEMORY, UNIT

The multiplier storage, or memory, unit includes seventeen identical differentially-settable storage sectors 970 (FIGS. 21, 25 and 55) mounted for free rotation on a common shaft 972 supported in the frame of the machine. In FIG. 21, these sectors are shown in their "0" position. Numbers are transferred to these sectors from the actuator sectors 340 by means of actuator pawls 974 pinned at 975 to the actuator sectors. Each pawl has a pair of gear teeth 976 arranged to be lifted into engagement with gear teeth 977 in the lower edge of its storage sector 970.

As shown in FIG. 55, each sector 970 of the memory or multiplier storage unit is provided with a detent 1055 journalled on a pin 1056 and rocked by a spring 1057 (counter-clockwise in FIG. 55) for urging the corner of an ear 1058 at its forward end into engagement with the notched edge 1059 of an arcuate slot in the storage sector 970. Thus the ear 1058, by resting in a notch of the edge 1059, tends to hold the sector 970 in any digit position in which it is set. When the sector 970 is rotated by the pawl 974, as for example, in the entry and readout of numbers, the detent 1055 is simply rocked by the inclined edges of the notches.

It is desirable, during multiplication operations, to positively lock the sectors 970 for preventing any accidental shifting thereof. Accordingly, a bail 1063 is provided for blocking the detents 1055. Normally, this bail occupies the position shown in full lines in FIGS. 21 and 55. During a multiplication operation, it is moved to the dotted position 1063a in FIG. 55, where it underlies a projection 1054 of every detent lever 1055 and prevents each lever from swinging far enough (clockwise in FIG. 55) to let the ear 1058 clear the projections between the notches of the edge 1059.

As is shown best in FIG. 57, the left leg of bail 1063 carries a pin 1064 that lies in a cam slot 1065 of a bail 1060, which is journalled at 1061 and has a slot 1062 in a depending arm embracing a pin 1049 on a multiplication bar 1050 (FIG. 32). As will be described, bar 1050 is moved forward by the multiplication key 38 and rocks bail 1060 (clockwise in FIG. 57) for camming bail 1063 (also clockwise) into the position 1063a in FIG. 55.

(1) Over-Capacity Test

The detents 1055 are also employed in a test for determining whether the number of digits in the multiplier and multiplicand together is within the capacity of the machine. For this purpose the rear ends 1067 of the detent levers 1055 cooperate with a plate 1066 shown, for example, in FIGS. 21, 24 and 57. The plate 1066 slides along a bail 1068 under control of the selector unit. Bail 1068 is journalled at 1077 and carries an arm 1078 that underlies a pin 1079 on the bail 1060 (FIGS. 55 and 57). When the multiplication bar 1050 (FIG. 32) is moved forward at the start of the multiplication operation, the bail 1068 rocks forward for swinging the plate into the position 1066a shown in dotted lines in FIG. 55. If it abuts even one of the lever ends 1067, its forward motion is blocked. As will be explained in connection with FIG. 100, this blocking of slide 1066 causes the machine to execute a print-only operation instead of multiplication.

The condition that plate 1066 tests for is the position in the memory unit of the highest non-zero order of the number stored therein. To distinguish between zero and non-zero, the notch that the ear 1058 lies in when the sector 970 contains a "0," that is, the extreme forward notch, is sufficiently deep that under this condition the lever end 1067 lies above and clear of the position 1066a, as shown in FIG. 55. The other notches in the edge 1059 are shallower, so that when the sector contains any digit from "1" to "9," the ear 1058 lies higher, and the lever end 1067 lies low enough to block forward motion of the plate 1066, as in FIG. 56.

As may be seen in FIG. 24, the position of the plate 1066 on the bail 1068 is controlled by a bellcrank 1069 which includes an arcuate segment 1070 having gear teeth 1071. These mesh with similar teeth 1072 of a segment 1073 of a bellcrank 1074, shown in FIGS. 40 and 35.

The bellcrank 1074 includes an up-existing arm carrying a gear segment 1076 in mesh with the gear 250. It will be recalled from the previous description that as the selector unit moves left one order at a time during the entry of the number, the rack 232, which is connected to the frame member 179 of the selector unit, moves left, and through the gears 234 and 236, drives the bar 242 forward for rotating the gears 246 and 250 (counter-clockwise as seen in FIG. 40). This motion swings the bellcrank 1074 (clockwise in FIG. 40) and the bellcrank 1069 (counter-clockwise in FIG. 24) for moving the plate 1066 toward the right of the machine (left in the rear view of FIG. 24). Thus, the plate 1066 is connected to, and moves with, the selector unit, but moves right when the selector unit moves left.

When the selector unit is in home position, the plate 1066 lies in the position shown in FIG. 24, that is, just clear of the leftmost (rightmost in FIG. 24), or highest-order, lever-end 1067. When a digit is placed in the first order of the selector unit, by depression of one of the keys 9 (FIG. 1), the selector unit is moved one order to the left, and this action, through the mechanism just described, moves the plate 1066 one order to the right (left in FIG. 24) to bring the plate under the lever end 1067 of the highest order of the memory unit. As digits are entered in additional orders of the selector unit and the unit is indexed to the left, the plate 1066 is stepped to the right with it, order-for-order. Thus the number of orders filled in the selector unit, plus the number of orders that are not blocked by the plate 1066, is constant at seventeen, which is equal to the number of orders in each of the multiplier storage unit and the accumulator.

Although the multiplier storage unit has seventeen orders, the multiplier must be limited to sixteen orders because the machine employs short-cut multiplication. One orders must be left available for a carry-out of the highest order of the number. With this maximum of a sixteen-order multiplier, the multiplicand is permitted only one order. Taking this situation as an example, with one order in the selector occupied, the plate 1066 (FIG. 24) will be aligned with only the highest order (rightmost in FIG. 24) of the memory unit. As is shown in FIG. 55, this condition requires that this highest order contain a "0," but the other sixteen orders will be untested and can contain anything.

As is well known, the number of digits in the product may be as great as the sum of the digits in the multiplier and the multiplicand. For example, the product of "9" and "9" is "81," the product of "9" and "99" is "891" and the product of "99" and 99" is "9801." Thus the over-capacity test provided by the plate 1066 and the lever ends 1067 ensures that the product will not exceed the seventeen orders of the accumulator.

(2) *Operation of Actuator Pawls 974*

The rear ends of the pawls 974 (FIGS. 21 and 55) are supported and guided in slots 978 in plates which are raised and lowered for controlling the engagement and disengagement of the pawls with the teeth 977 of the sectors 970. During each operating cycle of the machine the pawls 974 are moved by the actuator segment 340, rearward during the first half of the cycle and forward during the second half.

The plates that contain the slots 978 are assembled in a basket-like structure 980 (FIGS. 21 and 25) which includes similar end brackets 981 and 982, each of which has a slot 983 at its upper end, embracing a hub on the shaft 972. The lower portions of these end plates carry trunnion rollers 985 and 986 which lie in slots 987 (FIG. 16) in the frame of the machine. The basket 980 is thus guided by the slots 983 embracing the shaft 972 and the slots 897 embracing the rollers 985 and 986. The motion of the basket is controlled by a pair of cam follower arms 991 and 992 (FIGS. 16 and 27) having slots 993 also embracing the trunnion rollers 985 and 986. These followers carry rollers 994 which ride on right and left basket control cams 995 and 996 on the rear drive shaft 110. Springs 997 normally urge the follower arms 991 and 992 (clockwise in FIG. 16) for lifting the basket 980 and thereby engaging the actuator pawls 974 with the sectors 970. The cams 995 and 996 each have two high portions 998 and 999 which drive the basket to its lower position at the full-cycle and mid-cycle positions, respectively.

The follower bellcranks 991 and 992 are also controlled by latches 1003 and 1004 (FIGS. 16 and 27) which are fixed to the same shaft 1005 so that they operate in unison, and are normally held in the position shown by a spring 1006 which acts on a lever 1009 to urge it counter-clockwise (as viewed in FIG. 27). Lever 1009 carries a pin 1010 (see FIG. 28) which is connected by a light spring 1011 to a pin on latch lever 1004 for normally holding the latch lever against pin 1010 but at times permitting the lever 1009 to be swung rearward without the latch 1004. Normally the spring 1006 urges the pin 1010 forward against the rear edge of latch lever 1004 for holding this latch, and also the similar latch 1003 (FIG. 16) forward in the positions shown so that their shoulders 1015 overlie ears 1016 on the bellcranks 991 and 992 for latching the basket 980 in its lower position.

Lever 1009 (FIGS. 27 and 28) carries a pin 1018 which normally lies just behind the rear edge 1019 of a memory control link 1020. During a memory output operation the link 1020 is moved rearward, and through pin 1018, disengages the latches 1003 and 1004 from the bellcranks 991 and 992, permitting the basket to rise under control of the cams 995 and 996.

Latches 1003 and 1004 also have shoulders 1097 which, when the latches are moved rearward, can underlie the ears 1016 for latching the basket 980 up. Since the cams 995 and 996 drive the basket down, these shoulders 1097 cannot be left in latching position when the cam lobes 998 come under rollers 994. Therefore, rollers 1095 and 1145 (FIG. 27) are provided on cam 996 for striking the tail 1096 of the latch lever 1004 for swinging shoulders 1097 clear of the ears 1016 just before the cams pull the basket down.

In FIG. 16, a bellcrank 1021, journalled on a pin 1022, is rocked (counter-clockwise in this figure) just before the end of each machine cycle, by a pin 1023 on cam 995. As the cam so rocks, the forward end 1033 of bellcrank 1021 drives against an ear 1034 on the latch lever 1003, for ensuring that the latches 1003 and 1004 are firmly in the home positions.

(3) Memory Clearing Bail

The memory register is provided with a clearing bail 1025 (FIGS. 21 and 25) supported on bail arms 1026 fixed to the shaft 972. This bail normally lies in the position shown in these figures, and is swung rearward (counterclockwise in FIG. 21) for rotating all of the memory storage sectors 970 to their "0" positions, in which they are shown in FIG. 21 where they stop against a frame tied rod 971. This clearing operation is utilized for clearing one number from the memory before inserting a new one, and it is also utilized as a drive mechanism for ensuring positive operation when a number is read out of the memory unit into the actuator. For operating this clearing bail, the shaft 972 carries a lever arm 1027 (FIGS. 27 and 28) to which is connected a drive link 1028, which at its forward end, has a curved slot 1029 embracing a roller 1030 carried by a rocking plate 1035.

A pin 1036 at the upper edge of the rocking plate 1035 (FIG. 27) lies just behind a rear facing shoulder 1037 of the memory control link 1020 so that the plate is rocked counterclockwise in FIG. 27 when the control link 1020 is moved rearward for a memory output operation. A similar pin 1038 at the lower edge of the rock plate 1035 is rocked in the same direction (counter-clockwise in FIG. 27) by forward movement of the link 1020. Such forward movement accompanies operations for entering numbers into the memory unit, that is, operations initiated by the keys 36, 44, 46 and 48 in FIG. 1. Springs 1040 urge the pins 1036 and 1038 against their respective shoulders 1037 and 1039 for centralizing the link 1020 and for holding the rock plate 1035 in its normal position, shown in FIG. 27.

Thus, movement of the memory control link 1020, either forward or rearward out of its normal, centralized position, rocks the plate 1035 (counter-clockwise in FIG. 27). This action lifts the roller 1030 for lifting the drive link 1028 (FIG. 28). In lifted position, a curved shoulder, or seat, 1045 on the link lies behind a roller 1046 of the actuator gear segment 376. It will be recalled from the previous description that the gear segment 376 is rocked (clockwise in FIG. 28) during the first half of each machine cycle and then is returned (counter-clockwise in FIG. 28) to its home position during the second half of the machine cycle. Therefore, when the link 1028 is held in its lifted position by the roller 1030, the roller 1046, during the first half of the machine cycle, drives rearward against the seat 1045 of the link 1028, for rotating the shaft 972, and with it the reset bail 1025 (FIG. 21), for driving the memory segments to their "0" position. As the gear segment 376 rotates to its home position (counter-clockwise in FIG. 28) during the second half of the machine cycle, a spring 1047 returns the clearing bail 1025 to its normal position. The curve of slot 1029 permits link 1028 to follow the arcuate motion of roller 1046.

Drive link 1028 carries a down-extending projection 1051 (FIGS. 27 and 28) which is arranged to move rearward against the pin 1010 (FIG. 28) on the lever 1009 for operating the latch levers 1004 and 1003 (FIG. 16) during memory entry and readout operations. Another projection 1052 (FIG. 28) on the drive link 1028 controls the printing of symbols, as will be described.

XVI. CONTROL OF MEMORY ENTRY AND READOUT OPERATIONS

(1) *Multiplier-Entry* (×) *Key*

A number may be entered into the multiplier storage, or memory, unit by an operation initiated by depression of the multiplier-entry (×) key 36 (FIG. 1). As is shown in FIG. 27, this key is held in its upper position by a spring 1081. The stem of this key carries a pin 1082 which lies above an inclined slot in a clutch bar 1083 carried by arms 1080 and 1084, of which, arm 1084 is fixed to the shaft 186. As is shown in FIG. 5 and as previously described, shaft 186 at its right end carries an arm 140 connected to the clutch bar 138. Thus when the key 36 (FIG. 27) is depressed, bars 1083 and 138 are moved forward in the machine for releasing the clutch and initiating a machine cycle. The stem of key 36 also carries a pin 1085 which, as shown in FIG. 30, overlies a rearward extending arm 1086 of a bellcrank 1087 having a down-extending arm 1088 to which is pinned the memory control link 1020 by means of a pin 1089 (see also FIG. 31). Thus depression of the key 36, through bellcrank 1087 (FIG. 30), pulls the memory control link 1020 forward (see also FIG. 27).

It will be recalled that typically a number is first entered into the selector unit by means of the keys 9 (FIG. 1) and then the multiplier-entry (×) key 36 is depressed to cause that number to be transferred through the actuator into the multiplier storage, or memory, unit.

Operation of the clutch bar 138 by the key 36, as previously described, sets the machine into operation and the single cycle action previously described (FIGS. 8, 12, 13 and 14) automatically stops the machine at the end of the first cycle. As previously described, the lever 710 (FIG. 47) is normally in engagement with the ear 400 of the front gear pendant so that during the first half of this machine cycle, the number in the selector is transferred to the actuator.

(2) *Input Cycle*

Referring also to FIGS. 27 and 28, the depression of the key 36 moves the memory control link 1020 forward. As previously described, this action causes the pin 1038 to drive the rock plate 1035 (counter-clockwise in this figure) for lifting the notch 1045 (FIG. 28) of the drive link 1028 into alignment with the roller 1046 on the actuator drive gear segment so that during the first half of the machine cycle the link 1028 is driven rearward so that the clearing bail 1025 (FIGS. 21 and 25) drives all of the memory storage sectors toward their "0" positions. At the same time, the rotation (counter-clockwise in FIG. 27) of the rear drive shaft 110 carries the lobe 998 of cam 996 away from the roller 994, and simultaneously the corresponding lobe 998 of the cam 995 moves away from roller 994 in FIG. 16. Thus, early in the cycle the basket bellcranks 991 and 992 (FIGS. 16 and 27) are released by the cams 995 and 996, but they are stopped by the shoulders 1015 of the latch levers 1003 and 1004.

Late in the first half-cycle, while the drive link 1028 (FIG. 28) is still being driven rearward, the lower projection 1051 on the link 1028 engages pin 1010 (FIG. 27) on the lever 1009 and drives that lever rearward. As the pin 1010 moves rearward, spring 1011 tends to pull the latch levers 1004 and 1003 rearward with it but the latches are held by the friction and angle of their engagement with the ears 1015 and 1016 of the bellcranks 991 and 992. The force exerted by the springs 997 is so much greater than light spring 1011, and the angle of engagement between the shoulders 1015 of the bellcranks is such that the pressure of these bellcranks, urged by the springs 997, is sufficient to resist the force of the spring 1011 and thereby prevent the latch levers 1003 and 1004 from following the rearward motion of the lever 1009.

Also during the first half of the machine cycle, the actuator pawls 974 are moved rearward (to the right as seen in FIGS. 21 and 55), but because the bellcranks 991 and 992 have not been permitted to follow the cams 995 and 996, the basket 980 has remained in its lower position and the pawls 976 have not engaged the sectors 970. It will be recalled that each sector 340 of the actuator rotates to an angular position that depends on the digit that it receives from the selector unit, and accordingly each sector 340 moves the pawl 974 that is connected to it, rearward a distance also corresponding to that digit, as for example, to a position such as 976b in FIG. 55.

At mid-cycle, when the pawls 974 have all completed their rearward motion, the smaller lobes 999 of cams 995 and 996 (FIGS. 16 and 27) come under rollers 994 of the basket bellcranks 991 and 992. This action lowers the ears 1016 of these bellcranks, and releases their pressure on the shoulders 1015 of the latch levers 1003 and 1004 for releasing those levers to the action of the spring 1011, which is still extended because the drive link 1028 is, at this time, at its extreme rearward position. Thus, at mid-cycle, the basket control bellcranks 991 and 992 are released to the control of their cams 995 and 996. As the machine enters the second half of the cycle, rollers 994 run off the lobes of the cams, the bellcranks 991 and 992 rock (counter-clockwise as seen in FIG. 27) and permit the springs 997 to lift the basket 980 so that the pawls 974 (FIG. 55) are lifted into a position, such as 976c, for engaging the sectors 970. Thereafter as the machine continues in the second half-cycle, the actuator bail rod 344 (FIG. 21) is swung up to its home position for driving all of the actuator sectors home. This action moves the pawls 974 forward (left in FIG. 55) for transferring the values from the actuator sectors to the multiplier storage sectors 970, bringing the parts to a position, such as that shown in FIG. 56, with the gear portion of the pawl 976 in its extreme forward position but still in engagement with sector 970, as indicated at 976d.

As the machine approaches the end of the cycle, the lobes 998 of the cams 995 and 996 (FIGS. 16 and 27) again come under the rollers 994 for again lowering the basket. At the same time, the roller 1095 on the cam 996 (FIG. 27) drives against the lower end 1096 of the latch lever 1004 for ensuring that this lever is swung forward so that a shoulder 1097 on this hook lever is moved forward and clear of the ear 1016 on the bellcrank 992, and for clearing a similar shoulder on the right side of the machine, as shown in FIG. 16. Accordingly at the end of the machine cycle, the number has been transferred from the selector to the memory, or multiplier storage, unit and the selector has been cleared.

(3) *Squaring Entry* ($\times^2$) *Key*

The operation initiated by the squaring entry ($\times^2$) key 46 (FIG. 1) differs from the "$\times$" operation of key 36 in that the selector unit is not cleared. The stem 1103 of the "$\times^2$" key 46 carries a pin 1104 (FIG. 34) which overlies the pin 1085 (FIG. 30) on the stem of the "$\times$" key 36 so that depression of the "$\times^2$" key depresses also the "$\times$" key and initiates the multiplier entry operation, as previously described. However, the stem 1103 at its lower end carries a pin 1101 which carries a roller 1105 which overlies a forward extending arm 952 (FIG. 35) of the repeat bellcrank 950. Accordingly, depression of the square key 46 rocks the bellcrank 314 (clockwise in FIGS. 35 and 40), swinging the hook 316 over the ear 267 for preventing the return of the selector unit to home position, and operates bails 962 and 964 (FIGS. 25 and 26) for preventing the selector sectors 196 from being reset. Consequently after a number to be squared is entered in the selector unit by means of the keys 9, the "$\times^2$" key 46 may be depressed for entering that number into the multiplier-storage unit and at the same time retaining it in the selector. Then depression of the multiplication (=) key 38 causes that number in the selector to be multiplied by the same number in the multiplier unit for producing the square of the number.

Also pinned at 1101 (FIG. 33) to the stem of the "$\times^2$" key is a latch 1102 having an oblique slot 1106 embracing a pin 1107 on the frame of the machine. As the "$\times^2$" key is depressed, latch arm 1102 swings rearward so that its upper end (FIG. 32) swings under pin 1085 on the "$\times$" key (see also FIG. 30). The "$\times$" key is locked down during the machine cycle by engagement of its pin 1082 (FIG. 27) with the inclined slot in the clutch bar 1083, and latch 1102 thus locks the "$\times^2$" key down.

(4) *Memory Input* (*MI*) *Key*

The memory input key 48 (FIG. 1) is an extra-function, preparatory key, and does not operate the clutch for initiating a machine cycle. The stem of key 48 carries a pin 1109 (FIG. 31) which overlies a cam edge 1110 on the link 1020 so that depression of the key 48 moves the link 1020 forward for setting up the controls for the entry of a number into the memory unit. The stem of key 48 also carries a pin 1111 which cooperates with a hook 1112 which is part of a link 1113 that extends rearward to the lever 280 of the selector restore mechanism (FIG. 34). A pin 1114 on the lever 280 lies within a slot at the rear end of link 1113 for supporting the link and for providing a lost motion driving connection therewith. The forward end of link 1113 is supported on a link 1115 to which a spring 1116 is connected for biasing the link 1113 forward (FIG. 31). Thus, upon depression of "MI" key 48, the pin 1111 rocks the hook 1112, passes below it, and is latched in its depressed position. With the key 48 thus latched down, the machine may be put into operation, as, for example, by any of the keys 14, 16, 20, 22, 30 or 32 on the right-hand side of the machine, and the number brought into the actuator by the operation thereby initiated will also be entered into the memory unit. Near the end of the machine cycle the roller 274 (FIGS. 34 and 40) drives against the forward end 276 of the lever arm 280 for rocking that lever. This motion of lever 280 takes up the lost motion at the pin 1114 (FIG. 34) and draws the link 1113 rearward for disengaging the hook 1112 (FIG. 31) from the pin 1111 and thereby releasing the key 48 to be restored by its spring 1108. It is to be noted that the lever 280 is rocked during every machine cycle, whether the selector restore mechanism is blocked or not, and consequently the memory input key 48 will be released at the end of the first cycle, even in connection with a repeat operation initiated by the "R" key 20 (FIG. 1).

(5) *Memory Output* (*MO*) *Key*

The memory output (MO) key 50 (FIG. 1) is also an extra-function, preparatory key and does not control the clutch for initiating a machine cycle. It carries a pin 1121 (FIG. 31) at its lower end overlying a cam surface 1122 on the memory control link 1020 so that when key 50 is depressed, the link 1020 is moved rearward. The stem of key 50 also carries a pin 1123 which cooperates with the hook 1124 on the link 1113 for latching the key 50 down and releasing it at the end of the machine cycle in the same manner as the key 48 is latched and released.

Slide 1020 carries a pin 1129 (FIG. 27) lying in front of the lower end of a lever 1130 fixed to a shaft 1131. Shaft 1131 extends through the machine and at the right side (FIG. 9) carries a lever 1132. An extension 1133 of this lever lies in front of a pin 1134 on the lever 724 (see also FIG. 47). Rearward movement of the link 1020, through pin 1129, rocks the lever 1130 (clockwise in FIG. 27), through shaft 1131 and lever 1132 (FIG. 9) rocks the lever 724 (clockwise in FIGS. 9 and 47) about its support 726, and through pin 722 lifts the link 710 clear of the ear 400 on the front gear pendant. Consequently, during a memory output operation, the front gear pendant cannot be connected to the selector unit.

Another extension 1139 of the lever 1132 (FIG. 9) has a rearward extending hook 1140 arranged to underlie an ear 1141 (see also FIG. 46) on the upper arm 1731 of the total-subtotal bellcrank 752. When the arm 1132 (FIG. 9) is swung rearward by the depression of the memory output key 50, hook 1140 swings under the ear 1141 and blocks rotation (counter-clockwise in FIGS. 9 and 46) of the bellcrank 752 and thus prevents the initiation of a total or subtotal operation. The effect of preventing the engagement of the front gear pendant, or the initiation of a total or subtotal cycle, is to ensure that during the memory output operation, the actuator can receive a number only from the memory unit.

Accordingly, after the memory output key 50 is depressed, the machine cycle may be initiated by any of the keys on the right-hand side of the machine, that is, keys 14, 16, 20, 22, 30 or 32. The print-only key 22, the total key 30 or the subtotal key 32 will cause the machine to read out and print the number in the memory unit, and then, as will be described, return it to the memory unit. It is because the total-subtotal lever 752 (FIG. 9) is blocked by lever 1139, that the total and subtotal keys in this instance produce the same operation as the print-only key. The add key 14 or subtract key 16 will produce the same operation and, in addition, will enter the number into the accumulator, additively or subtractively, respectively. Depression of the repeat key will enter the number from the memory unit into the accumulator repeatedly. During the repeat-add memory-output operation, the "MO" key 50 is held down by a cam edge 1576 (FIG. 103) overlying a pin 1121 on the key stem of the "MO" key 50 (FIG. 31), as will be explained under "CLEAR KEYBOARD AND BACK SPACE." The foregoing memory-output operations utilizing the print-only, total, subtotal, add and subtract keys, all clear the selector; the operation with the repeat key does not.

Interlocks (not shown) are provided to prevent simultaneous use of the memory output key 50 and any of the multiplier-entry and multiplication keys 36, 38, 40, 42, 44 or 46. Interlocks may also be provided between the "MO" key 50 and each of the total and subtotal keys 30 and 32 if desired. As will be described, depression of either the backspace key 26 or the clear keyboard key 24 releases the memory input and memory output keys 48 and 50.

*(6) Readout Cycle*

Referring back to the rearward movement of the memory control link 1020 (FIG. 27) when the "MO" key 50 is depressed, this action also drives against pin 1036 for rocking the plate 1035 (counter-clockwise in this figure) for lifting roller 1030 and thereby lifting the seat 1045 (FIG. 28) into position behind the roller 1046 on the actuator gear segment 376. The rear edge 1019 of the link 1020 also drives against pin 1018, for rocking the lever 1009 and thereby, through spring 1011, pulling the latch lever 1004 rearward, and with it the similar latch lever 1003 (FIG. 16) on the other side of the machine, for unlatching the basket control bellcranks 991 and 992. At this time, the latches 1003 and 1004 are not restrained by the bellcranks 991 and 992. Then when an operating key is depressed, such as the print-only key 22 (FIG. 1), the machine begins an operating cycle. The cams 996 and 995 (FIGS. 16 and 27) quickly run out from under the rollers 994 to permit the springs 997 to lift the basket 980 for raising the pawls 976 (see also FIG. 55) into engagement with the memory sectors 970, and springs 1011 pulls the latch levers 1004 and 1003 rearward to latch ears 1016 in their upper position. Promptly thereafter, the actuator gear segment 376 (FIG. 28) begins rotating (clockwise in this figure) for swinging the actuator bail 344 (FIG. 21) down and driving the actuator segments. At the same time roller 1046 (FIG. 28) drives rearward against the drive link 1028 for driving the clearing bail 1025 (FIG. 21) of the momory unit rearward. It is to be noted that the drive exerted by the actuator bail 344 (FIG. 21) is a yielding drive in that it drives through the spring-loaded, sickle-shaped levers 345, whereas, the clearing bail 1025 of the memory unit positively drives all the memory sectors 970 to "0" and so ensures that the number is properly transferred to the actuator unit.

At mid-cycle the cam lobes 999 must pass rollers 994 and, therefore, the hooks 1097 must release ears 1016 of bellcranks 991 and 992 (FIGS. 16 and 27). As link 1028 approaches its rear position, projection 1051 (FIG. 28) comes against pin 1010, but lever 1009 is already held in its extreme rear position by link 1020 against pin 1018. Accordingly as the machine approaches mid-cycle, the roller 1145 on the cam 996 (FIG. 27) strikes the tail 1096 of the lever 1004 for disengaging the latch shoulder 1097 from the ear 1016 of the bellcrank 992, and similarly disengages the latch lever 1003 from the bellcrank 991 of FIG. 16. Then as the lobes 999 pass the rollers 994, the basket is lowered for disengaging the pawls 997 (FIG. 56) from the storage sectors 970, and immediately raised for re-engaging them. During this temporary disengagement, the memory sectors 970 are held in their "0" positions by the clearing bail 1025, and the actuator sectors 340 are held by the detents 466 (FIG. 21), as previously described. At this mid-cycle, the number thus brought into the accumulator from the memory storage unit is printed in a well-known manner. As the machine goes into the second half of the cycle, the basket 980 is in its upper position so that the teeth 976 of the pawls 974 are in engagement with the memory sectors 970 for connecting them to the actuator. During this second half-cycle, the actuator bail 344 moves up to its home position and positively drives all of the actuator sectors to their "0" positions, and in so doing, transfers the number back to the sectors 970 of the memory unit. As the machine approaches its full-cycle position, the pin 1095 (FIG. 27) on cam 996 strikes the tail 1096 of the latch lever 1004 for unhooking the basket bellcranks 991 and 992, as previously described. The basket is then lowered by the cams 995 and 996 as they come to their home position. Also near the end of the cycle the roller 274 (FIGS. 34 and 40) on cam 270 strikes the end 276 of lever 280 for rocking it and moving the link 1113 rearward, as previously described in connection with the operation of the memory input key 48. This rearward motion of link 1113 disengages hook 1124 (FIG. 31) from the pin 1123, permitting the memory output key 50 to rise to its normal position. The machine will stop under control of the operating key that initiated the operation.

XVII. CLEAR KEYBOARD AND BACKSPACE

The clear keyboard operation initiated by key 24 cycles the machine for clearing the selector. It is essentially a print-only operation with printing suppressed by means of a lever 1565 (FIG. 32), as will be explained under "PRINTING."

Special interlocks are provided to prevent a clear keyboard or a backspace operation from being attempted at the same time as a memory input or memory output operation. In FIG. 103 an interlock lever 1566 is journalled at 1567 on the stem 1568 of the clear keyboard key 24 (see also FIG. 1) and is biased rearward by a spring 1569 against a shouldered stop-and-guide pin 1570. A pin 1571 on the clutch control bar 1083 is aligned with a shoulder 1572 on the lever 1566 for driving the lever forward (counter-clockwise in FIG. 103) when the clutch is operated for cycling the machine. However, if the clear keyboard key 24 is depressed, the shoulder 1572 is lowered and left clear of the pin 1571. The lower end of lever 1566 is provided with slots 1573 and 1574 cooperating with the pins 1109 and 1121 on the memory input and memory output keys. With the clear keyboard key 24 in its upper position, and the lever 1566 swung forward by pin 1571, the pins 1109 and 1121 on the memory input and memory output keys are embraced by the slots 1573 and 1574, or one or the other is forced to its fully depressed position by a cam face 1575 or 1576. (The two pins 1109 and 1121 cannot be depressed simultaneously because they act in opposite directions on the cam faces 1110 and 1112 of the memory control link 1020, FIG. 31.) Thus, for example, if the memory input key 48 is only partially depressed at the same time as an operating key, such as the addition key 14, is depressed, the movement of the clutch bar 1083, through pin 1571 and lever 1566, will force the memory input key to its fully depressed position for proper operation. When the clear keyboard key 24 is depressed, the lever 1566 moves down with it, staying clear of the pins 1109 and 1121. The clear keyboard key stem 1568 also carries a pin 1580 (FIG. 25) which, as shown in FIG. 31, overlies a cam edge 1581 of the link 1113 which carries the two hooks 1112 and 1124 that latch down the keys 48 and 50. Consequently the depression of the clear keyboard key 24 releases the memory input and memory output keys to prevent any inadvertent memory transfer operation at the same time. The clear keyboard key stem 1568 also carries a pin 1582 which cooperates with the clutch bar 1083 (FIG. 103) so that the key actuates the clutch bar and the clutch bar locks the key 24 down.

An interlock is provided to prevent the clear keyboard key 24 from being depressed simultaneously with any of the right side control keys 14, 16, 20, 22, 30 or 32, or with any of the multiplication keys 36, 38, 40, 42, 44 or 48. This interlock is of a known type and includes a bar, not shown, but similar to, and lying parallel to the clutch bar 1083 (FIG. 103) which is similarly moved by the pin 1582 on the key stem 1568 when the clear keyboard key is depressed. This same interlock bar is blocked by an ear 1583 (FIG. 25) on the bellcrank 326 whenever the selector unit is in home position. It will be recalled that bellcrank 326 is moved by bellcrank 322 which, in turn, is controlled by a cam 320 (FIG. 40) on the rack 230 connected to the frame piece 179 of the selector carriage.

The backspace key 26 has a key stem 1585 (FIG. 27) with a shoulder 1586 that overlies the pin 1567 of the clear keyboard key (FIG. 103) so that depression of the backspace key depresses also the clear keyboard key. The backspacing key stem 1585 also has a pin 1587 (FIG. 27) that cooperates with an inclined slot in the clutch bar 1083 so that the clutch bar locks the backspacing key 26 down. Another pin 1588 (FIG. 27) on the backspacing key stem 1585 overlies the arm 948 of the bail 950, which was described in connection with repeat operations. The backspacing key swings the bail 950 through approximately twice the angle that the setting for the repeat operation does, and so initiates additional operations. Thus, while pin 949 (FIGS. 25 and 26) rocks the bail 962 as in the repeat setting, arm 951 (FIGS. 26 and 27) now swings far enough to engage the pin 956 and prevent the bail 964 from operating, so that the lowest order of the number in the selector will be cleared. As in the repeat setting, the hook 316 (FIG. 35) swings over the ear 267 for preventing the selector unit from being driven home, and the additional motion also brings a one-order backspacing drive into operation. An arm 1591 of the bail 950 (FIG. 35) has journalled thereon a pawl 1592 which is urged clockwise by a spring 1595 and which, when the bail 950 is swung through the double angle for backspace, engages rack teeth 1593 of the rack bar 242 (see also FIG. 40). The pawl 1592 is aligned with a cam 1594 on the main drive shaft 90 (see also FIG. 3). Thus, with the backspace key depressed, and the arm 1591 in its uppermost position, the cam 1594 drives the pawl 1592 during the second half of the machine cycle (FIG. 35) and through rack bar 242 and other mechanism described in connection with FIG. 40, drives the selector carriage one order to the right. The single cycle action described in connection with FIGS. 5 and 8, limits the operation to one cycle for each depression of the key. A spring-urged stop pawl 1596 (FIG. 35) is arranged to engage shoulders 1597 and 1598 of the arm 1591 during the repeat and backspace operations, respectively. A roller 1599 on the cam 270 releases this pawl 1596 as the machine returns to home position. Thus, the pawl 1596 ensures that the bail 950 remains in its operative position through substantially the whole machine cycle, and further, steadies the arm 1591 against the forces exerted on it in driving the rack 242. In its uppermost position the arm 1591 also rests against fixed pins 1601 and 1602 (FIG. 35) for further steadying it.

XVIII. SHORT CUT MULTIPLICATION

The machine of the present invention performs multiplication by repeatedly entering the multiplicand from the selector into the accumulator under control of the digits of the multiplier in the memory, or multiplier-storage unit. More particularly, it employs a process of short-cut multiplication. Several specific programs for short-cut multiplication are well known, and in general they are characterized by adding the multiplicand into the accumulator for small multiplier digits and subtracting it for large multiplier digits with a positive carry into the next highest multiplier order after such a subtraction. If it is desired to enter the product subtractively into the accumulator, all of these operations are inverted. In that case, for a small multiplier digit, the multiplicand is entered subtractively, and for a large multiplier digit, the multiplicand is entered additively and a negative carry is entered in the next higher order. Accordingly, in this specification the short-cut multiplication process will, at times, be spoken of as employing selected-sign and inverse entries.

In the machine of the present invention, the multiplicand and its multiples of ten, are entered according to the selected sign the required number of times for multiplier digits of "1" to "4," inclusive, and are entered inversely when the multiplier digits have values of "5" to "9," inclusive. Following an inverse entry, a selected-sign carry must be introduced in the next higher order of the multiplier, the effect of which is to produce either an additional selected-sign entry in that order, or one fewer inverse entries.

The control proceeds from the lowest order of the multiplier to the highest. Thus, if the multiplier is "26," the machine responds first to the "6." The multiplicand will be entered inversely four times, the multiplicand will be shifted to multiply it by ten and that tens multiple of the multiplicand will then be entered according to the selected sign three times, twice for the digit "2" and once for the carry. If the multiplier is "96," the machine will first respond to the "6" and enter the multiplicand from the selector four times inversely. Then when the machine responds to the "9," which, by itself, calls for one inverse entry, it must also respond to the carry from the lower order, so that no entry will be made of the tens multiple of the multiplicand. Although the multiplier has only two digits, the inverse operation in response to the "9" in the second order requires a carry in the third order, and consequently the machine shifts again and makes a single selected-sign entry of the hundreds multiple of the multiplicand.

XIX. SENSORS FOR THE MULTIPLIER STORAGE SECTORS

It will be apparent from the foregoing that the machine must test, or sense, the number in each order of the multiplier for determining whether the entries are to be of the selected sign or inverse, and for determining the number of such entries to be made, taking into account the carry, if there is one, from the previous order. It is also necessary to provide for stopping the operation of the machine, and it is desirable that the operation be stopped as soon as all of the required entries have been made in the accumulator.

The feelers or sensors which make these tests on the sectors of the memory unit are shown in FIG. 58. There, one sector 970 of the memory, or multiplier storage, unit is shown in its "0" position. In this position a step 1153, labeled "0," is aligned with one edge 1154 (the lower edge in FIG. 58) of a broad-shouldered probe, or feeler, 1151, which is part of a two-part probe 1150 of a digit sensor 1148. The complete probe 1150 (see also FIG. 22) includes also a shiftable tongue 1152, which, in the normal condition of the machine, lies opposite the lower edge of the shoulder probe 1151, as shown in FIG. 58.

The test for the sign of the entries is made by a short-cut feeler 1160 which tests the surface of the "9" step 1161 of sector 970. If the sector contains any digit from "0" to "4," the step 1161 will lie under and support the feeler flange 1160, but if the sector 970 contains a digit of "5" or more, the face 1161 will be clear of the feeler and let it drop, as shown, for example, in FIG. 61.

The test for termination is made by a blade, or feeler, 1165 which tests all of the sectors 970 of orders above, that is, to the left of, the sector with which the feelers 1150 and 1160 are aligned. A deep notch 1166 in each sector 970 is aligned with the feeler 1165 when the sector contains a "0." It also tests for a carry, as will be explained.

(1) Method of Sensing Digits

It will now be explained how the digit feeler 1150 (FIG. 58) tests the position of the memory sector 970 for determining the number of times the multiplicand is to be entered into the accumulator, and how, as a part of this test, it takes account of the carry required by an inverse entry in the previous order. As was explained previously, a "0" stored in the memory sector 970 is indicated by the sector standing in the position shown in FIG. 58. In this position the radial rise 1170 between the "0" step 1153 and the "1" step 1171 is aligned with the center of the shoulder probe 1151. A "1" is indicated by the sector standing in the position (clockwise in FIG. 58) from the position shown in that figure by an angle corresponding to the angular width of the step 1171. A "2" is indicated by the sector standing at a position twice this angle from the position shown in FIG. 58, etc.

When there is no carry from an inverse operation in the previous order, the tongue probe 1152 is aligned with the lower corner 1154 of the shoulder 1151. A number from "0" to "4" in the sector is then sensed or tested by moving the complete feeler 1150 radially toward the sector until it is stopped by engagement of the tongue probe 1152 with one of the steps 1153, 1171, etc., as in FIG. 59. The number of entries of the multiplier to be made in the accumulator is determined, by mechanism to be described, by the distance that the probe 1150 thus moves. If a carry is required, the tongue probe 1152 will have been lifted to lie opposite the upper corner 1155 of the shoulder probe 1151, as shown in FIG. 60, in which case the complete feeler 1150 will move in toward the sector until the corner 1154 strikes the plate (for values from "0" to "4"). It will be noted that the "carry" condition causes the feeler to move in toward the plate one unit farther (for numbers from "0" to "4") than if the tongue probe 1152 had been in the "no-carry" position (FIG. 59) and, accordingly, the sensor indicates to the control mechanism an extra unit to account for the carry.

For numbers "5 to "9" the upper corner 1155 of the shoulder probe 1151 lies opposite the step to be sensed. For example, in FIG. 61 the feeler 1150 is shown sensing a "5." The tongue probe 1152, being in the no-carry position, lies opposite the lower shoulder 1154 and so does not engage the step of the sector 970. When the tongue probe 1152 is in the carry position, as shown in FIG. 62, it lies in front of the upper corner 1155 of the shoulder probe and so engages the step of the plate and holds the feeler 1150 approximately one step farther away from the center of the sector 970 than it would for a no-carry condition. Thus, in FIG. 61, a "5" is sensed with no-carry and the machine will make five inverse entries of the multiplicand into the accumulator. In FIG. 62, a "5" is sensed with a carry. The probe is stopped farther from the center of the sector 970 and will cause the mechanism to make only four inverse entries.

(2) Alternative Digit Sensor

FIGS. 67, 68, 69 and 70 shown an alternative construction for the digit sensor. In FIG. 67, a single feeler 1180 is provided with a lower shoulder 1181, an upper shoulder 1182 and a tongue 1183, which tongue 1183 is shown engaging the "1" step under a no-carry condition. Under a carry condition, the feeler 1180 will be swung to the dotted line position 1180a in FIG. 67, and will move in an additional step distance for sensing the same "1" step of the memory sector as shown in FIG. 68. Similarly, FIGS. 69 and 70 show the probe 1180 in, respectively, the no-carry and carry conditions when sensing a "6" in the memory sector. It is to be noted that the operation of this alternative feeler is similar to that of the construction shown in FIG. 58 in that the protruding tongue and the lower shoulder test, respectively, the no-carry and carry conditions in the "0" to "4" range, and the upper shoulder and the projecting tongue test, respectively, the no-carry and carry conditions in the "5 to "9" range.

(3) Carry Mechanism of Digit Tester

At the beginning of a multiplying operation, the sensors will occupy the positions shown in FIG. 58. The digit tester 1148 includes a frame 1191 (see also FIGS. 22 and 23) supported by pins 1188 (FIG. 25) in two slots 1192 and 1193 (see also FIG. 40) in a sensor carriage frame 1194 that is mounted for transverse movement in the machine (see also FIG. 24). As seen best in FIGS. 22 and 58, the shoulder portion 1151 of the probe 1150 is a part of the frame 1191. The tongue portion 1152 is carried on a lever 1195 journalled on a pin 1196 in the frame 1191. A latch 1203 has at its rear end a slot 1204 embracing the pin 1196. Near its front end it carries a pin 1205 which extends through a slot 1206 in the right side of the frame 1191. The latch 1203 is thus slidably guided in the slot 1206 and on the pin 1196. A spring 1207 biases the arm 1195 (counterclockwise in FIG. 58 about its supporting pin 1196, and also biases the latch 1203 rearward for holding the pin 1205 against a shoulder 1208 of the lever 1195. A force applied against an abutment 1224 on an arm 1225 of the lever 1195 will rock the lever (clockwise in FIG. 58) for introducing the carry. This action lifts shoulder 1208 above the pin 1205 as shown in FIG. 65 so that the latch 1203, urged by spring 1207, moves rearward under the edge 1209 for latching the lever 1195 in the "carry" position, as shown, for example, in FIG. 60. With the parts in the "carry" position as shown in FIG. 60, a force applied against a prong 1222 of the latch 1203 will move the latch (to the left in FIGS. 50 and 60) for releasing the lever 1195 so that, under the force of the spring 1207, it returns (counter-clockwise in FIG. 58) to the no-carry position shown in FIGS. 58 and 59.

Sensor frame 1191 has at its lower edge a gear rack 1186 in mesh with a gear 1187 keyed to, but slidable along, a square portion of a shaft 1189. Shaft 1189 controls the movement of the digit sensor 1148 in the slots 1192 and 1193 (FIGS. 25 and 40) toward and away from the storage sector 970, and transmits the sensed value to a counter ratchet wheel 1190 on the shaft 1189 (FIGS. 34, 71 and 73).

(4) Short-Cut Test

The test of whether the entry of the multiplicand is to be of selected sign or inverse sign is performed by lowering a lever 1213 which carries the flange 1160 (FIGS. 23, 25 and 58). This lever rocks about an upper guide rail 1251 and is lifted and lowered by a bail rod 1214. If the number in the storage sector 970 is "4" or less, as in FIGS. 55 and 60, the flange 1160 is stopped by the step 1161 of the storage sector, and this test action does not alter any other mechanism, so that the entries are made with the selected sign. If the number stored in the sector is "5" or more, as in FIGS. 56 and 61, the flange 1160 will miss the abutment 1161 and permit the lever 1213 and bail 1214 to drop. The dropping of bail 1214 controls the inverse entries, as will be described. Also, as lever 1213 drops, an upper flange 1215 drives down against a hook lever 1216 for rocking it (counter-clockwise in FIG. 58). This hook lever is journalled on a pin 1217 on the carriage frame 1194 (FIG. 23) and its rear end is pinned to a link 1218, the lower end of which has a slot 1219 embracing a pin 1227 in the frame 1194. A spring 1220 biases the link 1218 down and the hook lever 1216 (clockwise in FIG. 58) toward their normal, no-carry position.

*(5) Holding the Carry in Short-Cut Tester*

As indicated in FIG. 63, a latch 11233 is provided for retaining the link 1218 in its upper, or carry position. As is shown best in FIG. 64, this latch 1233 is journalled on the pin 1217 and is provided with a spring 1234 for biasing it (clockwise in FIG. 64). Thus, when the link 1218 is raised in response to the sensing of a "5" to "9" multiplier digit by the lever 1213, the latch 1233 moves to the position 1233a, shown in dotted lines in FIG. 64, for engaging a near 1235 on the link 1218 for latching the link 1218 in its upper or "carry" position.

*(6) Transferring the Carry to Digit Tester*

Link 1218 includes an ear 1221 which, in the normal lower position of the link 1218, is aligned with the rear prong 1222 of the sliding latch 1203 of the digit tester 1148, as shown in FIG. 58 and in solid lines in FIG. 63. In the upper, carry-indicating position of the link 1218 (shown in dotted lines in FIG. 63), a pin 1223 is aligned, as indicated at 1223a, with the abutment face 1224 on the arm 1225 of the lever 1195. During the last machine cycle in each order of the multiplier, the digit testing unit 1148 is moved rearward to a counter-overstroke position, to be described, so that the abutment face 1224 abuts the pin 1223, or the latch prong 1222 abuts the ear 1221, for setting the lever 1195 to the carry or no-carry position, respectively, in accordance with the position of the flange 1160 (FIG. 58) and link 1218, as set by the short-cut test in that order. This setting of the lever 1195 determines whether or not a "carry" is to be included in the next order of the multiplier. This setting is used only in the digit test for that next order, but remains until the next counter-overstroke.

*(7) Termination Test*

Late in the last machine cycle of each order the termination test is made for determining whether the multiplication has been completed. For this purpose the blade 1165 is lowered (FIGS. 25, 58 and 66). This blade is part of a lever 1241 which rocks about a lower guide rail 1252. This lever includes an arcuate portion 1243 that lies in a slot in the rear skirt of the frame 1194, for guiding the arm 1241 and keeping the blade 1165 in proper ordinal alignment with the other testing elements 1150 and 1160 (FIG. 58). The lever 1241 and blade 1165 are controlled by a bail 1244 supported in levers 1245 and 1246 (FIGS. 16, 23 and 32). If all higher orders are at "0" and lever 1216 is at no-carry, the blade 1165 and the bail 1244 will drop to the position shown in solid lines in FIG. 66. This dropping of bail 1244 will control the termination of the multiplication operation, as will be explained. If a carry has been set, the link 1218 (FIGS. 58 and 64) will still be latched in its upper position so that the hook lever 1216 will be held in its counter-clockwise position 1216a, indicated in dotted lines in FIG. 66. In this position the hook 1247 of the lever 1216 will stop the bail 1244 in the position 1244a shown in dotted lines. Alternatively, if any one of the sectors 970 of orders higher than the one just completed is not at the "0" position, the deep slot 1166 of that sector will not be aligned with the blade 1165 and consequently that sector will prevent the bail 1244 from falling to the full line position shown in FIG. 66. In either of these situations, the operation will be continued and the sensors will test the next higher order of the multiplier-storage unit.

*(8) Resetting the Termination and Short-Cut Testers*

After the termination test, bail 1244 is lifted and carried past its home position to an overstroke position 1244b shown in dotted lines in FIG. 66 at which it strikes the latch 1233 (see also FIG. 64), rocks this latch counter-clockwise in these figures for permitting the spring 1220 to return the link 1218 and the hook lever 1216 to their normal no-carry positions shown in solid lines in FIGS. 58 and 63. The bail 1244 then moves down slightly to its home position 1244c, indicated by dotted lines in FIG. 66. It is to be noted that the return of the link 1218 and hook lever 1216 to the normal, no-carry position shown in FIG. 58, occurs after the lever 1195 of the digit sensor has been set to carry, or released, as required for the next order, and that this return of the link 1218 does not immediately affect the setting of lever 1195.

XX. SENSOR CARRIAGE

Carriage frame 1194 for the multiplier sensors slides on the two transverse rails 1251 and 1252 (FIGS. 21, 23 and 25). It is biased toward the left of the machine by a spring 1253 (FIG. 24). A gear rack 1254 (FIGS. 23 and 40), carried by the carriage frame 1194, is in mesh with a spur gear 1255 (also FIG. 27) on a shaft 1256 which carries a bevel gear 1257 in engagement with a second bevel gear 1258 fixed to a shaft 1259 (see also FIGS. 30 and 101).

*(1) Clutch for Sensor and Selector Carriages*

Shaft 1259 has a square portion carrying a sliding, toothed, clutch plate 1264 with a grooved hub engaged by a control bellcrank 1262 (FIGS. 33, 101 and 40). The teeth of clutch plate 1264 are arranged to engage the teeth 1265 of a spider fixed to the gears 246 and 250. As was previously described in connection with FIG. 40, gears 250 and 246 are connected through rack bars 242 and 232 to the frame 179 of the selector unit. Thus during multiplication the clutch 1264, 1265 serves to connect the multiplier readout sensor carriage with the selection unit carriage, which will contain the multiplicand.

The right-hand end 1266 of the bellcrank 1262 (FIG. 101) engages the upper end of a lever 1267 journalled at 1268 (FIGS. 31 and 100). Lever 1267 has an ear 1269 at its lower end, by which it is engaged for operation by bar 1050 upon initiation of the multiplication operation (FIG. 32). A spring 1270 (FIG. 31), at the lower end of the lever 1267, biases the lever end 1266 forward for biasing the plate 1264 away from, and clear of, the spider 1265 for disconnecting the multiplier sensor carriage from the selector unit. A latching bellcrank 1271, carried on the same journal 1268 as lever 1267, has a depending arm 1272 which is connected by a spring 1273 to the lever 1267, for biasing the bellcrank 1271 (clockwise in FIG. 31) and for normally holding it against a stop 1274. When in this normal position, the latch 1271 intercepts a pawl 1275 which is fixed to the shaft 1259. Since shaft 1259 (FIGS. 40 and 101) is geared to the multiplier sensor carriage 1194, this engagement of the pawl 1275 (FIG. 31) by the latch 1271 prevents leftward movement of the multiplier sensor unit. Specifically, the parts are so adjusted that the latch 1271 holds the multiplier sensors in alignment with the first, right-hand, or lowest order of the multiplier unit. That is, the position at which it begins a multiplying operation.

When a multiplication operation is initiated, the lower end of lever 1267 is moved forward (to the right in FIG. 31) and as it moves it immediately begins moving the clutch plate 1264 (FIG. 101) for bringing it into engagement with the spider teeth 1265. Because there is considerable lost motion between the lever 1267 (FIG. 31) and the lower arm 1272 of the latch 1271, that latch does not move immediately. Consequently, as the lever 1267 is swung (counter-clockwise in FIG. 31), the spring 1273 continues to hold the latch 1271 in engagement with the pawl 1275. After the clutch 1264, 1265 has been firmly engaged, the lever 1267 abuts an ear 1276 on the arm 1272 and withdraws the latch 1271 from the pawl 1275, thereby freeing the multiplier sensor carriage 1194 for movement with the selector unit during the operation of multiplication.

*(2) Homing the Sensor Carriage*

At the end of the multiplying operation, the lever 1267 will be restored to its normal position shown in FIG. 31. This action will disengage the clutch 1264, 1265 (FIG. 101) and will restore latch 1271 to its pawl-interceptive position. However, the pawl 1275 will be out of its normal position, and consequently the carriage 1194 will run free under the force of the spring 1253, toward the left until an ear 1281 on the frame 1194 abuts the upper end 1282 of a restoring lever 1283 (FIGS. 40 and 24). The lower end of lever 1283 has a slot 1284 embracing a pin 1285 on the lever 1069 which, as previously described, is continuously coupled to the selector carriage. As the selector carriage is restored toward the right of the machine, lever 1283 is rocked (counter-clockwise in FIG. 24) for driving the carriage 1194 to the right of the machine (toward the left in FIG. 24). It will be recalled from the patents previously referred to that the selector unit, when restored, is moved to the right beyond its home position. This motion similarly carries the carriage 1194 to the right beyond its home position, and in so doing, swings the pawl 1275 (clockwise in FIG. 31) through the position shown in that figure. The pawl 1275 rocks the latch 1271 down and then catches behind it. This action leaves the multiplier sensor unit in its home position in alignment with the first order of the multiplier where it will remain until another multiplication operation is initiated.

XXI. MULTIPLICATION CONTROL MECHANISM

Most of the mechanism that controls the multiplier storage sensors, and that controls the multiplying operation in response thereto, is located in a compact assembly at the upper portion of the machine to the left of the sensor carriage, as indicated at 1305 in FIG. 23. This mechanism is shown partially exploded in the pictorial view of FIG. 71, and in home position in FIGS. 32 to 35, and 72 to 80, inclusive. Certain operating sequences are shown in FIGS. 81 through 98. These parts and their operation will first be described by groups, and then their combined operation will be detailed in an example of multiplication.

*(1) Counter Ratchet Wheel 1190, Stop Pawl 1309, and Poker 1312*

Fixed to the shaft 1189 is a pulley 1306 about which is wrapped a coil spring 1307 (FIGS. 31 and 71) for biasing the shaft (counter-clockwise in FIGS. 21 and 58) for urging the digit sensor 1148 toward the storage sectors 970 of the memory unit. Also fixed to shaft 1189 is the counter ratchet wheel 1190 which is normally engaged by a stop pawl 1309 (FIGS. 34, 71 and 73). This pawl is journalled at 1310 and biased by a spring 1311. The spacing of the teeth on the ratchet wheel 1190 corresponds substantially to the radial difference between the steps on the storage sectors 970, as, for example, between the steps 1153 and 1171 in FIG. 58. As shown in FIG. 59, the "0" position of the ratchet wheel 1190, as determined by the digit tester 1148, is slightly different from the home position, which is also a "0" position, determined by stop pawl 1309. This difference provides a small clearance between probe 1152 (FIG. 58) and the "0" and "9" steps 1153 and 1161 of the storage sector 970 when the tester 1148 is home. A similar small difference may also appear at the other count positions, as shown in FIG. 61.

The stop pawl 1309 is arranged to release the ratchet wheel at the beginning of the multiplication operation by a forward motion of the multiplication control bar 1050, as shown in FIGS. 93 and 94. It is this release of the ratchet wheel 1190 that lets the spring 1307 move the sensor 1150 (FIG. 58) against the storage sector 970 for determining the number of times the multiplicand must be entered. The stop pawl 1309 must also be disengaged from the ratchet wheel 1190 for sensing each of the other orders, and this action is performed by a poker 1312 (shown in FIGS. 33, 71, 74 and 75) which drives against a pin 1316. Poker 1312 is carried by a lever 1313, which is part of a bail 1314, journalled at 1310 and controlled during the multiplication operation by a cam 1315 on the rear drive shaft 110. Arm 1313 carries a pin 1320 (FIGS. 33 and 76) which, in the home position of the machine, is engaged by a hook 1321 on a main multiplication control lever 1322 (FIGS. 77 and 98) for latching the lever 1313 in its home position, in which it is shown in FIGS. 74 and 75. In its home position the poker 1312 is held in an elevated position by a spring-urged latch 1317 which rests atop a pin 1318 on the lever 1313. In this position the poker 1312 is above, and out of alignment with, the pin 1316 on the stop pawl 1309.

Upon initiation of the multiplication operation, the lever 1322 (FIG. 77) is rocked to release the pin 1320 and thereby to release lever 1313 (FIG. 74) to the control of its cam 1315. At the same time, a trident latch 1326 is swung, as will be explained, against a pin 1327 on the latch 1317, as shown in FIG. 85, and lets the poker 1312 drop, as shown in FIGS. 86 and 87.

The poker 1312 includes an arm 1328 which overlies a pin 1329 on the counter ratchet wheel 1190. Whenever the counter wheel 1190 contains a "0," pin 1329 will lie approximately in the position shown in FIGS. 74 and 87, and under this condition, the pin 1329 will hold the poker 1312 in alignment with the pin 1316, as shown in FIG. 87, so that, as arm 1313 is rocked by the cam 1315, the poker 1312 will strike the pin 1316 for releasing the counter wheel 1190 for again moving the value sensor 1150 (FIG. 58) into engagement with a storage sector.

If the ratchet wheel 1190 contains a "1" or a larger digit, the pin 1329 will permit the poker 1312 to drop below the pin 1316, as shown, for example, in FIG. 86. Under this condition, as the arm 1313 is rocked, once each cycle, the poker 1312 will pass under the pin 1316 and will not affect the operation of the ratchet wheel 1190 or its stop pawl 1309. In the last cycle for each order of the multiplier, the ratchet wheel 1190 is moved into an overstroke position so that pin 1329 lifts the poker 1312, as shown in FIG. 88. When this action is followed by a successful termination test, the trident latch 1326 will swing clockwise from the position shown in FIG. 87 and clear of the pin 1327 on the latch 1317, so that the latch 1317 can reposition itself atop the pin 1318 for holding the poker in its home position, as shown in FIG. 75.

*(2) Counter Ratchet Feed*

A counter ratchet feed pawl 1335 is shown in FIGS. 35, 71 and 72. This pawl is part of a bail member 1336 (FIG. 73) journalled at 1337 on a lever 1338. This lever is journalled at 1310, is biased clockwise in these views by a spring 1341, and carries a roller 1339 arranged to ride on a counter feed cam 1340 on the rear drive shaft 110. In the home position of the machine, the pawl 1335 and the lever 1338 are latched in an inactive position by the trident latch 1326. Thus in FIG. 72 the trident latch 1326 engages an ear 1345 on the lever 1338, and, as shown in FIG. 73, a projection 1346 of the latch 1326 lies under a tip 1347 on an arm 1348 of the bail 1336 for holding the feed pawl 1335 clear of the teeth of the counter ratchet wheel 1190.

During the multiplication operation the lever 1338 and the bail 1336 are free of the trident latch 1326, as shown in FIG. 81. Under this condition the arm 1338 is rocked once each machine cycle by the cam 1340 for advancing the ratchet wheel 1190 one notch (counter-clockwise in these figures) for each revolution of the cam 1340, that is, once each machine cycle. The two extreme positions and an intermediate position of drive pawl 1335 are shown in dotted lines in FIGS. 86 and 87. The stroke of the pawl 1335 exceeds the spacing of the notches on the wheel 1190 to provide an overstroke, as shown in FIG. 88, which is required in the last count in each order of the multiplier, and to provide a pre-stroke to ensure pickup of the ratchet tooth, particularly in the first count in each order, for example, with the ratchet wheel as shown in FIG. 59. Thus in FIG. 86 the counter ratchet wheel 1190 stands at its "1" position. One stroke of the drive pawl 1335 will pick up the last tooth (extreme clockwise tooth) at pawl position 1335a, shown in dotted lines, and carry it through the "0" position to the overstroke position of FIG. 88 (pawl position 1335c in FIG. 86). When the counter wheel contains a "0," as shown in FIG. 87, the pawl 1335 does not drive the wheel a full tooth space—it picks up the same last tooth and drives the ratchet wheel 1190 to the same overstroke position. In the full stroke, or extreme rearward, position of the pawl 1335, an upper notch 1333 (FIG. 35) stops against an overthrow stop 1334 which, in a known manner, stops the pawl 1335 and also holds it against the ratchet wheel 1190 for preventing overthrow thereof.

In its extreme forward position, shown in FIG. 81, the drive pawl 1335 is clear of the ratchet wheel 1190, and the tip 1347 of arm 1348 stops against the ear 1345 on lever 1338. The stop pawl 1309 is released by the poker 1312 (for example, in FIG. 87) when the drive pawl 1335 is in this extreme forward position and, therefore, disengaged from the ratchet wheel. When the trident latch is released at the end of the multiplication operation, it will first assume a position such as that shown in FIG. 82 with respect to arm 1348 of the bail 1336. Then as the arm 1338 rocks (clockwise in this figure), a heel portion 1349 of the arm 1348 rocks against the projection 1350 (FIG. 83) of the trident latch 1326 for lifting the tip 1347 above the projection 1346, as shown in dotted lines in FIG. 83 and full lines in FIG. 84. Then, when the arm 1338 is again rocked (counter-clockwise in these figures) the trident latch 1326 re-engages the ear 1345 for returning these parts to their home position shown in FIGS. 72 and 73.

(3) *Digitation Block Cam 1355*

A digitation block cam 1355 (FIGS. 33, 71 and 77) rocks free on the shaft 1189 and is biased clockwise in these figures both by its own weight and also by a spring 1354. It is supported in its home position shown in these figures by the pin 1329 on the counter ratchet wheel 1190, when that wheel is in its home position. In this position cam 1355 abuts a bracket 1356 on the bail 1214 which controls the short-cut test shown, for example, in FIG. 56. When the stop pawl 1309 (FIG. 75) releases the ratchet wheel 1190 at the beginning of each order, cam 1355 moves with it, and among other things, lowers the bail 1214 for the short-cut test.

The cam 1355 also controls a lever 1360 (FIG. 77) journalled at 1361 and biased counter-clockwise in this figure by a spring 1362 (FIGS. 73, 71 and 89). A roller 1363 on the arm 1360 cooperates with a cam 1365 on the rear drive shaft 110. (See particularly FIG. 71 where the upper and lower parts of the lever 1360 are shown separate.) The upper end of lever 1360 has an ear 1368 which cooperates with the cam 1355. When the counter ratchet wheel 1190 contains a "0," it holds the cam 1355 in the position shown in FIG. 77 for blocking the spring-urged, counter-clockwise rotation of the arm 1360. When the counter ratchet wheel contains a "1," or larger digit, the cam 1355 is dropped to a position, such as that shown in FIG. 89, to bring a notch 1369 into alignment with the ear 1368 for permitting the arm 1360 to swing.

Arm 1360 is also provided with a latch 1370 (FIGS. 34, 71 and 73). The function of this latch is to hold the lever 1360 in such position that the ear 1368 is clear of the cam 1355, so that the cam 1355 will be free to drop when the ratchet wheel is released for the first time at the very beginning of the multiplication operation. As may be seen in FIG. 74, a roller 1371 on the cam 1365 lifts the latch 1370 as soon as the machine begins to operate. Then during the entire multiplication operation, the tail of the trident latch 1326 bears against a pin 1372, as shown in FIG. 89, and holds latch 1370 clear of lever 1360.

(4) *Digitation Set*

Thus during the entire multiplication operation, the arm 1360 swings under control of the cam 1365, except when it is blocked by the cam 1355, that is, when there is a "0" in the counter ratchet wheel 1190. Each time the lever 1360 swings counter-clockwise to the position shown in FIG. 89, it sets the add-subtract shaft 696 which extends through the machine (FIGS. 33, 11 and 51) for controlling entries into the accumulator. Pinned at 1375 (FIG. 89) to the lever 1360 is a link 1376. The forward end of this link has a slot 1377 which embraces a pin 1378 that guides the motion of the link 1376. This pin 1378 is supported on a reversing lever 1385 (FIG. 75) which, as will be explained, holds the pin 1378 in one or the other of two positions shown, for example, in FIG. 91. In FIG. 89 the pin 1378 is shown in solid lines in its lower position. Under this condition when the link 1376 is moved forward by the lever 1360, two pins 1379 and 1380 on a depending arm of the link 1376, abut a lever 1381 which is fixed to the plus-minus shaft 696, for turning that shaft to the plus position "b" shown in solid lines in FIG. 89, that is, the position for causing entries to be made additively into the accumulator. When the pin 1378 is held in its upper position, shown in dotted lines at 1378a in FIG. 89, the forward motion of link 1376 sets the shaft 696 for a subtractive entry, as shown in FIG. 90. The lower pin 1380 abuts the lever 1381 and the upper pin 1379 abuts a short link 1382 which has a pin-and-slot connection with the lever 1381, as shown in FIG. 90. The home, plus and minus positions of lever 1381 are indicated in FIG. 89 at "a," "b" and "c," respectively. Thus, early in each cycle, if the counter ratchet wheel 1190 does not contain a "0," the lever 1360 (FIG. 89) moves the link 1376 forward (right in FIG. 89) for rocking the shaft 696 for setting the machine for either an additive or a subtractive entry of the multiplicand into the accumulator.

(5) *Digitation Sign Control*

The reversing lever 1385 is a bail formation journalled on a pin 1384 and appears partly in FIG. 35 and partly in FIG. 33. The position of this reversing lever is controlled by a link 1387 (FIGS. 34 and 91), the upper end of which is connected to the bail 1214 which controls the test for selected sign or inverse entries (short-cut test). The lower end of this link 1387 carries a pin 1388 (FIG. 91) which is embraced by a slot 1389 in the lever 1385. The link 1387 can be swung for placing the pin 1388 in either the forward or rear end of the slot 1389.

Normally the link 1387 is in a rear position, as shown in FIG. 91, and it remains in that position during a positive multiplication operation initiated by the multiplication (=) key 38 (FIG. 1). As was previously explained, if a value from "0" to "4" is in the storage sector 970 of the memory unit, the flange 1160 (FIGS. 91 and 58) of the short-cut test lever 1213 will abut the step 1161 of the storage sector, so that the lever 1213 and the bail 1214 will occupy the position shown in solid lines in FIG. 91. Under this condition the reversing lever 1385 will occupy the position shown in solid lines in FIG. 91 for holding the pin 1378 in its lower, or "plus," position for an additive entry, as was explained in connection with FIG. 89. If the storage sector of the memory unit contains a number from "5" to "9," the lever 1213 will drop, as indicated by the dotted lines in FIG. 91, thereby lowering the link 1387 and rocking the reversing lever 1385 to the dotted position shown in FIG. 91 for causing the mechanism of FIG. 89 to set the accumulator for a subtractive entry, as shown in FIG. 90.

It will be recalled that the purpose of the negative multiplication (−=) key 40 (FIG. 1) is to enter a product subtractively into the accumulator. Under this condition, selected-sign entries are negative and inverse entries are positive. Depression of the key 40, among other things, swings the link 1387 forward to the position shown in FIG. 92. This forward movement of the link 1387 and its pin 1388, rocks the reversing lever 1385 to place the pin 1378 in its upper position and also places the pin 1388 on the forward side of the journal 1384 of the reversing lever. Under this condition a number from "0" to "4" in the storage sector causes a subtractive entry into the accumulator, and a number from "5" to "9" permits the bail 1214 to drop and swing the reversing lever 1385 to the dotted position in FIG. 92 for putting the pin 1378 in its lower position and causing the link 1376 to set the shaft 696 for an additive entry.

(6) *Multiplier Key and Multiplier Bar 1050*

The multiplication control link or "equals bar" 1050 appears in its normal position in FIGS. 32, 78 and 100. In FIG. 100, the multiplier key 38 includes a stem 1401 which carries a spring-urged overload cam 1402. The initial slight depression of the key 38, through the cam 1402 that overlies a pin 1410 on a lever 1404 that is journalled on a pin 1403 and that is biased (counter-clockwise in this view) by a light spring 1405, rocks the lever 1404 and draws the bar 1050 forward slightly. This slight forward motion, through pin 1049 (FIG. 71), rocks the bail 1060 (FIG. 57), which, in turn, rocks the bail 1063 for making the over-capacity test previously described in connection with FIGS. 21 and 55. If there are too many orders in the multiplier and multiplicand, slide 1066 (FIG. 21) will be stopped by a lever end 1067 and will block the forward motion of the equals bar (=) 1050 (FIG. 71) before any other control actions are performed. Accordingly, with bar 1050 blocked, overload cam 1402 (FIG. 100) is rocked and key 38 is depressed without initiating the multiplication operation. Depression of key 38, through a pin 1430 (FIG. 27) actuates the clutch bar 1083, and a machine cycle is started. As was described in connection with the print-only key 22, the actuation of only the clutch control causes a print-only operation which clears the selector unit.

Returning to FIG. 100, if bar 1050 is not blocked by the over-capacity test, movement of lever 1404 continues. Also journalled on the pin 1403 is a depending hook 1406 which has a lost motion connection at 1407 with the lever 1404. A light spring 1414 holds hook 1406 in engagement with a pin 1411 on a lever 1408 during the over-capacity test. The initial motion of lever 1404 beyond the over-capacity test, swings this hook for releasing the lever 1408 which is loaded by a heavy spring 1409. Upon this release, the spring 1409 rocks the lever (clockwise in this figure) and pulls the equals bar 1050 forward for initiating the multiplication operation. This action of spring 1409, through lever 1404 and a pin 1410, drives the key 38 to its fully depressed condition. This action of key 38, through the pin 1430, drives the clutch bar 1083 (FIG. 27) forward. Also, a pin 1412 on the lever 1408 depresses tongue 1413 of lever 944 (FIG. 27) for setting the machine for repeat operation. Lever 944 rocks shaft 936, which, through levers 938 and 161 (FIGS. 5 and 8), lifts hook 154 for disabling the single cycle action. The tongue 945 (FIG. 27) also rocks the bail 950, as previously described, for lifting the zero latches of the selector unit (pin 949 and bails 962 and 964, FIGS. 27, 25 and 26) and for blocking the selector carriage return at 316 (FIGS. 35 and 40).

Referring to FIG. 93, the stop pawl 1309 includes a tail portion 1415 that carries a pin 1416 which, in home position, lies in front of an ear 1417 (FIG. 94) on the equals bar 1050. When the bar 1050 is driven forward by spring 1409 (FIG. 100), ear 1417 abuts pin 1416 and rocks the stop pawl 1309 for disengaging the ratchet wheel 1190 (FIG. 94) so that, as previously described, the spring 1307 (FIG. 71) moves the digit sensor 1150 (FIG. 58) into engagement with the storage sector 970.

The full forward motion of bar 1050 also causes pin 1049 (FIG. 78) to rock the bail 1060, which, in turn, rocks the bail 1063 (FIG. 57) for blocking the detent levers 1055 (FIG. 55) and preventing any changes in the settings of the storage sectors 970 during multiplication, as was described.

Shortly before the end of the multiplication operation, the bar 1050 (FIG. 100) is driven rearward, as will be explained. This action rocks the lever 1404 counter-clockwise, causing the pin 1410 to rock the overload cam 1402, because at this time the key 38 is still locked down by engagement of the clutch bar with pin 1430. The lost motion connection 1407 permits the latch 1406 to re-engage the pin 1411.

(7) *Main Multiplication Lever 1322*

The spring-driven forward motion of the equals bar 1050 also drives a pin 1421 (FIG. 93) against an edge 1422 of the main multiplication lever 1322 for rocking it from the position shown in FIG. 93 to that shown in FIG. 94. This motion causes the hook 1321 to release the pin 1320 on the poker carrying lever 1313 (FIGS. 76 and 74) and also brings the lever 1322 close to an ear 1423 (FIG. 93) of the trident latch 1326 (FIG. 72) and brings a tail 1432 close to a pin 1424 on the slide 1050. The action also brings a cam face 1325 at the lower edge of the lever 1322 into the path of a pin 1426 on the cam 1315.

The forward movement of the equals bar 1050 driven by spring 1409 (FIG. 100) puts the parts in the position shown in FIG. 94 and sets the machine into operation. Early in the first cycle, the pin 1426 (FIG. 94) drives against the cam surface 1325 and rocks the lever 1322 to the position shown in FIG. 95. This action causes the tail 1432 of the lever 1322 to lift the pin 1424 for raising the bar 1050, and this lifting of the bar 1050 raises the ear 1417 above the pin 1416 for releasing the stop pawl 1309 for re-engagement with ratchet wheel 1190 for the ratchet feed operation, as described in connection with FIGS. 73 and 81. The lever 1322 also drives ear 1423 rearward for rocking the trident latch 1326, as previously mentioned, for example, in connection with FIGS. 82 and 89. A spring-urged latch 1434 (FIGS. 95, 79 and 32) engages the lever 1322 for holding it in this operative position and will continue to hold it there until released by a successful termination test for ending the multiplication operation. The equals bar 1050 (FIGS. 94 and 32) includes a notch 1439 which embraces the ear 1269 of the lever 1267 (FIG. 31) which controls the clutch for connecting the two carriages during the multiplication operation, as previously described (FIGS. 40 and 101).

Depression of the multiplication (=) key 38 tests for over-capacity, sets blocking bail 1063, releases the counter ratchet wheel 1109, locks the two carriages together, sets the multiplication lever 1322 and the trident latch 1326, sets the machine for repeat operation, and starts the machine operating.

At the end of the multiplication operation the successful termination test (FIG. 96), as will be described, rocks the latch 1434 (FIG. 95) and releases the multiplication control lever 1322. This action releases the trident latch 1326, as previously mentioned, and also causes the bar 1050 to drop, urged by a spring 1437, below its normal position of FIG. 93. As shown in FIG. 97, this action is timed to occur when the bail 1314 is forward so that a shoulder 1436 on the bar 1050 drops behind the bail 1314. At the same time, a notch 1438 in the bar 1050 drops over an ear 1440 (FIGS. 97 and 32) at the upper end of a lever 1441 journalled at its lower end at 1442. This lever is connected by a movable pin 1443 to a lever 1444 fixed to the shaft 560 which extends through the machine for controlling the total and subtotal operations (for example, FIG. 11) as previously described. With the parts thus in the position shown in FIG. 97 during the last portion of the last cycle in the multiplication operation, the cam 1315 drives against a roller 1319 on the bail 1314 for driving the bail rearward for thereby driving the bar 1050 rearward and leaving it in the position shown in FIG. 98, behind and below its home position. During this rearward motion of bar 1050, ear 1417 has passed under pin 1416 of stop pawl 1309. At the same time, the rocking of bail 1314, and with it the arm 1313 (FIG. 76), has swung the pin 1320 into position to be relatched by the hook 1321 of the lever 1322. Thus these parts are in the position of FIG. 98 at the end of the last cycle of the multiplication. The action of resetting them to their home positions will be completed during a single print out (total-taking, or subtotal taking) cycle which follows immediately. With the pin 1443 in its lower position, as shown in FIG. 98, the rocking of lever 1441, by the rearward movement of bar 1050, has set the accumulator for a total-taking operation which the machine immediately begins. If the pin 1443 had been in its upper position shown in FIG. 99, the rocking of the lever 1441 would have produced a greater angular movement of the lever 1444 for causing the last operation to be a subtotal operation. As will be explained, pin 1443 is moved by the depression of the accumulate multiplication key 42 (FIG. 1). As the machine goes through its final cycle for taking the total or subtotal, pin 1426 (FIG. 98) on cam 1315 engages the curved undersurface 1448 of the bar 1050 and lifts it so that shoulder 1436 clears the bail 1314, and spring 1409 (FIG. 100) pulls the bar 1050 forward to its home position, shown, for example, in FIG. 93.

(8) *Counter Overstroke and Termination Test*

As the pawl 1335 (for example, FIG. 82) turns the ratchet wheel 1190 for the last count in an order, it carries the ratchet wheel through its "0" position into an overstroke position shown in FIG. 88. This action has already been mentioned in connection with lifting the poker 1312 to its home position (FIG. 85). This counter overstroke, through the gear 1187 (FIGS. 63 and 65), drives the digit sensor 1148 rearward for driving the abutment 1224 against the pin 1223, or the latch projection 1222 against the ear 1221, for setting the sensor at carry or no-carry, respectively, for the next order. The counter overstroke, through pin 1329 (FIG. 88), also lifts the block cam 1335 as shown in that figure, so that a pin 1451 lifts a latch 1452 (see also FIG. 78) which is journalled at 1453 and at its rear end engages a pin 1454 of the bail arm 1246 (see also FIGS. 32 and 23). This release of the pin 1454 drops the bail 1244 for making the termination test, as previously described in connection with FIG. 66.

The forward, lower end of latch 1452 is pinned at 1455 to a shift link 1456 (see also FIGS. 32 and 33). As shown in FIGS. 33 and 102, link 1456 is pinned at 1457 at its forward end to a bellcrank 1458 journalled at 1459. This bellcrank has a lost motion connection comprising a pin 1460 and an aperture 1461, with a second bellcrank 1462 also journalled at 1459. A pin 1463 on the bellcrank 1462 underlies an ear 228 on the shift arm 226 of the selector mechanism (see FIG. 38). The lost motion connection 1461, 1460 and a spring 1466 permit the mechanism to yield so that the operation of the multiplication mechanism cannot be jammed if the lever 226 is blocked. The spring 225 of the shift lever 226 normally urges the link 1456 forward and the latch 1452 (FIGS. 32 and 78) into engagement with the pin 1454. It is to be noted that this lifting of the lever 226 in FIG. 38 lowers the tooth 222 (FIG. 39) into engagement with the rack 204 and depresses the detent 208, but the shift of the selector carriage will not be complete until the tooth 222 rises again. The dimension of the feeler blade 1165 (FIG. 66) is chosen to properly make the termination test with the bar 226 in its raised position.

In FIG. 78, the release of the lever arm 1246 by the latch 1452 drops the bail 1244 for making the termination test, previously described in connection with FIG. 66. If the bail 1244 is prevented from dropping to its lowest position, shown in solid lines in FIG. 66, this bail 1244 does not initiate any change of action. But if it does drop to its lowest position, as shown in FIG. 96, thereby indicating that multiplication has been completed, a forward extending arm 1470 of the lever 1246 strikes a pin 1471 on the latch 1434 for releasing the main multiplication control lever 1322, as previously described.

Next, the feed pawl 1335 (FIG. 81) is swung forward, permitting the counter ratchet wheel 1190 to move from its overstroke to its home position, for lowering the cam 1355 and the latch 1452. This lowering of latch 1452 moves the shift link 1456 forward and lowers the arm 226 (FIGS. 33, 38 and 39). This action lifts the tooth 222 (FIG. 39) clear of the rack 204 and permits the selector unit to complete its shift, and because the selector and sensor carriages are connected by the clutch 1264, 1265 (FIGS. 40 and 101), the sensor carriage moves one order to the left to bring the sensors in line with the storage sector 970 of the next higher order of the multiplier.

Next, a roller 1474 on the cam 1315 (FIG. 80) rocks a lever 1472 (clockwise in FIG. 80) about its journal 1473 against a down-extending arm 1475 of the lever 1246. This action not only returns the lever 1246 to its home position, where it is again caught by latch lever 1452 (FIG. 78), but drives it beyond to its overstroke position 1244b in FIG. 66 so that the bail 1244 moves the latch 1233 (FIG. 64) for releasing the link 1218 and permitting that link and the lever 1216 to return to their home positions in readiness for the next short-cut test. Although the latch 1233 thus releases the link 1218 in the second half of each machine cycle, this action is of significance only during the last cycle in an order during which inverse entries were made. At other times the position of link 1218 will be controlled by the lever 1213 (FIG. 58).

XXII. EXAMPLE OF MULTIPLICATION
(MULTIPLIER "4950")

The general pattern of the automatic multiplication program consists of digitation and counter feed in the first half of each machine cycle, and the setting of the digitation controls during the second half-cycle. For the digitation in the initial cycle, the controls are set before the machine starts, and for each subsequent cycle, they are set during the last half of the preceding cycle. In addition, during the last cycle of each order, the counter overstroke occurs near mid-cycle for shifting the carriages and making the termination test before the multiplier is sensed and the controls set for the next cycle. A successful termination test marks the last digitation cycle, and during the last half of that cycle the controls are set for print-out in the next and final cycle, during which the homing of the controls is completed.

For an example of multiplication assume that the number "4950" is contained in the four lowest, or right-hand, orders of the multiplier storage, or memory, unit, and assume that the number "11,111" is contained in the selector unit. The multiplication operation is initiatted by depression of the multiplication, or equals (=) key 38 (FIG. 100). The initial slight motion of this key, acting through overload detent 1402 (FIG. 100) and bellcrank 1404, draws the multiplication control bar 1050 forward, as shown, for example, in FIG. 78. The pin 1049 on the link 1050 rocks the bails 1060 and 1066 (FIGS. 57 and 55) for the over-capacity test. Since, in this example, the total number of orders in the multiplier and multiplicand does not exceed seventeen, the motion of the blade 1066 will be unobstructed so that the multiplication bar 1050 (FIG. 100) moves forward. Continued manual depression of the key 38 disengages hook 1406 from the pin 1411 so that the spring 1409 rocks the lever 1408 and snaps the link 1050 to its extreme forward position.

(1) *Initial Setting of Controls*

The rocking of the lever 1408 has caused pin 1412 (FIGS. 100 and 27) to rock the lever arm 944 to set the machine for repeat operation, as previously explained. The forward motion of the bar 1050, under force of the spring 1409, has also rocked the stop pawl 1309 (FIG. 94) to release the counter ratchet wheel 1190, has rocked the main multiplication control lever 1322 to the position shown in that figure, and has set bail 1063 (FIGS. 57 and 21) to block the detent levers 1055. The release of the counter wheel 1190 has permitted the spring 1307 (FIGS. 23 and 31) to rotate the shaft 1189 (counter-clockwise in FIG. 59) for driving the digit sensor 1148 toward the memory sector 970. The ratchet wheel 1190 is free to turn because the drive pawl 1335 is held clear by the trident latch 1326, as in FIG. 73. Since this lowest order of the multiplier contains a "0" in this example, the sector 970 is in the position shown in FIG. 59, and the tongue probe 1152, being in its no-carry position, has stopped against the step 1153. The probe 1150 of the digit tester in sensing a "0" with no-carry has permitted the ratchet wheel 1190 to turn only a fraction of a tooth space to the position shown in FIG. 59. Pin 1329 (FIG. 34) on the ratchet wheel has dropped the block cam 1355 far enough to drop bail 1214 for the short-cut test (FIG. 100) but not far enough to unblock the digitation control lever 1360.

The initial rocking of the lever 1322 (FIG. 94) by the forward movement of bar 1050, has released the pin 1320, which, as shown for example, in FIG. 76, is on the lever 1313, so that the bail 1314 is free to follow its cam 1315. This action has also brought the cam face 1325 of the lever 1322 (FIG. 94) into the path of the pin 1326 on the cam 1315.

The forward motion of the equals bar 1050 has also swung the lever 1267 (FIGS. 32 and 31) and engaged the clutch 1264, 1265 (FIG. 101) for connecting the selector carriage to the sensor carriage.

(2) *Initial Half-Cycle (Multiplier Digit "0")*

The action thus far has taken place substantially before the start of the machine cycle. The depression of the key 38 (FIG. 27), through the pin 1430, has also moved the clutch bar 1083 forward for engaging the clutch and energizing the motor, as previously described. The initial rotation of cam 1315 brings the pin 1426 (FIGS. 94 and 95) against the cam face 1325 of the lever 1322 and swings it to the position shown in FIG. 95. The latch 1434 catches and holds the lever 1322. The tail 1432 of that lever lifts against the pin 1424 for raising the multiplication bar 1050 so that the ear 1417 disengages the pin 1416 of the stop pawl 1309 and permits the pawl to re-engage the counter ratchet wheel 1190.

The rocking of the lever 1322 (FIG. 95), through ear 1423, also rocks the trident latch 1326 to the position shown in FIGS. 81 and 87. This movement of the trident latch releases the counter drive arm 1338 so that it swings to the position shown in FIG. 81. The trident 1326 also strikes the pin 1327 for releasing the latch 1317 (FIG. 87), so that the poker 1312 falls until its arm 1328 rests on pin 1329, as shown in FIG. 87. The initial rotation of the machine has also caused the pin 1371 (FIG. 74) to lift the latch 1370 for releasing the arm 1360. The tail of the trident latch 1326 engages the pin 1372, as shown in FIG. 89, and holds the latch up for the duration of the multiplication operation. With a "0" in the counter ratchet wheel 1190 and the lever 1360 (FIG. 77) blocked by the cam 1335, link 1376 (FIG. 33) will not be moved and consequently the arm 1381 will not be set for any entries into the accumulator.

(3) *Mid-Cycle; Counter Overstroke*

At about mid-cycle, cam 1340 rocks the arm 1338 (counter-clockwise in FIG. 81) and carries counter ratchet wheel 1190 to its overstroke position shown in FIG. 88. This action lifts the latch 1452 and pulls the shift link 1456 rearward (FIG. 33) to rock arm 226 (FIGS. 38 and 39) and perform a partial shift of the carriages. The lifting of the latch 1452 (FIG. 88) also releases the pin 1454 and the bail 1244 (FIG. 78) for making the termination test. Blade 1165 (FIG. 66) will find the storage discs 970 of the second, third and fourth orders out of their "0" positions and no termination action will result from the test.

(4) *Second Half of First Cycle: Shifting, Testing Next Order (Digit "5," "No-Carry"), Setting Controls*

At about the three-quarter cycle position, the cam 1340 (FIG. 81) passes the roller 1339 and spring 1341 swings arm 1338 clockwise, permitting the ratchet wheel 1190 to return from its overstroke position (FIG. 88) to its home position (FIG. 87) where it is stopped by the stop pawl 1309. Since the trident latch 1326 still rests against pin 1327 (FIG. 87), latch 1317 is held clear of the pin 1318 so that the poker 1312, under control of the pin 1329 on the ratchet wheel, drops to the position shown in FIG. 87, in alignment with the pin 1316 on the stop pawl 1309. The return of the ratchet wheel 1190 from its overstroke to its home position also drops the latch 1452 (FIG. 88) and moves the shift link 1456 (FIG. 33) forward for completing the shift of the selector unit (FIG. 39) and with it the sensor carriage of the multiplier. The shifting of the selector changes the number therein to "111,110" for use with the second order of the multiplier.

Next, the roller 1474 (FIG. 80) on the cam 1315 rocks the lever 1472 for rocking the lever 1246, carrying the termination test bail 1244 to its reset-overstroke position 1244b in FIG. 66 for rleasing the latch 1213 (which action accomplishes nothing in this instance), and then lets the bail 1244 return to its home position where it is held by the latch 1452 (FIG. 79).

At about this same time the notch in cam 1315 comes under the roller 1319 on the bail 1314 (FIG. 87) and lets it swing (counter-clockwise in this figure) for driving the poker 1312 against the pin 1316 and releasing the counter ratchet wheel 1190. It will be recalled that at this point, about three-quarters of the way through the cycle, the carriages are already shifted so that the sensors (FIG. 58) are aligned with the storage sector 970 of the second order of the storage unit. Accordingly, this release of the ratchet wheel 1190 lets the spring 1307 (FIG. 71) drive the probe 1150 (FIG. 58) toward the sector 970 of the second order (which contains a "5"), and since lever 1195 is at no-carry, the parts assume the position shown in FIG. 61. At the same time, the pin 1329 on the ratchet wheel 1190 drops the block cam 1355 (FIG. 77), the lever 1360 at this point being held free of the cam 1355 by the cam 1365. The dropping of the block cam 1355 drops the bail 1214 for the short-cut test, and the lever 1213 drops to the "5" to "9," or inverse position, shown for example, in dotted lines in FIG. 91, for rocking the bail 1385 to the negative entry position, also shown dotted in FIG. 91.

Near the end of this cycle, still the first cycle of operation, cam 1315 (FIG. 87) again swings lever 1313 (clockwise in this figure) for disengaging the poker 1312 from the pin 1316, thereby leaving the stop pawl 1309 free. Since the ratchet wheel 1190 will have rotated five units (clockwise in this figure), the pin 1329 lies well below the arm 1328 and permits the poker 1312 to drop to the position shown in FIG. 86 for missing the pin 1316. Also just before the end of this first cycle, the notch in cam 1365 comes under roller 1363 (FIG. 89) and permits the arm 1360 to be driven by its spring 1362 (counter-clockwise) for setting the lever 1381 for a subtractive entry into the accumulator, as shown in FIG. 90.

(5) Four Cycles of Second Order

During the first half of the first cycle in the second order, the number "111,110" in the selector will be entered subtractively into the accumulator. Although the cam 1365 (FIG. 89) withdraws the link 1376 shortly after the beginning of the cycle, the subtraction operation once initiated is locked in by the engagement of detent 796 (FIG. 16) with the lower end 797 of lever 698 (FIG. 44), as previously described.

Near mid-cycle the cam 1340 rocks the arm 1338 (counter-clockwise in FIG. 81) so that pawl 1335 drives the ratchet wheel 1190 (counter-clockwise in this figure) about one and one-half notches so that one tooth clicks under the stop pawl 1309. As the arm 1338 returns (clockwise in FIG. 81) it leaves the counter wheel with a count of "4." Pin 1329 on the ratchet wheel 1190 does not come into operation during this cycle.

Later in the cycle, roller 1474 (FIG. 80) rocks the lever 1472, and through lever 1246, moves the termination test bail 1244 to its reset-overstroke position, shown at 1244b in FIG. 66, so that the latch 1233 releases the link 1218 (FIG. 64). However, the link 1218 is still held in its upper position by the lever 1213, which still is in the dotted position shown in FIG. 91. Consequently as the roller 1474 passes the lever 1472 (FIG. 80), the latch 1233 is restored for holding the link 1218 (FIG. 64) in its upper position. The latch 1452 for the lever 1246 and bail 1244 (FIG. 79) is not lifted during this cycle. Just before the end of the cycle, the notch of cam 1315 lets the lever 1313 swing (counter-clockwise in FIGS. 86 and 87), but because the counter wheel 1190 is not in its "0" position, pin 1329 does not support the arm 1328, and consequently the poker 1312 lies below the pin 1316, as shown in FIG. 86, and has no effect.

Also just before the end of this cycle, the notch of cam 1365 (FIG. 89) releases the arm 1360. Since the block cam 1355 is still in its lower position, digitation-set arm 1360 swings (counter-clockwise in this view) for setting the add-subtract lever 1381 for the next cycle. Since the lever 1213 is still in its lower position (FIG. 91), this action sets the lever 1381 for another subtractive entry, as shown in FIG. 90.

The second, third and fourth cycles in the second order are substantially similar to the first, the counter wheel 1190 being advanced to its "3," "2" and "1" positions in succession and the quantity "111,110" being entered into the accumulator subtractively during each cycle. The machine similarly enters the fifth cycle of the second order with the add-subtract lever 1381 set for subtraction.

(6) Fifth Cycle of Second Order

In the fifth cycle of the second order, the counter feed pawl 1335 (FIG. 81) drives the counter wheel 1190 from its "1" position (for example, FIG. 86) through its "0" position to its overstroke position shown in FIG. 88. As in the first order, this overstroke causes the pin 1329 to lift cam 1355 which, through pin 1451, lifts the termination test latch 1452. This action drops the termination test bail 1244 (see also FIG. 66) but since the higher orders of the register contain values other than "0" and since the hook 1216 is in its lower position 1216a, the bail 1244 is not permitted to fall to its lower position and consequently the test does not initiate any action. The lifting of the cam 1355 also lifts the short-cut test lever 1213 to a position above its home position, and clear of the lever 1216, but the link 1218 and the lever 1216 are still held in their carry position by the latch 1233 (FIG. 63). The overstroke of the ratchet wheel 1190, through gear 1187, also carries the digit tester 1148 to its overstroke position (extreme right in FIG. 63) and brings abutment 1224 against the pin 1223 which, at this time, is in the carry position 1223a, shown dotted. This action lifts arm 1195 into the carry position, as shown in FIG. 65, where it is latched by the pin 1205. The counter overstroke also carries the poker 1312 to its uppermost position (FIG. 88) but the trident latch 1326 still obstructs the pin 1327 (FIG. 87) and prevents the latch 1317 from setting. As previously explained, the counter overstroke also pulls the shift link 1456 (FIG. 33) forward.

As the high part of cam 1340 leaves the roller 1339, the drive pawl 1335 is swung to the right in FIG. 81 and clear of the ratchet wheel 1190. This action permits the wheel 1190 to return to its home position (where it is caught by the stop pawl 1309) so that the latch 1452 is dropped to complete the shift of the selector carriage and with it the multiplication test carriage. It is to be noted that at the time of shift, the short-cut test lever 1213 is in its home position and, therefore, clear of the storage sectors of the memory unit, and also that the digit tester is in its home position, as shown in FIG. 58, and clear of the memory sectors. The blade 1165 of the termination tester may be engaging one or more of the memory sectors but simply slides across them. The shifting of the selector adds another "0" to the number therein.

Next, roller 1474 (FIG. 80) engages the lever 1472 for restoring the termination test lever 1246 and bail 1244, and for carrying the bail 1244 to its overstroke position 1244b where, as seen in FIG. 66, it rocks the latch 1233 for releasing link 1218. Thereupon, this link and lever 1216 return to their normal no-carry position (shown in FIG. 58 and shown in solid lines in FIG. 63) in preparation for the next short-cut test. Next the poker 1312 (FIG. 87) swings against the pin 1316 of the stop pawl 1309 and releases the counter ratchet wheel 1190. The digit tester 1148 (FIG. 58) is now in alignment with the third order of the storage unit, which, in the present example, contains a "9," and since the lever 1195 is in its carry position, as shown in FIG. 62, the digit tester and the counter wheel 1190 are stopped in the "0" position. As previously explained, this "0" position of the counter holds the block cam 1355 far enough below the position of "home" to drop the lever 1213 for making the short-cut test. Since the storage sector contains a "9," the lever 1213 drops to the lower, dotted line position in FIG. 91, thereby rocking the lever 1216 (FIGS. 58 and 63) and lifting link 1218, which are then latched in their carry position by the latch 1233. Although the cam 1355 dropped enough to drop the bail 1214 and the lever 1213, it did not drop enough to permit the ear 1368 of lever 1360 (FIGS. 77 and 89) to enter the notch 1369. Consequently the lever 1381 (FIG. 89) is not set and no entry will be made in the accumulator during the next cycle.

(7) Third Order (Digit "9" With Carry)

During the next cycle, the only cycle in the third order, the cam 1340 (FIG. 81), through the pawl 1335, again drives the counter ratchet wheel 1190 to its overstroke position and then releases it to its home position for actuating the shift link 1456 and releasing the termination test bail 1244. Again the counter overstroke drives the digit tester 1148 (to the right in FIG. 63), bringing the abutment 1224 against the pin 1223 in its carry position 1223a for setting lever 1195 to carry. Again the carriages are shifted and again the termination test bail 1244 is lifted and driven to overstroke for releasing the latch 1233 (FIG. 66) to prepare lever 1216 and link 1218 for the short-cut test for the next order.

With the machine still in the single cycle of the third order, but with the sensor carriage aligned with the fourth-order storage sector 970, the cam 1315 (FIG. 87) drives the poker 1312 against the pin 1316 for releasing the counter ratchet wheel 1190 for the digit test. Because the digit now being tested is a "4" and because the arm 1195 is set at carry (as in FIG. 60), the ratchet wheel 1190 runs to its extreme, or number "5" position. Again the digitation block cam 1355 (FIG. 89) is dropped to permit operation of the lever 1360, and to drop the bail 1214 so that the lever 1213 (FIG. 91) makes the short-cut test. Since the number in the sector 970 is a "4," the lever 1213 is stopped in the "selected sign" position, shown in solid lines in FIG. 91, so that reversing lever 1385 is left in the position for a positive entry. Finally just before the end of the cycle, still the last cycle of the third order, cam 1365 lets lever 1360 swing (counter-clockwise in FIG. 89) for setting the lever 1381 for a positive entry, as shown in that figure.

(8) *Fourth Order (Digit "4" With Carry), Termination Test*

Accordingly, during the first cycle in the fourth order, the machine enters the number "11,111,000" additively into the accumulator, the counter ratchet wheel 1190 is advanced one notch, and at the end of the cycle, the lever 1360 again sets the lever 1381 (FIG. 89) for the next cycle, and similarly in the second, third and fourth cycles.

During the fifth cycle in this order, the pawl 1335 (FIG. 81) carries the counter ratchet wheel 1190 through its home position to overstroke (FIG. 88), again lifting the latch 1452 for causing the shift and for dropping the termination test bail 1244. This time, all higher orders are at "0" and the lever 1216 (FIG. 58) is in its upper position, so bail 1244 and blade 1165 drop to their lowest position, as shown in FIG. 66. As shown in FIG. 96, this action causes the tail 1470 of the lever 1246 to strike the pin 1471 on the latch 1434 for releasing the main multiplication lever 1322, which thereupon swings from the position shown in FIG. 95 to that in FIG. 97. It cannot yet swing to home position (shown in FIG. 78) because it is obstructed by the pin 1320 on the lever 1313 (FIG. 76), because with the cam 1315 in the position shown in FIG. 97, that lever, and its bail 1314, are out of their home position. This action also releases the trident latch 1326, which, under the force of its spring, moves to the position shown in FIG. 82 so that the drive pawl 1335 will be lifted and the lever 1338 latched in home position, as was described in connection with FIGS. 82, 83 and 84. The release of the trident latch 1326 moves it away from pin 1327 (FIG. 87) and leaves latch 1317 free to catch above the pin 1318 (FIG. 74). The release of the trident latch 1326 also frees the latch 1370 (FIG. 89), which will now be free to alternately engage and release the lever 1360 during each cycle. However, lever 1360 cannot again set the add-subtract lever 1381 (FIG. 89), because it is blocked by cam 1355.

The counter overstroke has also moved the digit tester (to the right in FIG. 63) and brought the prong 1222 of the latch 1203 against the ear 1221 (now in its normal, or full line, position in FIG. 63), thereby causing the arm 1195 to return to its no-carry, or home, position in readiness for the beginning of the next multiplication operation.

The partial return of the multiplication lever 1322, to the position of FIG. 97, causes the multiplication bar 1050 to drop under force of its spring 1437 and causes notch 1438 to drop over the ear 1440 of the lever 1441. It also causes the ear 1436 (FIG. 97) at the rear end of the bar 1050 to drop over the bail 1314.

Then as the cam 1315, at the very end of the last cycle in the fourth order, drives the bail 1314 rearward (to the left in FIG. 97), the bail 1314 carries the bar 1050 rearward to an overstroke position and rocks the lever 1441 to the position shown in FIG. 98. This action, through the pin 1443, rocks the lever 1444 on the total-subtotal shaft 560 and sets the machine for a total-taking cycle.

The rearward motion of bar 1050 to the overstroke position forces the levers 1404 and 1408 FIG. 100) past their normal positions so that the hook 1406 easily engages under the pin 1411. Because the key 38 is still latched down by the clutch bar 1083, this return of lever 1404 causes a rocking of overload cam 1402. The restoration of the lever 1408 also, through pin 1412, lever 944 (FIG. 100) and shaft 936, permits the lever 934 to rise and restore the single cycle lever 161 (FIGS. 5 and 8). This restoration of the single cycle action comes too late to terminate the machine operation in this, the last cycle in the last order of the multiplication, but it will cause termination at the end of the next, the total-taking cycle. Restoration of the link 1050 also, through lever 1267 (FIG. 31), disengages the carriage clutch 1264, 1265 (FIG. 101).

(9) *Print-Out Cycle, Homing the Controls*

The machine now goes into a total-taking cycle for reading the total out of the accumulator and printing it, as previously described, returning the selector to home and clearing it by means of the mechanism shown in FIG. 40, and also returning the multiplier sensor carriage 1194 to its extreme right-hand, or home, position. During the total-taking cycle, the cam 1340 rocks the lever 1338 for moving it from the position shown in FIG. 84 to that shown in FIG. 72 where it is latched by the trident 1326. Although the rearward movement of the multiplication bar 1050 at the end of the last multiplication cycle caused the arm 1313 and bail 1314 to be latched at home position by the pin 1320, as shown in FIG. 98, the bar 1050 is still below, and to the rear of, its home position. Near the end of the total-taking cycle, roller 1426 on the cam 1315 runs under the edge 1448 of the bar 1050 and lifts it so that the shoulder 1436 rises above the bail 1314 and the bar moves forward slightly under the force of the spring 1409 (FIG. 100) into its home position, shown in FIGS. 77 and 93.

Thus the multiplication of "11,111" by "4950" has been accomplished by substractively entering "111,110" five times, and additively entering "11,111,000" five times to get "54,999,450," the correct product.

XXIII. NEGATIVE MULTIPLICATION AND ACCUMULATIVE MULTIPLICATION

The negative multiplication, or "negative equals" (—=) key 40 (FIG. 1) has a key stem 1501 (FIG. 31) which carries a pin 1502 which overlies a bar 1503 on the stem of the multiplication, or equals (=) key 38 (FIG. 27). Consequently depression of key 40 depresses also the multiplication key 38 for causing the complete multiplication operation, as just described. However, key stem 1501 also has a pin 1505 (FIG. 31) which lies in the slot 1506 (FIG. 34) of a bellcrank 1507 journalled at 1508. At its upper end the bellcrank 1507 is pinned at 1509 to the negative multiplication link 1510, the rear end of which is connected to the link 1387 (FIGS. 91 and 92). Accordingly, depression of the negative equals key 40 moves the link 1387 forward. As was previously explained in connection with FIGS. 91 and 92, movement of the link 1387 to its forward position reverses the position of lever 1385 with respect to the selected-sign and inverse control of the short-cut test lever 1213. Consequently the negative equals operation modifies the multiplication operation by causing selected sign entries to be subtractive and inverse entries to be additive, so that the product is entered in the accumulator subtractively.

The accumulative equals (=S) key 42 (FIG. 1) has a stem 1516 (FIG. 31) which carries a pin 1517, similarly overlying the bar 1503 (FIG. 27) on the equals key 38 so that the depression of the key 42 puts the machine into a multiplication program. Key stem 1516 (FIG. 31) also has a pin 1518 which engages a slot 1519 (FIG. 32) in a bellcrank 1520 journalled at 1521. A link 1523 connects this bellcrank with a bellcrank 1524 journalled at 1525 at the rear of the machine. This bellcrank is connected to a link 1526, the upper end of which carries the pin 1443 connecting the two levers 1441 and 1444 (see also FIG. 98). Depression of the key 42 (FIG. 32) thus rocks the bellcrank 1520, moves the link 1523 forward and lifts the link 1526 and the pin 1443 for causing the subtotal cycle, rather than a total cycle, to follow the multiplication operation. As was previously described, when the pin 1443 is in its lower position, shown, for example, in FIGS. 32 and 98, lever 1441 sets shaft 560 for a total operation. When key 42 raises the pin 1443 to the upper position, shown in FIG. 99, the motion of lever 1441 produces a larger rotation of the lever arm 1444 for setting shaft 560 for a subtotal operation.

As shown in FIG. 34 an interlock lever 1530 is fixed to the clutch control shaft 186. A hook 1531 on this lever cooperates with a pin 1532 on the bellcrank 1507. Another hook 1533 cooperates similarly with a pin 1534 on the bellcrank 1520. It will be recalled that the shaft 186 rotates (clockwise in FIG. 34) when the machine is put into operation. In this operated position, the hook 1531 locks the pin 1532 and the bellcrank 1507 for preventing the negative equals key 40 from being depressed after another key, such as the equals (=) key 38. However, if key 40 is depressed with the key 38, the bellcrank 1507 will swing the pin 1532 forward to the other side of the hook 1531, and in that case, interlock lever 1530 holds the key 40 down until the clutch bar returns to its home position. Similarly the hook 1533 blocks the accumulative equals (=S) key 42 in either its up or down position during the time that the machine is operating. Keys 40 and 42 may be depressed simultaneously.

XXIV. PRODUCT TRANSFER OPERATION

The product transfer (T to ×) key 44 produces a multiplication operation followed by a transfer of the product from the accumulator into the multiplier storage unit. The product transfer key 44 (FIGS. 1, 27 and 30) has a stem 1540 carrying a pin 1541 that overlies the bar 1503 on the multiplication key 38 (see also FIG. 27) so that depression of the product transfer key 44 depresses also the multiplication key 38. Stem 1540 also carries a pin 1542 which, as shown in FIG. 27, cooperates with the slot in the clutch bar 1083 for preventing depression of key 44 while the machine is in operation, and for alternatively locking it down.

At its lower end the "T to ×" key stem 1540 carries a pin 1544 which lies in a lot 1545 of a floating bellcrank 1546 (FIGS. 30, 104 to 106, inclusive) having an L-shaped slot 1547 which embraces a pin 1548 fixed to the frame of the machine. A spring 1549 biases the bellcrank down and forward (counterclockwise in FIG. 30). A forward facing edge 1555 of the bellcrank 1546 bears against a pin 1556 on the bellcrank 1408 which drives the multiplication slide 1050 (FIG. 100). As is shown in FIG. 104, as the key stem 1540 is depressed the bellcrank 1546 tends to rotate (clockwise in this view) substantially about the stationary pin 1556, the bellcrank 1546 moving from the dotted position 1546a to the solid line position 1546b, the slot 1547 accommodating this motion with respect to the fixed pin 1548.

It will be recalled that as the multiplication key 38 is depressed, it reaches a point at which the hook 1406 (FIGS. 30 and 100) disengages the pin 1411 so that the spring 1409 drives the bellcrank 1408 (clockwise in FIG. 30). As depicted in FIG. 105, this action causes another movement of the floating bellcrank 1546. As the bellcrank 1408 rotates clockwise, it carries the pin 1556 from the dotted position 1556a down to the solid line position in a notch 1557 of the floating bellcrank 1546, thereby permitting the latter to move from the dotted position 1546b forward to the solid line position 1546c in FIG. 105, this motion being guided by the slots 1547 and 1545. The parts then occupy this solid line position in FIG. 105 until the multiplication slide 1050 is moved rearward at the end of the last multiplication cycle, and the bellcrank 1408 is rocked (counter-clockwise in these figures) to a position slightly beyond its home position shown in FIGS. 30 and 100. Since the notch 1557 of the floating bellcrank 1546 now embraces the pin 1556 on the bellcrank 1408 (FIG. 105), the floating bellcrank 1546 is lifted by this action of the bellcrank 1408 to the position shown in FIG. 106, the lower region of the slot 1547 accommodating this motion with respect to the pin 1548. As the bellcrank 1546 is thus lifted, a pin 1560 (FIGS. 30 and 106) is lifted against a cam face 1561 (FIG. 31) on the memory control link 1020. This action drives the memory control link forward (see also FIG. 27) for a memory input operation, as previously described. Consequently when the machine goes into the total-taking operation, the number read from the accumulator into the actuator is also inserted in the memory unit. At the end of the combined total-taking and memory input cycle, the clutch bar 1083 (FIG. 27) releases the keys 38 and 44 to terminate the operation. As key 44 rises, it lifts the forward end of the bellcrank 1546 (FIG. 106). The pin 1548 in the slot 1547 constrains the bellcrank 1546 to rotate about the pin 1548 so that the notch 1557 is disengaged from the pin 1556, whereupon the bellcrank returns to the home position, as shown in FIG. 30, under force of the spring 1549 to complete the operation. It is to be noted that keys 40, 42 and 44 may be depressed simultaneously, since each imposes an independent modification upon the operation initiated by key 38 alone.

XXV. PRINTING, RIBBON AND PAPER

The printing mechanism of the present machine is of a well-known type, similar to that shown in Patent No. 2,779,267. A number print wheel 1610 (FIGS. 21 and 25) is provided for each numerical order of the actuator and is geared to its respective actuator sector 340. Each such print wheel is carried on a separate print-wheel carrier 1611 journalled on a shaft 1612 and biased by a spring 1613 to drive its wheel 1610 against a printing roller 1614. A print bail rod 1617 underlies the tails 1605 of all of the print-wheel carriers 1611 for controlling them. The rod 1617 is carried by a pair of bail arms 1616 and 1618 (FIGS. 16 and 27). The arms are pinned to shaft 1612, and a spring 1615 (FIG. 27) attached to arm 1618 biases these arms and the bail 1617 down. Arm 1618 carries a roller 1619 overlying an arm 1620 of a bellcrank 1621 (FIG. 30) having a roller 1622 riding a print control cam 1623. When the roller 1622 is on the high part of cam 1623, bellcrank 1621 supports the arm 1618 which, in turn, supports the bail rod 1617 for holding all the print-wheels 1610 out of print position. A single deep narrow notch with an abrupt drop-off in the cam 1623 lets the print-wheels be driven, under force of their springs 1613, for printing at mid-cycle.

Bail arm 1618 (FIG. 27) has a forward extension with an ear 1628 arranged to be intercepted by a hook 1629 (FIG. 29) on a lever 1627 journalled on a shaft 1624. A spring 1625 urges the lever 1627 counter-clockwise in FIG. 29 and an ear 1626 on lever 1627 stops against a lever 1630 which carries a roller 1631 that rides a gear aligning cam 1632. Fastened to the lever 1630 at 1633 is a bail 1634, also, journalled on the shaft 1624. As shown in FIG. 21, this bail 1634 is arranged to engage the gears 395 for aligning the print wheels 1610 just before the printing operation. If the bail 1634 fails to enter the intertooth spaces of the gears 395 for aligning the gears, the arm 1630 (FIG. 29) will be unable to swing (clockwise in this figure) for unblocking the ear 1628.

A two-color inked ribbon, not shown, is threaded through guides 1650 of two lifters 1651 and 1652 (FIGS. 31 and 10). A ribbon-feed mechanism, not shown but of well-known construction, includes a lever 1636 (FIG. 31) driven by a bellcrank 1637 rocking on the shaft 356 and connected by a screw 1745 to the actuator drive lever 372 (FIG. 27). The right ribbon lifter 1652 (FIG. 10) is pinned at 1653 to a lever arm 1654 on a shaft 1655 which extends through the machine. The left lifter 1651 (FIG. 31) is pinned at 1656 to a lever arm 1657 (FIG. 30) which is also fastened to the shaft 1655. A spring 1658 is connected to the pin 1656 for lifting the ribbon. Each lifter 1651 and 1652 has, at its upper end, an angular slot 1648 (FIG. 10) embracing a guide pin 1649. In its lowermost position, the ribbon 1650 is below the last printed line, and is also clear of the print roller 1614. When the ribbon is partially lifted, the upper halves of slots 1648 guide the ribbon toward the print roller 1614, and also align the upper half of the ribbon with the print wheels for printing black. When the ribbon is lifted to its uppermost position, the last half of the motion is guided by the lower halves of slots 1648 for maintaining the ribbon the correct distance from the roller 1614. With the ribbon in its uppermost position, its lower half is aligned with the print wheels for printing red.

The lever 1657 (FIG. 30) has a lost motion connection with a second lever 1662 which is free on the shaft 1655. This lost motion connection includes a spring 1663 and a pin 1664. The lever 1662 carries a roller 1665 which, as shown in FIG. 27, rides a cam surface 1666 of the actuator gear 376. It will be recalled that during each machine cycle the gear 376 rocks, first, clockwise in FIG. 27 and then counter-clockwise. Thus, the gear 376 normally holds the ribbon in its lowermost position, but during each machine cycle, releases it to be lifted by the spring 1658 (FIG. 31). As will be explained, the present invention provides stops for permitting only partial lifting of the ribbon when black printing is desired.

For the non-printing operations, clear keyboard and backspace, the lever 1657 has an arm 1659 (FIG. 30), the end of which, in its home position, blocks the print bail 1617. A pin 1660 on arm 1659 is arranged to be blocked by up-facing hook 1661 (FIG. 32) at the rear end of the lever 1565. This lever is journalled on the shaft 356 and its forward end has a slot embracing the pin 1567 (FIG. 25) on the clear keyboard key 24. Depression of the clear keyboard key rocks lever 1565 (FIG. 32) for blocking the lever arm 1659 (FIG. 30) for both blocking the print bail 1617 and preventing the ribbon 1650 (FIG. 31) from being lifted. Since depression of the backspace key 26 (FIG. 27) also depresses pin 1567, that operation also suppresses printing.

The machine of the present invention also employs a paper feed mechanism of well-known construction. In FIG. 5 a bellcrank 1670, journalled at 1671, has a roller 1672 riding a cam 1673 on the main drive shaft 90 (see also FIG. 3). The bellcrank 1670 is biased clockwise in FIG. 5 against the cam 1673 by a spring 1674. A pin 1675 on bellcrank 1670 is connected to a link 1676 which, in turn, is connected to another bellcrank 1677 fixed to a shaft 1678 and carrying a drive pawl 1679 which drives a ratchet wheel 1680 connected to the print roller 1614. The motion which the cam 1673 is capable of imparting to the drive pawl 1679 is sufficient for rotating the ratchet wheel 1680 for "double spacing" the printed numbers on the paper tape. To provide single spacing, a bail arm 1685 overlies a pin 1684 on the link 1676 for limiting its motion. This bail arm is part of a bail 1686 which, as shown in FIG. 9, is biased (counterclockwise) to a single spacing position by a spring 1687, and arranged to be set to the double spacing position by a manual lever 1688.

The bail 1686 also includes an arm 1689 which overlies the pin 722 on the lever 724. As previously described, the lever 724 is rocked (clockwise in FIG. 9) for each total and subtotal operation. This action lifts the pin 722 for lifting the arm 1689 for moving the bail arm 1685 (FIG. 5) to the double space position so that a blank line follows each printed total and subtotal.

It will be recalled that pin 722 is also lifted during a memory-output operation, for which a single space is wanted. A short lever 1690 (FIG. 9) having an ear 1691, is fixed to the shaft 1131 which is rocked by the memory output (MO) key 50 (through link 1020, FIG. 31, and lever 1130, FIG. 27) to intercept a lever 1692 on the shaft 1678 to which the paper feed bellcrank 1677 (FIG. 5) is fixed. Accordingly, during a memory output operation, ear 1691 (FIG. 9) limits the motion of feed pawl 1679 (FIG. 5) to advance the paper only one space. For the non-printing, clear keyboard and backspace operations, the paper feed is blocked by a lever 1681 (FIG. 5) on the ribbon control shaft 1655 (see also FIG. 30), which is blocked by hook 1661 (FIG. 32) during those operations. Lever 1681, when home, blocks pin 1675 (FIG. 5) on the paper feed bellcrank 1679, but swings clear during printing operations.

XXVI. SYMBOLS FOR OPERATIONS BY THE RIGHT SIDE CONTROL KEYS

The right side control keys are the addition, subtraction, repeat, print-only, total and subtotal keys 14, 16, 20, 22, 30 and 32 (FIG. 1). The symbols for the operations controlled by these keys are provided on a separate print wheel 1698 (FIG. 17) and controlled by a separate actuator sector in a well-known manner. A bail arm 1700 (FIG. 16) is provided with a series of steps 1701 for stopping the symbol actuator sector at various positions. The arm 1700 is part of a bail 1703 journalled at 1702. A second arm 1704 of this bail appears in FIG. 11. For rocking this bail during each machine cycle, a link 1705 is pinned at 1706 to the actuator gear sector 360 (FIG. 16). The other end of the link has a slot 1707 embracing a pin 1708 on the bail arm 1704. A spring 1709 urges the pin 1708 toward the forward end of the slot. Thus during the first half of each machine cycle, as the actuator gear sector 360 is rocked (counter-clockwise in FIG. 16), the link 1705 (FIG. 11) is pulled forward, and the spring 1709 pulls the pin 1708 with it for rocking the bail 1703. Stops are provided for stopping the motion of this bail 1703 in various positions for controlling the printing of the different symbols by the positioning of the shoulders 1701 (FIGS. 16 and 11).

The add-subtract control lever 698 (FIG. 11), at its upper end, has an ear 702 which lies close under the lower edge of the bail arm 1704. In the home position of lever 698, the ear 702 blocks the motion of the bail 1704 for printing a symbol "N," for indicating a print-only operation. It will be recalled that the machine is normally set for a print-only operation which can be initiated simply by engaging the power drive clutch.

It will be recalled that the addition key 14 (FIG. 1), in addition to engaging the clutch, also rocks the lever 604 (FIG. 10). The rocking of lever 604 also rocks the lever 694 (FIG. 48) which is fixed to the plus-minus shaft 696, to which the lever 698 (FIG. 11) is also fixed (see also FIG. 44). This rocking of the lever 698 for an addition operation aligns the ear 702 (FIG. 11) with a slot 1715 of the bail arm 1704. This is a deep slot and it permits the bail 1703 the maximum swing for printing a plus sign. For a subtraction operation, the control lever 604 (FIG. 10) and with it, the lever 698 (FIG. 48), is rocked through a greater angle. This action brings the ear 702 (FIG. 11) under an ear 1716 of the bail arm 1704 for stopping the arm 1704 in still a different position for printing a subtraction symbol.

It will be recalled that for a total or a subtotal operation, the lever 745 (FIGS. 9 and 46) is permitted to rock the lever 752 for rocking the total-subtotal shaft 560. This shaft rocks one amount for a total, and approximately twice that for a subtotal. This action rocks the control lever 758 (FIGS. 11 and 51). A pin 760 carried by the lever 758 (FIGS. 44 and 49) acts on a cam edge 764 of the lever 604 for rocking that lever to the same position it occupies during an addition operation. Thus during a total or subtotal operation, the ear 702 (FIG. 11) is aligned with the slot 1715 of the bail arm 1704. The position of the arm 1704, during total and subtotal operations, is controlled by an ear 1717 on the arm 1704, which abuts shoulders on the two lever arms 771 and 776. (See also FIG. 15). When lever 758 (FIG. 11) is rocked, its pin 778 also rocks lever 776 (clockwise in FIG 11) and bail arm 771 (see also FIG. 15) is urged by spring 780 to follow. If the number in the accumulator is positive, the credit balance indicator 540 will not be aligned with the ear 768 on the bail 772 and consequently that bail will be free to move under the force of its spring 780 for following the movement of the lever 776. Under this condition the smaller swing of the lever 776, in response to a total operation, will swing the end abutment 1718 on the lever 771, and also the abutment 1719 on the lever 776, into alignment with the ear 1717, but the abutment 1718 will control the operation for printing the symbol "T" for a positive total. Similarly, the greater angular motion of the levers 758, 776 and 771 for a subtotal operation will align a shoulder 1720 on the lever 771, and a shoulder 1721 on the lever 776, with the ear 1717, but the shoulder 1720 will control the operation for printing a positive subtotal symbol "S."

If the number in the accumulator is negative, the credit balance indicator 540 (FIG. 15) will block the motion of ear 768 and prevent the lever 771 from moving substantially out of its home position. This action will hold the abutment 1718 and the shoulder 1720 clear of the ear 1717 so that the abutments 1719 and 1721 will control, for printing the symbols "T̄" and "S̄" for negative totals and negative subtotals, respectively.

XXVII. COLOR FOR RIGHT SIDE OPERATIONS

For the control of the ribbon, in connection with these right side operations, a link 1726 (FIG. 10) is supported on the pin 1653, and at its lower end carries a pin 1727 which is guided in a slot 1728 in the add-subtact lever 604. Link 1726 has an ear 1729 which cooperates with an ear 1730 on the upper arm 1731 of the lever 752 on the total-subtotal shaft 560 (FIG. 9). Another ear 1732 (FIG. 10) on the link 1726 cooperates with a pin 1733 on the arm 771 (FIGS. 11 and 15) of the bail 772.

During a print-only operation, the ear 1732 is stopped by the pin 1733 so that the ribbon is lifted only enough to print black. During an addition operation, the arm 604 swings the link 1726 rearward so that the ear 1732 clears the pin 1733. However, this motion of the link 1726 aligns the ear 1729 with the ear 1730 to permit only a partial lifting of the ribbon for causing the number to be printed in black. For a subtraction operation, the lever 604 rocks a greater distance. Again the ear 1732 clears the pin 1733, but this greater motion swings the ear 1729 past the ear 1730 and out of alignment with it. Then with no stop for the link 1726, the ribbon is permitted to rise to its uppermost position for causing a red print.

During a total or a subtotal operation, the lever 604 rocks for lifting the ear 1729, as in an addition operation, but the total or subtotal operation also rocks the shaft 560 and lowers the ear 1730 so that the ears 1729 and 1730 are not in alignment. However, as previously explained, the arm 771 (FIG. 15) may be moved. If there is a negative value in the accumulator, the motion of the lever 771 will be stopped by the credit balance indicator 540 for leaving the pin 1733 (FIG. 10) substantially in its home position. In this situation, the ear 1732 will miss the pin 1733, and since the ear 1729 also misses the ear 1730, the ribbon will rise to its uppermost position for printing in red for a negative total or a negative subtotal. If the value in the accumulator is positive, the arm 771 will be permitted to swing clockwise (FIG. 15) and carry the pin 1733 to the position 1733a (FIG. 10) for a total operation, or to the position 1733b for a subtotal operation. In either of these two positions, the pin 1733 will block the ear 1732 and cause the number to be printed black.

XXVIII. SYMBOLS FOR OPERATIONS BY THE LEFT SIDE CONTROL KEYS

At the extreme right of the print-wheel cluster there is the print wheel 1738 (FIG. 16) for the left side control keys. It is the only print wheel for which no actuator sector is included in the main actuator. A drive gear 1739 for this print wheel is fixed to a gear sector 1740 which, in turn, is driven by a sector 1741 on a shaft 1742. This shaft extends through to the left side of the machine where it carries a gear sector 1743 (FIG. 27) in mesh with gear teeth on an arcuate lever 1744 which rocks free on the shaft 356. The pin 1745 on the forward extension of the actuator gear sector 372 overlies one arm of the lever 1744 for rocking it (clockwise in this view) to its home position shown, as the actuator gear sector 372 rocks to its home position. The pin 1745 moves up during the first part of each machine cycle for freeing the lever 1744 for rotation (clockwise in FIG. 27) for setting the symbol print wheel 1738 (FIG. 16). A stop lever 1746 (FIG. 29) has an ear 1747 that is arranged to be positioned over various steps 1751, 1753 and 1754 on the lever 1744 for limiting the motion of lever 1744 and thereby determining which symbol will be printed. A spring 1749 connected between the levers 1744 and 1746 (FIGS. 27 and 29) urges both of them counterclockwise in these figures. Thus during the second half of each machine cycle, as the actuator drive lever 372 returns to its home position, the pin 1745 drives the symbol setting lever 1744 clockwise to its home position, as shown in FIG. 27, where it is held by the stop lever 1746 (FIG. 29). In this position the lever 1744 sets the symbol wheel 1738 (FIG. 16) for printing an "×" to indicate the number in the multiplier storage, or memory, unit.

Stop lever 1746 (FIG. 29) carries a pin 1750 which lies in front of the upright arm of lever 1408 shown in FIGS. 30 and 100, which is rocked when the multiplication operation is initiated in response to the depression of the multiplication (=) key 38. During the multiplication operation, the lever 1408, through pin 1750, holds the stop lever 1746 forward to put ear 1747 (FIG. 29) in alignment with the step 1753. With the stop lever 1746 in this position, the lever 1744 swings clockwise during each machine cycle for setting the symbol print wheel 1738 for printing an equal (=) sign. However, as will be explained, this is printed only during the first multiplication cycle.

The stop lever 1746 is part of a bail 1756, the other arm 1757 of which appears in FIG. 34. The upper end of this arm lies in front of a pin 1758 on the negative equals bar 1510, so that forward motion of the bar 1510, upon the depression of the negative equals (−=) key 40, rocks the bail 1756 and the stop lever 1746 (FIG. 29) to put the ear 1747 in alignment with the step 1754. With stop lever 1746 in this position, the lever 1744 swings to the position for setting the symbol wheel 1738 (FIG. 16) to print a negative equals symbol (−=) for indicating that the product is entered into the accumulator subtractively. As will be described, this symbol is printed only during the first multiplication cycle.

XXIX. SYMBOL SUPPRESSION

A zero-foil mechanism is partly shown at 1640 in FIG. 21. This is similar to the well-known mechanism shown, for example, in U.S. Patent No. 2,779,267. This mechanism is controlled by a lever 1641 (FIG. 27), journalled at 1642, and engaged by a pin 1643 on a lever 1644 journalled at 356, and controlled by a zero-foil cam 1646.

A mechanism similar to the zero-foil mechanism is provided for blocking the print wheel 1698 (FIG. 17) for the right side keys during multiplication. Fixed to the drive gear 1739 and gear sector 1740 for the left side symbols is a cam 1765 for controlling a latch lever 1766 journalled at 1767. A spring 1768 biases the latch lever 1766 (clockwise in FIG. 17) for urging the end 1769 of a curved rear arm against the cam. Whenever the gears 1739, 1740 are set for printing either an equals (=) or a negative equals (—=) symbol, a notch 1770 in the cam 1765 is aligned with the curved lever end 1769. An ear 1771 on an upper arm of latch lever 1766 is arranged to engage a shoulder 1772 on the print-wheel carrier 1611 of the right side symbol print wheel 1698 (which lies to the left of the left side symbol print wheel 1738). Latch lever 1766 is similar to a zero-foil latch, and is similarly controlled by a zero-foil bail 1773. In operation, just before the print bail 1617 is lowered to release all the print wheels for printing, zero-foil bail 1773 is moved (by cam 1646, FIG. 30) from the solid line position in FIG. 17 to the dotted line position 1773a for freeing the latch lever 1766 (and all the zero-foil latches). If the notch 1770 of cam 1765 is aligned with the curved rear end 1769 of latch lever 1766, that lever will rock, under force of its spring 1768, to position ear 1771 over the shoulder 1772 of the print-wheel carrier 1611 of the right side symbol wheel 1698 and prevent it from printing. If drive gear 1739 is set for causing the left side symbol wheel to print an "×" for the memory, cam 1765 will hold ear 1771 clear of shoulder 1772 so that wheel 1698 will print.

The print wheel 1738 (FIG. 16), which is at the extreme right of the print-wheel cluster and prints the symbols for the left-side control keys, is also arranged to be blocked. Its print-wheel carrier 1779, similar to carriers 1611 for the number print-wheels, carries a pin 1780 which lies in a slot 1781 in a bellcrank 1782 which is journalled at 1783. The bellcrank 1782 includes an ear 1784 which is arranged to abut a pin 1785 on an arm 1786 on a shaft 1800. Pin 1780 and slot 1781 connect the bellcrank 1782 to the carrier 1779 of the print-wheel 1738 so that they rock together. Pin 1785 normally blocks bellcrank 1782 to prevent wheel 1738 from printing, but at times is swung clear of ear 1784 to permit such printing.

XXX. CONTROL OF PRINTING, SYMBOLS AND SPEED BY LEFT SIDE OPERATIONS

Shaft 1800 (FIG. 16) extends through the machine and at its left end (FIG. 30) is fixed to a lever 1801 which is biased (counter-clockwise in this figure) by a spring 1802. As seen in FIG. 32, shaft 1800 also carries a lever 1803 having at its lower end a pin 1804 which is normally engaged by a latch 1805 which holds it against the action of the spring 1802 (FIG. 30). Latch 1805 is journalled on the same shaft 1384 as the main multiplication lever 1322, and lies over a pin 1806 on the multiplication lever.

The lever 1801 (FIG. 30) carries a pin 1810 which lies behind the projection 1052 (FIG. 28) on the drive link 1028 for the clearing bail of the memory unit. Thus when the drive link 1028 is driven rearward during a memory input or memory output operation, the projection 1052 drives against the pin 1810 for causing a small rocking motion of the lever 1801 clockwise in FIG. 30, this rotation being unopposed by the latch 1805 in FIG. 32.

(1) Memory Symbol "X"

This rocking of shaft 1800, when the memory clearing bail is operated, rocks the lever 1786 (FIG. 16) for releasing the bellcrank 1782 so that the left side symbol print-wheel 1738 is free to print. Under this condition, wheel 1738 is set for printing the symbol "×," and the ribbon color is controlled by the right side controls (FIG. 11).

An operation initiated by the multiplier entry (×) key 36, or by the squaring entry (×²) key 46, prints two symbols "N ×." An operation in which the memory input (MI) key 48 is used prints an "×" along with the symbol of the right side operation, for example, "T ×." The memory output (MO) key 50 similarly causes an "×" to be printed along with a right side symbol. It will be recalled that the memory output (MO) key 50 causes the number in the memory unit to be transferred to the actuator, printed, and returned to the memory unit. Thus, the symbol "×" indicates that the number so printed is in the memory unit. If the "MO" key 50 is used with one of the keys 14, 16 or 20, it will print the appropriate right side symbol too, for example, "+ ×." It will be recalled further that the "MO" key 50 disables the total and subtotal operations through lever 1130 (FIG. 27) and lever 1132 (FIG. 9). Thus the use of the "MO" key 50 with any of keys 22, 30 or 32, results in printing the number from the memory and returning it without entering it in the accumulator. Accordingly, that operation prints the symbols "N ×."

(2) Multiplication Symbols "=" and "—="

When the multiplication lever 1322 is rocked as previously described (counter-clockwise in FIG. 32) at the beginning of the multiplication operation, pin 1806 lifts the latch 1805 for disengaging the pin 1804 and releasing the shaft 1800 and the lever 1801 for rotation (counter-clockwise in FIG. 30) under the pull of the spring 1802.

In this action, the lever 1801 cooperates with an ear 1830 on an arm 1831 of the lever 1657. In the home position of lever 1801, the ear 1830 swings clear in a central slot of lever 1801, but when the lever 1801 is swung (counter-clockwise in FIG. 30), the ear 1830 is stopped by a shoulder 1825 for preventing printing, or by a shoulder 1826 for causing printing in black, as will be described. At the same time the ear 1830 permits small and large motions of the lever 1801 and the shaft 1800. Initially, the lever 1801 rocks until a live tip 1827 pinned at 1828 thereon abuts the ear 1830 of lever 1831.

Although the rocking of lever 1801 and the rotation of shaft 1800 is thus limited, the rotation is sufficient for the lever arm 1786 (FIG. 16) to swing the pin 1785 up, and clear of the ear 1784 on the lever 1782, to permit printing of the multiplication symbols. Later, during the same first cycle of the multiplication, the roller 1665 (FIG. 30) on the lever 1662 is dropped by the cam surface 1666 of the actuator 376 (FIG. 27). This action lets the levers 1662 and 1657 (FIG. 30) rock counter-clockwise until the ear 1830 slides off the live tip 1827 and stops against the lower step 1826 on lever 1801. The motion thus permitted the lever 1657 is sufficient to raise the ribbon 1650 (FIG. 31) for printing black. In FIG. 30, the end 1659 of the lever 1647 is swung clear of the print bail 1617 for permitting printing. At the same time the rotation of the shaft 1655 rocks the lever 1681 (FIG. 5) for unblocking pin 1675 for permitting paper feed in connection with the printing operation.

Accordingly, the multiplicand in the selector unit is printed during the first cycle of the multiplying operation along with an equals (=) symbol. As the first cycle is completed, the cam surface 1666 (FIG. 27), through roller 1665, returns the lever 1657 to its home position shown in FIG. 30. During this action the lever 1801 is still urged (counter-clockwise in this figure) by the spring 1802 so that it holds the live tip 1827 above the ear 1830. Accordingly, as the ear 1830 rises to home position, it lifts the live tip 1827, so that the step 1825 of the lever 1801 slips under the ear 1830.

With the lever 1801 in this extreme position (counter-clockwise in FIG. 30), shoulder 1825 lies under the ear 1830 and blocks the lever 1657 in its home position. Lever 1801 remains in this position throughout the rest of the multiplication operation. Consequently during subsequent cycles of the multiplication operation, the step 1825 prevents rocking of the lever 1657. Under this condition the arm 1659 continues to block the print lever 1617 and the lever 1680 (FIG. 5).

(3) High Speed During Multiplication

Shaft 1800 also carries a lever arm 1812 (FIG. 10), the lower end of which carries a roller 1813 which lies within the curve of an arm 1814 of a bellcrank 1815 journalled at 1816. A rearward extending arm of the bellcrank 1815 carries a pin 1817 which overlies the operating lever 1818 of the high-speed Micro-Switch 62 (see also FIG. 5). When the lever 1812 (FIG. 10) is rocked by shaft 1800 (clockwise in this figure) through the larger angle just described, the roller 1813 cams against the arm 1814 and rocks the bellcrank 1815 (clockwise in this figure) for depressing the switch arm 1818 for energizing the motor 52 through the high speed governor contacts 58 (see also FIG. 7) for driving the machine at high speed. Bellcrank 1815 also has a depending hook 1819 which, in this high speed position, lies under the ear 1716 (FIG. 11) on the control arm 1704 for the symbols associated with the right side operations. Thus, at high speed, the symbol control bail 1703 is blocked, primarily to eliminate the noise and wear of its operation.

(4) *Print-Out Symbols*

As described in connection with FIGS. 97 and 99, the multiplication bar 1050 is moved rearward late in the last cycle of the multiplication operation for, among other things, setting the lever 1444 for the total or subtotal operation which follows immediately. As the equals bar 1050 is driven rearward, an ear 1835 drives against a pin 1836 (FIG. 32) on the lever 1803 for rocking it and the shaft 1800 (clockwise in this view). This restoration of the shaft 1800 substantially to its home position, returns the lever 1801 (FIG. 30) to its home position and frees the lever 1657 to permit printing during the total-taking cycle. In FIG. 16, the pin 1785 on the lever 1786 again blocks the lever 1782 for blocking the printing of multiplication symbols. In FIG. 10, the roller 1813 disengages the lever 1815 for opening the high speed switch 62 and restoring the machine to low speed, and also swings the hook 1819 clear of the ear 1716 (FIG. 11) to permit operation of the right side symbol controls.

The restoration of the equals bar 1050 (FIG. 100) has rocked the lever 1408 rearward (counter-clockwise in FIG. 100) and, through pin 1750, has freed the stop lever 1746 (FIG. 29) to swing rearward to its home position shown in that figure. In this position, it will, during the next cycle (the total-taking cycle), set the drive gear 1739 (FIG. 17) for an "X" symbol. With this setting, the notch 1770 will be away from the end of the arm 1769 so that the print wheel 1698 for the right side symbols will be free to print.

Thus at the end of a multiplication operation initiated by the "equals" key 38, or the "negative equals" key 40, the total is printed out with a symbol "T" or "T̄." After an accumulative equals operation (key 42), a subtotal is printed with a symbol "S" or "S̄." After an operation initiated by the product transfer (T to X) key 44, the total is printed out with two symbols, for example, "T X."

XXXI. OPERATIONAL CONTROL OF SYMBOLS

It will be noted that the right side symbols are not controlled directly by the keys 14, 30, etc., but rather by the add-subtract shaft 696, the total-subtotal shaft 560, and the credit-balance indicator 536, which control the accumulator operations. Because of this arrangement, no extra controls are required for matching the symbols to modified operations, as, for example, when the "MO" key 50 and "T" key 30 together produce a memory print-out, requiring the symbols "N X."

Some of the left side symbols are also controlled by the machine operations and not directly by the keys. Thus, the left side symbols are unblocked for printing only by the rocking of shaft 1800 (FIG. 16), either by link 1028 (FIG. 28) driving against pin 1810, or by the main multiplication lever 1322 (FIG. 32) lifting latch 1805. Also, the multiplication symbol (=) is set by bellcrank 1408 (FIGS. 30 and 100) driving against pin 1750 (FIG. 29). If the multiplication key 38 is depressed when the number of orders occupied in the memory and selector exceeds the capacity of the machine, plate 1066 is blocked, as in FIG. 56, so that movement of bar 1050 (FIG. 100) is prevented, detent 1402 is deflected, and a print-only operation results. The print wheel 1738 for the left side symbol is left blocked, and furthermore, is left set at "X" so that the right side symbol print-wheel 1698 is not blocked by the mechanism of FIG. 17. Accordingly, the symbol "N" is printed to indicate the print-only operation.

XXXII. SETTABLE DECIMAL POINT

As may be seen in FIGS. 107 and 108, each carrier 1611 for a numeral print wheel 1610 includes right and left arms 1845 and 1846. The right arm includes a projection 1847 which lies in a slot 1848 in a guide plate 1849, which, as shown, for example, in FIG. 16, is supported on the frame of the machine. Each of certain ones of the print-wheel carriers 1611 carries also a decimal point hammer 1850, pinned at 1851 to the left arm 1846. This hammer also carries a projection 1852 that lies in one of the slots 1848. Conveniently, the projection 1852 of the hammer carried by a particular carrier 1611 lies in the same slot as the projection 1847 of the wheel carrier in the next order to the left, that is, the next higher order. As may be seen in FIG. 109, the projections 1852 lie above and to the rear of the projections 1847, that is, advanced in the direction of the printing stroke.

The decimal point hammer 1850 rocks free between two stops provided by an ear 1853 on the arm 1845 and the axle pin 1854 of the drive gear 1855. The hammer 1850 includes a decimal impression point 1860 for printing the decimal point by impact. When the print-wheel is released for the printing stroke (by the cam 1623, FIG. 30), the hammer 1850 is carried with it and thrown against the print roller 1614.

Selective printing of the decimal point is provided by blocking most of the hammers 1850 and leaving unblocked only the one hammer or more where a printed decimal point is wanted. For this purpose a slide 1861 is supported on shouldered studs 1862 on the guide plate 1849. This slide is provided with a guiding ear 1863 that slides on the plate 1849, a handle 1864, and a series of notches 1865 which cooperate with a spring-loaded detent 1866. As seen in FIG. 109, the slide 1861 is spaced slightly from the slotted guide plate 1849 so as to clear the projections 1847 and 1852. The slide includes a flange 1867 which is far enough from the print roller 1614 to catch projections 1852 of the decimal-point hammers 1850 and block their printing, but not in position to block the projections 1847 of the print-wheel carriers. A notch 1868 in the upper and rear edge of the guide 1861 and in the flange 1868, will clear the projection 1852 of a decimal-point hammer 1850. Thus, the particular hammer 1850 with which the notch 1868 is aligned, will print, and those not aligned with such a notch will be blocked. Thus the slide 1861 may be manually adjusted to select the position of the printed decimal point in the printed number. A pointer 1869 on the slide 1861 overlies the check dial for indicating the position of the printed decimal point with respect to the number in the selector unit. Additional notches similar to 1868 may be provided in the slide 1861 as desired. For example, notches may be provided at every third order to the left of the principal notch 1868, which is aligned with the pointer 1869.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. In a multiplying calculating machine, separate means for registering a digit of each order of a multiplier, control means responsive separately to each digit so registered for controling digitation in accordance with said digits order-by-order, said control means including means for counting such digitations, the improvement wherein said counting means provides a counting overstroke after the last count for each said order of the multiplier, and means responsive to said overstroke for initiating the transfer of the control of the multiplication to the digit of another order so registered.

2. In a multiplying calculating machine having a multiplier register including a differentially settable member for the digit of each order, each such member being settable according to a digit of a number, multiplication control means responsive separately to each said differentially settable member for controlling digitation in accordance with the digit therein, said control means including means for counting such digitatons, the improvement wherein said counting means provides a counting overstroke after the last count for each order of the multiplier, and means responsive to said overstroke for transferring the control of said multiplication to the next order of said multiplier register.

3. In a multiplying calculating machine having a multiplier register including a differentially settable member for each numerical order, a digitation counter, sensors for said differentially settable members, means responsive to at least one of said sensors for setting said digitation counter according to the setting of one of said differentially settable members, and means operating said counter for counting digitations, the improvement wherein said means for operating said counter carries said counter to an overstroke position on the last digitation count of each order, and wherein there is included means responsive to said counter overstroke operation for controlling said sensors to set said counter according to the setting of the differentially settable member of the next order of said multiplier register.

4. In a multiplying calculating machine having a multiplier register including a differentially settable member for the digit of each order, each such member being settable according to the digit of a number, multiplication control means responsive separately to each said differentially settable member for controlling digitation in accordance with the digit therein, said control means including a member movable step by step for counting such digitations, the improvement wherein said counting means provides a counting overstroke at each counting step of said counting member, and wherein there is included means responsive to the overstroke at the last count for each order for transferring the control of said multiplication to the next differentially settable member of said multiplier register.

5. The improved combination of claim 3 wherein said sensors include a digit sensor for controlling the setting of said digitation counter, and a short-cut sensor.

6. The improved combination of claim 3 wherein there is included termination test means actuated by said counter overstroke for testing for zero settings in said differentially settable members of higher orders.

7. The improved combination of claim 3 wherein there is included a carriage movable with respect to said differentially settable members for carrying said sensors, and wherein said means for controlling said sensors includes means for causing movement of said carriage for carrying said sensors from one said differentially settable member to the next.

8. In combination in a multiplication control for an automatic calculator, a digitation setting member biased to digitation-set position, a cam for driving said member to digitation-not-set position, a blocking member for blocking said digitation setting member in digitation-not-set position, a multiplier digit sensor, and means responsive to said sensor for controlling said blocking member.

9. In combination in a multiplication control for an automatic calculator, a digitation setting member biased to operative position, a cam for driving said member to inoperative position, a blocking member for blocking said digitation-setting member in inoperative position, a counter controlling said blocking member, and a multiplier digit value sensor controlling said counter.

10. In combination in a multiplication control for an automatic calculator, digitation control means, a digitation setting member biased to an operative position for setting said control means to a digitation condition, cyclically operable means for controlling said setting member and permitting it to move to operative position, a blocking member for holding said setting member in inoperative position, a multiplier digit sensor, and a counter set by said multiplier digit sensor for counting digitations according to its setting by said sensor, said counter being operable upon completing the count set by said sensor for moving said blocking member to blocking position.

11. In combination in an automatic calculating machine, a multiplier register, means for controlling the operation of said machine in cycles, a digitation setting member biased to a digitation-set position, a cam for controlling said digitation setting member and for permitting it to move to said digitation-set position, a blocking member for blocking said digitation setting member out of said digitation-set position, a counter controlling said blocking member, a multiplier-digit-value sensor controlling said counter, a second blocking member for said digitation setting member for holding it out of digitation-set position and free of the first blocking member, a manually operable key for initiating a multiplication operation of the machine, means responsive to the operation of said key independently of the cyclic operation of the machine for actuating said sensors for sensing one order of the multiplier register for setting said counter and said first blocking member, and means responsive to the initiation of the cyclic operation of the machine for disengaging said second blocking member from said digitation setting member.

References Cited in the file of this patent

UNITED STATES PATENTS

| | | |
|---|---|---|
| 2,091,646 | Muller | Aug. 31, 1937 |
| 2,253,229 | Christian | Aug. 19, 1941 |
| 2,374,333 | Crossman | Apr. 24, 1945 |
| 2,560,910 | Toorell et al. | July 17, 1951 |
| 2,614,749 | Wallace | Oct. 21, 1952 |
| 2,710,145 | DeChangy | June 7, 1955 |
| 2,715,496 | Hellgren | Aug. 16, 1955 |
| 2,722,383 | Westinger | Nov. 1, 1955 |
| 2,726,037 | Landsiedel | Dec. 6, 1955 |
| 2,828,914 | Ellerbeck | Apr. 1, 1958 |
| 2,840,310 | Christoff | June 24, 1958 |
| 2,922,574 | Matthew | Jan. 26, 1960 |
| 2,989,231 | Mark | June 20, 1961 |
| 3,005,585 | Capellaro et al. | Oct. 24, 1961 |